US011483683B2

(12) United States Patent
Martinovich et al.

(10) Patent No.: US 11,483,683 B2
(45) Date of Patent: Oct. 25, 2022

(54) SYSTEMS AND METHODS FOR REMOTE SCAN AND PRIORITY OPERATIONS

(71) Applicant: Motorola Solutions, Inc., Chicago, IL (US)

(72) Inventors: Kris K. Martinovich, Streamwood, IL (US); Daniel J. McDonald, Cary, IL (US); Ruth A. Varela, Rolling Meadows, IL (US); David R. Mills, West Palm Beach, FL (US); Andor Almasi, Cooper City, FL (US)

(73) Assignee: Motorola Solutions, Inc., Chicago, IL (US)

( * ) Notice: Subject to any disclaimer, the term of this patent is extended or adjusted under 35 U.S.C. 154(b) by 261 days.

(21) Appl. No.: 16/842,632

(22) Filed: Apr. 7, 2020

(65) Prior Publication Data
US 2021/0314739 A1 Oct. 7, 2021

(51) Int. Cl.
*H04W 4/00* (2018.01)
*H04W 4/08* (2009.01)
(Continued)

(52) U.S. Cl.
CPC .............. *H04W 4/08* (2013.01); *H04W 4/10* (2013.01); *H04W 4/16* (2013.01); *H04W 68/005* (2013.01); *H04W 76/45* (2018.02); *H04W 88/16* (2013.01)

(58) Field of Classification Search
CPC . H04W 68/005; H04W 68/025; H04W 88/06; H04W 88/10; H04W 72/1215
See application file for complete search history.

(56) References Cited

U.S. PATENT DOCUMENTS 8,682,317 B2  3/2014  Pinder
9,584,987 B1  2/2017  Bar-On
(Continued)

FOREIGN PATENT DOCUMENTS

EP        2612529        3/2016

OTHER PUBLICATIONS

"Public Safety Land Mobile Radio (LMR) Interoperability with LTE Mission Critical Push to Talk" by National Public Safety Telecommunications Council (NPSTC), Final Report dated Jan. 8, 2018, 118 pages.
(Continued)

*Primary Examiner* — Omoniyi Obayanju
(74) *Attorney, Agent, or Firm* — Baker Botts L.L.P.; Michael A. Sartori

(57) ABSTRACT

When a land mobile radio connection is unavailable for a subscriber device, the subscriber device may use an alternative connection. A gateway may be used to allow the subscriber device to connect to the zone controller of a land mobile radio network via an alternative network. The gateway may be configured to perform remote scan and priority operations, similar to the scan operations the subscriber device would ordinarily perform locally. The gateway may receive a scan list from the subscriber device and call notifications from the zone controller. Using the scan list, the gateway may evaluate the call notifications, determine whether they should be sent to the subscriber device, and send them to the subscriber device over the alternative connection. The gateway may be able to adjust the remote scan and priority operations based on receiving different scan lists from the subscriber device or by generating different versions itself.

19 Claims, 18 Drawing Sheets

(51) Int. Cl.
  *H04W 76/45* (2018.01)
  *H04W 4/10* (2009.01)
  *H04W 4/16* (2009.01)
  *H04W 68/00* (2009.01)
  *H04W 88/16* (2009.01)

(56) References Cited

U.S. PATENT DOCUMENTS

| | | |
|---|---|---|
| 10,021,588 B1 | 7/2018 | Yang |
| 10,070,452 B2 | 9/2018 | Fei et al. |
| 2009/0285165 A1 | 11/2009 | Berglund |
| 2010/0099397 A1 | 4/2010 | Belmonte |
| 2012/0039284 A1 | 2/2012 | Barbieri |
| 2015/0172875 A1* | 6/2015 | Lin .................. H04W 4/08 455/518 |
| 2015/0264640 A1 | 9/2015 | Feng |
| 2016/0081050 A1 | 3/2016 | Lee |
| 2016/0095051 A1 | 3/2016 | Marri Sridhar |
| 2016/0157134 A1* | 6/2016 | Kordianowski ........ H04W 4/08 455/518 |
| 2016/0353360 A1 | 12/2016 | Lee |
| 2017/0034672 A1 | 2/2017 | Pai et al. |
| 2017/0142646 A1 | 5/2017 | McAndrew et al. |
| 2017/0353859 A1 | 12/2017 | Idnani |
| 2018/0012480 A1 | 5/2018 | Fei et al. |
| 2019/0380008 A1 | 12/2019 | Yang |
| 2020/0304647 A1* | 9/2020 | Garcia ................. G06Q 20/305 |

OTHER PUBLICATIONS

International Search Report and Written Opinion for International application No. PCT/US2021/025885; dated Jul. 12, 2021, 17 pages.

Zhao Dong et al., "A method of implementing scan in broadband", IP.Com, IP.Com Inc., XP013168044; Publication Date: Jul. 10, 2015.

Matt Bridle "Scanned Talkgroup Activity Notification", IP.Com, IP.Com, Inc., XP031004552, Jan. 2000.

* cited by examiner

SYSTEMS AND METHODS FOR REMOTE SCAN AND PRIORITY OPERATIONS

BACKGROUND OF THE INVENTION

Land mobile radio devices have evolved from relatively simple analog devices to multifunction computing systems supporting multiple communication protocols. In ordinary land mobile radio (LMR) operation, an individual radio connects to a land mobile radio network via a radio frequency site. A typical land mobile radio network may include many radio frequency sites and a zone controller that directs radio call traffic to each radio frequency site. The zone controller sends call grants for active radio calls to the radio frequency sites, which each in turn broadcast the call grants over a broadcast control channel to the individual radios. In trunked land mobile radio networks, for example, each call grant is typically associated with a group of individual radios, called a talkgroup, for which there is an active radio call. Each individual radio typically has an affiliated talkgroup, which is generally the talkgroup selected on the individual radio. When the individual radio connects to a radio frequency site using a land mobile radio connection, messaging occurs between the individual radio, the radio frequency site, and the zone controller, to enable the individual radio to register with the zone controller and join land mobile radio calls via the radio frequency site. A land mobile radio call for a selected talkgroup is initiated, for example, by a user of an individual radio pressing a push-to-talk button on the individual radio. Initiating a land mobile radio call results in messaging to the zone controller through the radio frequency site. In response, the zone controller generates a call grant associated with the radio call and sends the call grant to some or all radio frequency sites. The zone controller sends call grants to the radio frequency sites based on the affiliated talkgroups reported by individual radios, for example, when those individual radios register through the radio frequency site. Thus, the zone controller may not send all call grants to all radio frequency sites in the land mobile radio network.

In ordinary land mobile radio operation, an individual radio is typically configured to perform local scan operations. For example, each individual radio may be provisioned with a pre-configured local scan list containing one or more talkgroups, also sometimes referred to as scan groups, that are of interest to the user of the individual radio. Using the scan list, each individual radio scans, also sometimes referred to as monitors, the broadcast control channel and determines which of the available call grant to accept based on the local scan list configured within the individual radio. In some situations, the scan list may be configured or reconfigured by the user of the individual radio. If the individual radio determines to accept a call grant, it may automatically, without user input, join the active radio call associated with the call grant. While an individual radio scans for other call grants associated with talkgroups in its local scan list, there is no guarantee that call grants for talkgroups in the local scan list will be sent to the radio frequency site connected to the individual radio with a land mobile radio connection, because there may not be any individual radios registered through that radio frequency site that are affiliated with some or all of the talkgroups in the individual radio's local scan list. Currently, although the individual radio may communicate its affiliated talkgroup to the zone controller, scan operations are performed locally by the individual radio itself by monitoring the broadcast control channel. The individual radios do not communicate which talkgroups are in their local scan lists to the zone controller, radio frequency site, or other components of the land mobile radio network infrastructure.

If a connection to a radio frequency site is unavailable, the individual radio may be able to use a different connection and continue to send and receive. However, the individual radio may not be able to monitor a broadcast control channel for call grants. Thus, the individual radio loses the ability to perform local scan operations.

Accordingly, there is a need for systems and methods for remote scan and priority operations.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
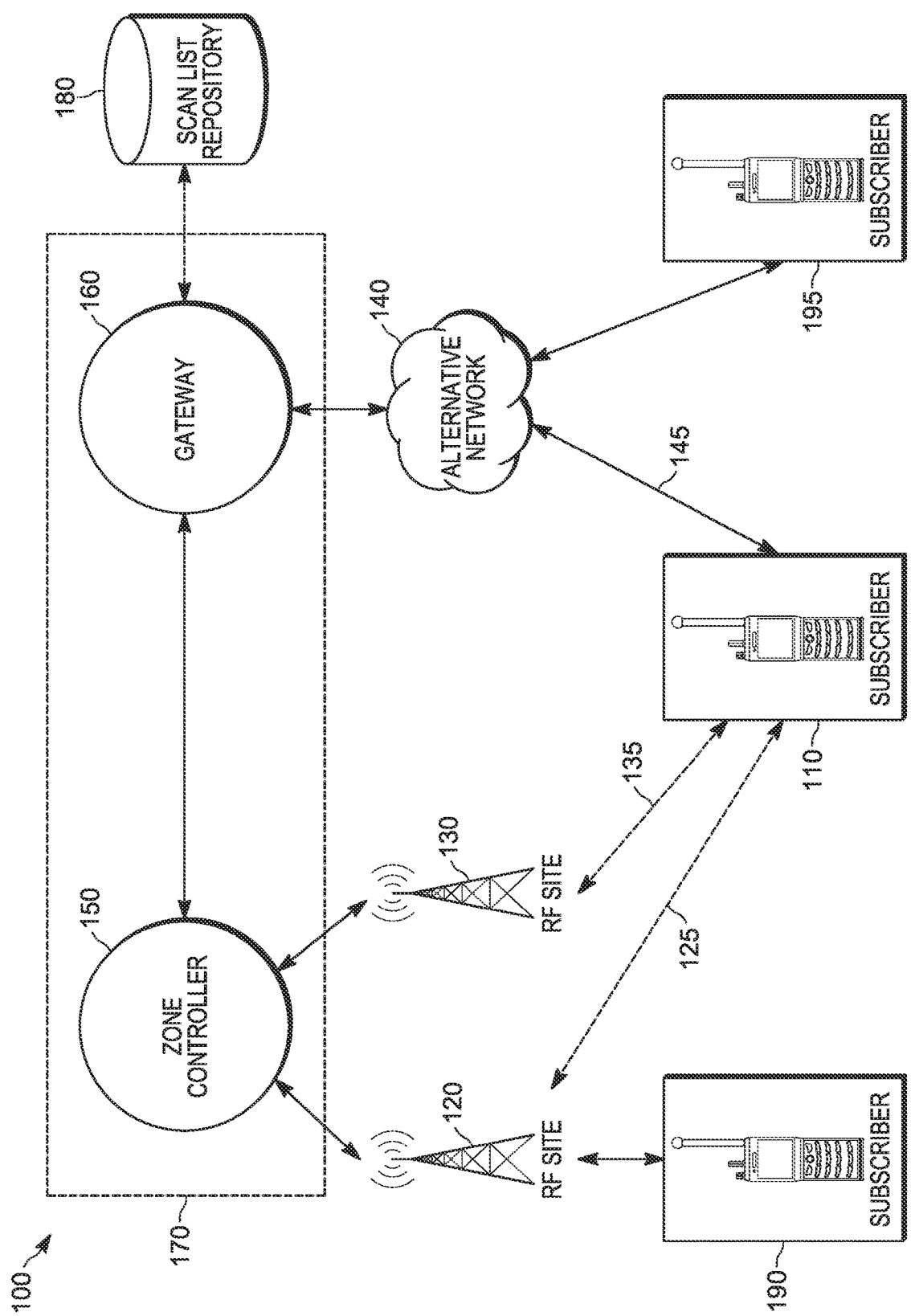
FIG. 1 is a block diagram illustrating selected elements of a system for remote scan and priority operations, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods, systems, and devices for remote scan and priority operations. In at least one embodiment, a disclosed method for remote scan and priority operations includes establishing a connection to a subscriber device that is operable to communicate using a land mobile radio connection to a land mobile radio network and an alternative connection to an alternative network. The alternative connection is different from the land mobile radio connection, and the connection to the subscriber device is established over the alternative connection. The method also includes, receiving a first scan list from the subscriber device over the alternative connection, evaluating a first call notification using the first scan list, where the first call notification is associated with a first talkgroup. The method also includes, determining, based on the evaluation, that the first call notification should be sent to the subscriber device, and sending, based on the determination, the first call notification to the subscriber device over the alternative connection.

In at least one embodiment, a disclosed system for remote scan and priority operations includes a zone controller, a gateway communicatively coupled to the zone controller, and a subscriber device communicatively coupled to the gateway. The zone controller is part of a land mobile radio network and configured to send a first call notification to the gateway, the first call notification associated with a first talkgroup. The subscriber device is communicatively coupled to the gateway via an alternative network, the alternative network different than the land mobile radio network, communicatively coupled to the alternative network via an alternative connection, the alternative connection is different than a land mobile radio connection, and configured to send a first scan list to the gateway via the alternative network over the alternative connection. The gateway is configured to receive the first scan list from the subscriber device over the alternative connection, receive the first call notification from the zone controller, evaluate the first call notification using the first scan list, determine, based on the evaluation, that the first call notification should be sent to the subscriber device, and send, based on the determination, the first call notification to the subscriber device over the alternative connection.

In at least one embodiment, a disclosed gateway device for remote scan and priority operations includes a first interface communicatively coupled to a zone controller that is part of a land mobile radio network, and the first interface is configured to receive a call notification from the zone controller. The gateway device also includes, a second interface communicatively coupled to an alternative network that is different than the land mobile radio network, and the second interface is configured to receive a scan list from a subscriber device via the alternative network. The gateway device also includes, a processor communicatively coupled to the first and second interfaces, the processor configured to evaluate the call notification using the scan list received from the subscriber device via the alternative network, where the call notification is received using the first interface, and the scan list is received using the second interface. Based on the evaluation, the processor is further configured to determine that the call notification should be sent to the subscriber device and send the call notification to the subscriber device via the alternative network using the second interface.

In any of the disclosed embodiments, the alternative connection may be a wireless local area network connection, a cellular connection, or a satellite connection.

In any of the disclosed embodiments, the scan list may include a plurality of talkgroup entries, wherein each talkgroup entry in the plurality of talkgroup entries is associated with a talkgroup and each talkgroup entry in the plurality of talkgroup entries includes an identifier associated with the talkgroup and a priority level associated with the talkgroup. The plurality of talkgroup entries may include a first talkgroup entry associated with a first talkgroup and a second talkgroup entry associated with a second talkgroup.

In any of the disclosed embodiments, the method may further include updating a record in a scan list repository based on the first scan list, the record associated with the subscriber device, sending a first audio communication for a radio call associated with the first talkgroup to the subscriber device over the alternative connection, and receiving a second audio communication for the radio call associated with the first talkgroup from the subscriber device over the alternative connection.

In any of the disclosed embodiments, the method may further include, determining that a radio call associated with the first talkgroup has transitioned from an active state to an inactive state for a first period, initiating a second period after the first period, generating a second scan list based on the first scan list, and terminating the second period after an occurrence of a termination event, the occurrence of the termination event occurring after initiating the second period. The termination event may be at least one of determining that the second period has expired, determining that the radio call associated with the first talkgroup has transitioned to the active state, or determining that a second call notification should be sent to the subscriber device, wherein the second call notification is received before the second period has expired, the second call notification is evaluated using the second scan list, and determining that the second call notification should be sent to the subscriber device is based on the evaluation of the second call notification.

In any of the disclosed embodiments, the method may further include, receiving a second call notification associated with the second talkgroup, wherein, the first call notification includes an identifier associated with the first talkgroup, the second call notification includes an identifier associated with the second talkgroup, and the second call notification is received when a radio call associated with the first talkgroup is in an active state. The method may further include, evaluating the second call notification using the first scan list by comparing the identifier in the second call notification with one or more identifiers included in one or more of the plurality of talkgroup entries in the first scan list, and determining, based on the comparison, that the identifier associated with the second talkgroup in the second call notification matches the identifier associated with the second talkgroup in the first scan list. The method may further include, determining, based on the evaluation of the second call notification, that the second call notification should be sent to the subscriber device, wherein the determination that the second call notification should be sent to the subscriber device includes comparing the priority level associated with the second talkgroup with the priority level associated with the first talkgroup and determining, based on the comparison, that the priority level associated with the second talkgroup is higher than the priority level associated with the first talkgroup. The method may further include, sending the second call notification to the subscriber device over the alternative connection.

In any of the disclosed embodiments, the first scan list may be received by a gateway from a subscriber device over an alternative connection via an alternative network, and the first call notification may be received by the gateway from a zone controller that is part of a land mobile radio network.

In any of the disclosed embodiments, a scan list repository may be communicatively coupled to the gateway. The scan list repository may include records associated with subscriber devices and the records may include talkgroup entries.

In any of the disclosed embodiments, the method may further include, receiving a regroup message from the zone controller. The regroup message may include an identifier associated with the first talkgroup, and an indication that the first talkgroup has been regrouped with a second talkgroup into a supergroup. The method may further include, determining, by the gateway, that the identifier associated with the first talkgroup in the first scan list matches the identifier associated with the first talkgroup in the regroup message, updating, in a scan list repository, a record associated with the subscriber device based on the regroup message, and sending a message including at least a portion of the regroup message to the subscriber device over the alternative connection. In some embodiments, the method may include sending the regroup message to the subscriber device over the alternative connection. The method may further include, receiving, by the gateway from the zone controller, a second call notification, the second call notification associated with the supergroup, evaluating the second call notification using the updated record associated with the subscriber device, determining, based on the evaluation, that the second call notification should be sent to the subscriber device, and sending the second call notification to the subscriber device over the alternative connection.

In any of the disclosed embodiments, the method may further include, generating, by the gateway, a second scan list based on the first scan list, sending, from the gateway to the zone controller, the second scan list, evaluating, by the zone controller, a plurality of call notifications, the plurality of call notifications including the first call notification, using the second scan list, determining, by the zone controller, based on the evaluation, that the first call notification should be sent to the gateway, and sending the first call notification from the zone controller to the gateway. In some embodiment, the second scan list may include information from a plurality of scan lists received from a plurality of subscriber devices, wherein the plurality of scan lists includes the first scan list.

In any of the disclosed embodiments, the zone controller may be further configured to send a second call notification, subsequent to sending the first call notification, to the gateway, the second call notification associated with a second talkgroup. The gateway may be further configured to receive the second call notification from the zone controller, evaluate the second call notification using the first scan list, determine, based on the evaluation, that the second call notification should be sent to the subscriber device, and send the second call notification to the subscriber device over the alternative connection.

In any of the disclosed embodiments, the gateway may be further configured to generate a second scan list based on the first scan list and send the second scan list to the zone controller. The zone controller may be further configured to receive the second scan list from the gateway, evaluate a plurality of call notifications, where the plurality of call notifications includes the first call notification, using the second scan list, determine, based on the evaluation of the plurality of call notifications, that the first call notification should be sent to the gateway, and send the first call notification to the gateway.

In any of the disclosed embodiments, the gateway may be further configured to update a record in the scan list repository based on the first scan list, the record associated with the subscriber device, send a first audio communication for a radio call associated with the first talkgroup to the subscriber device over the alternative connection, and receive a second audio communication for the radio call associated with the first talkgroup from the subscriber device over the alternative connection. The zone controller may be further configured to send a regroup message to the gateway, the regroup message including an identifier associated with the first talkgroup and an indication that the first talkgroup has been regrouped with a second talkgroup into a supergroup. The gateway may be further configured to receive the regroup message from the zone controller, determine that the identifier associated with the first talkgroup in the first scan list matches the identifier associated with the first talkgroup in the regroup message, update the record in the scan list repository associated with the subscriber device based on the regroup message, and send a message including at least a portion of the regroup message to the subscriber device over the alternative connection. The gateway may be further configured to receive a second call notification associated with the supergroup, evaluate the second call notification using the updated record associated with the subscriber device, determine, based on the evaluation, that the second call notification should be sent to the subscriber device, and send the second call notification to the subscriber device over the alternative connection.

In any of the disclosed embodiments, the gateway device may further include a third interface communicatively coupled to a scan list repository. The processor may be further configured to update a record associated with the subscriber device in the scan list repository based on the received scan list.

Land mobile radio networks, and specifically trunked land mobile radio networks, are frequently used in public-safety or mission-critical environments to provide a reliable means of communication. For example, many police and fire departments rely on land mobile radio networks to allow their police officers or fire fighters to communicate and respond to emergencies. A land mobile radio network typically includes a zone controller and at least one radio frequency site, and, in some cases, hundreds of radio frequency sites. Radio frequency sites generally have limited range or coverage and are thus typically dispersed over a geographic area to provide land mobile radio network coverage over part or all of the geographic area. Radio frequency sites may also be limited in the number of active radio calls or subscriber devices they can support at any given time while maintaining the integrity of the network. The zone controller is responsible for directing radio call traffic to the radio frequency sites of the land mobile radio network. In some embodiments, the zone controller may be a server application that provides call processing for wide area radio communications for both individual subscriber devices and groups of subscriber devices. The geographic zone controlled by a zone controller may be large, for example, a city or town, a county, multiple counties, or an entire state. As used herein, an individual radio device may be referred to as a subscriber device or as a subscriber. Those skilled in the art will appreciate that a subscriber device is different than the user of the subscriber device, such as, for example, a law enforcement officer or a firefighter. Different subscriber devices may be grouped together into a talkgroup that allows the users of those subscriber devices to communicate with each other by sending and receiving audio for a radio call over the land mobile radio network. At any given time, there may be several active radio calls on the land mobile radio network.

Subscriber devices may be connected over different types of land mobile radio networks. For example, a trunked land mobile radio network may be implemented as a packet switching computer network with a zone controller acting as a centralized processor for traffic over the trunked land mobile radio network. Trunking allows the land mobile radio network to share a limited number of communication channels among many subscriber devices utilizing talkgroups. The zone controller may use a broadcast control channel to communicate with subscriber devices, and the remaining channels may be used for communications between the subscriber devices associated with various talkgroups. Typically, the control channel is used to broadcast available call notifications to each of the subscriber devices connected to a radio frequency site of the land mobile radio network using a land mobile radio connection. As used herein, a call notification, also referred to as a call grant, is a notification that includes information regarding an active radio call. An active radio call may also be referred to as a radio call that is active or that is in an active state. The information in a call notification may indicate that a radio call associated with a talkgroup is active and allow a subscriber device to join the active radio call. For example, the call notification may include information that identifies the talkgroup associated with the active radio call and a radio channel assigned to the active radio call. A call notification including information regarding a talkgroup (e.g. a talkgroup identifier) may be referred to as being associated with the talkgroup. Whether a subscriber device joins a radio call that is active may be based on the interests of the user of the subscriber device, for example, as expressed in a local scan list or as indicated by the talkgroup the subscriber device is affiliated with. In ordinary land mobile radio operation, a subscriber device monitors a broadcast control channel and determines which of the available call notifications to accept, if any. This may be referred to herein as the subscriber device performing local scan operations because the subscriber device itself is scanning, also referred to as monitoring, the broadcast channel for call notifications of interest.

To implement local scan operations, each subscriber device may be configured to store a scan list locally. The local scan list may include one or more entries, in which each entry may include an identifier for a talkgroup of interest to the user of the subscriber device. In some embodiments, each entry may also include a relative priority level for the talkgroup. A call notification may be associated with a talkgroup by including an identifier for the talkgroup, also referred to as a talkgroup identifier. When the subscriber device receives a call notification including a talkgroup identifier that matches a talkgroup identifier in the subscriber device's local scan list is received over the broadcast control channel, the subscriber device may automatically, without user input, decide to join the radio call associated with the talkgroup identified by the call notification. For example, if the subscriber device has not joined or is otherwise not participating in an active radio call, the subscriber device may decide to join a radio call based on the first call notification it receives that is associated with a talkgroup that is in the subscriber device's scan list. When joining an active radio call associated with a call notification, the subscriber device may send messaging to the zone controller indicating that the call notification has been accepted. After joining the radio call that is in an active state, the subscriber device may participate in the active radio call by, for example, sending and/or receiving audio communications. When the subscriber device has already joined or is otherwise participating in an active radio call, it may decide to switch and join a different active radio call based on receiving a call notification associated with a higher priority talkgroup than the current radio call.

A land mobile radio network may include, for example, several radio frequency sites dispersed over a city to provide the city's police department with land mobile radio network coverage across a portion of or all of the city. When a police officer patrols different parts of the city, the officer's subscriber device may register with different radio frequency sites as the officer moves from the coverage area provide by one site to the coverage area provided by another site. However, there are often situations where a land mobile radio connection to a radio frequency site is not available, which renders the land mobile radio network unavailable to the subscriber device. There are a number of a reasons why the land mobile radio connection may be unavailable for one or more reasons including, but not limited to, the subscriber device being out of range of a radio frequency site of the land mobile radio network, the radio frequency site experiencing an outage, the radio frequency site being overloaded with radio traffic to or from subscriber devices, the signal integrity or radio call quality over the land mobile radio connection being insufficient to support reliable communication (e.g., the user may be in or near a building or underground area), the subscriber device's land mobile radio connection to a radio frequency site being disabled or malfunctioning, and the like. Skilled artisans will appreciate that there may be other reasons why a land mobile radio connection may be unavailable to a subscriber device.

When a land mobile radio connection is unavailable to a subscriber device, the subscriber device may be able to connect to the land mobile radio network via an alternative connection to an alternative network. When the subscriber device is connected to an alternative network that lacks a broadcast control channel, the subscriber device may not be able to effectively implement local scan operations. As described herein, the subscriber device may be communicatively coupled to a component of the infrastructure, such as a gateway, via an alternative network. The subscriber device may be configured to dynamically report scan lists to the infrastructure component, which may send call notifications to the subscriber device based on performing remote scan and priority operations for the subscriber device using a remote scan list. This approach may avoid disabling scan operations when the land mobile radio connection is unavailable to the subscriber device. In addition, this approach may also reduce data requirements, costs, and delays in joining radio calls, which may be particularly important when the cost of sending data over the alternative connection is high, such as when sending data over a satellite connection.

One possibility would be to send all call notifications to the subscriber device over the alternative connection. However, this solution may be data intensive, costly, and may result in delay in joining radio calls. In some embodiments, the cost of sending data over the alternative connection may be relatively high, for example, over a satellite connection. Another possibility may be to configure the subscriber device to send a copy of the subscriber device's local scan list to a component of the infrastructure that may use the received scan list, also referred to as a remote scan list, to remotely perform scan and priority operations for the subscriber device and determine which call notifications to send to the subscriber device.

As noted above, currently, in ordinary land mobile radio operation, the network infrastructure is unaware of which talkgroups the user of each subscriber device is interested in because the subscriber devices do not communicate their scan lists to a component of the network infrastructure. By configuring a subscriber device to dynamically report scan lists to a component of the infrastructure and performing some or all of the scan and priority operations on a component of the infrastructure remote from the subscriber device rather than on the subscriber device locally, remote scan and priority operations may be achieved over an alternative connection without sending all call notifications to the subscriber device. Implementing remote scan and priority operations in accordance with some embodiments disclosed herein may provide comparable performance to ordinary land mobile radio operation. In some embodiments described herein, this approach provides a significant improvement over alternative approaches, for example, by reducing the amount of data transferred over the alternative connection. Additionally, in at least some embodiments described herein, the amount of time to join a radio call over the alternative connection is reduced allowing a subscriber device to join an active radio call more quickly, avoiding the loss of call audio, and reducing the latency of call audio. In at least some embodiments, remote scan and priority operations may improve the functioning of the subscriber device, for example, by reducing the number of operations the subscriber device must perform locally and reducing power consumption of the subscriber device and thereby extending battery life of the subscriber device when it is connected to an alternative network. In at least some embodiments, remote scan and priority operations may improve the functioning of the subscriber device by ensuring that the device is able to receive a greater percentage of available call notifications. When describing the connection of elements herein for the purposes of transmitting data (e.g., call notifications, radio call audio, scan lists, and the like), the terms connected and communicatively coupled may be used interchangeably and do not necessarily require a physical connection, such as a wired connection, or a direct connection.

In some embodiments, a talkgroup may provide a basis of association between various aspects of the methods, systems, and devices disclosed herein. For example, a radio call may be referred as being associated with a talkgroup when the radio call is for the talkgroup. As another example, a call notification may be referred to as associated with a talkgroup when the call notification includes an identifier for the talkgroup, and a call notification may be referred to as associated with a radio call that is for the talkgroup. As yet another example, a talkgroup entry in a scan list may be associated with a talkgroup by including an identifier for the talkgroup. As yet another example, various aspects of the methods, systems, and devices disclosed herein may be associated with each other by including matching talkgroup identifiers. Skilled artisans will appreciate that there may be other ways that various aspects of the methods, systems, and devices disclosed herein may be associated or otherwise related with each other.

Referring now to FIG. 1, there is provided a block diagram illustrating selected elements of an example system 100 for remote scan and priority operations, in accordance with some embodiments. In the illustrated example, system 100 includes subscriber devices 110, 190, and 195, radio frequency sites 120 and 130, alternative network 140, zone controller 150, gateway 160, and scan list repository 180. Subscriber devices 110, 190, and 195 may be implemented to support remote scan and priority operations similar to subscriber device 310 as described for FIG. 3 or subscriber device 400 as described for FIG. 4. Although two radio frequency sites 120 and 130 are shown, the number of radio frequency sites may vary. In some embodiments there may be a single radio frequency site, and in some embodiments, there may be many more (e.g., several hundred) radio frequency sites. Radio frequency sites 120 and 130 may be communicatively coupled to zone controller 150 and form part of a land mobile radio network.

Gateway 160 may be communicatively coupled to zone controller 150 and alternative network 140. In some embodiments, gateway 160 and zone controller 150 may be separate devices. In other embodiments, gateway 160 and zone controller 150 may be integrated in a single device as indicated by dashed line 170. When zone controller 150 and gateway 160 are integrated, data may be received from and sent to each internally. In some embodiments, gateway 160 may be implemented similar to gateway 210 as described for FIG. 2. In some embodiments, some or all portions of the methods disclosed herein as being performed by a specific component of the system infrastructure, for example, a gateway, may alternatively be performed by another suitable component of the system infrastructure, for example, the zone controller 150. Gateway 160 may enable call notifications, scan lists, radio call audio communications, and other data to flow between the land mobile radio network and alternative network 140, which are different networks. In at least some embodiments, the land mobile radio network and alternative network 140 are incompatible networks due to, for example, differences in data formats, communication protocols, and the like. In some embodiments, gateway 160 may be configured to implement remote scan and priority operations for subscriber device 110 when subscriber device 110 is connected to alternative network 140.

In some embodiments, gateway 160 is also communicatively coupled to scan list repository 180. Scan list repository 180 may be any non-volatile memory capable of storing records associated with subscriber devices, which may include scan lists received from subscriber devices, such as subscriber devices 110 or 195, or created by gateway 160 for various purposes. Such non-volatile memory may be implemented using, for example, a database system, a hard-disk drive (HDD), an optical disk drive such as a compact disk (CD) drive or digital versatile disk (DVD) drive, a solid-state drive (SSD), a tape drive, a flash memory drive, and the like. In some embodiments, scan list repository 180 may be external to gateway 160, and in other embodiments, scan list repository 180 may be internal to gateway 160 (not shown).

If a land mobile radio connection from the subscriber device to a radio frequency site is available, for example, land mobile radio connection 125 from subscriber device 110 to radio frequency site 120 or land mobile radio connection 135 from subscriber device 110 to radio frequency site 130, subscriber device 110 may be configured to connect to the radio frequency site using the land mobile radio connection and proceed with ordinary land mobile radio operation. However, if a land mobile radio connection from the subscriber device to a radio frequency site is unavailable for any reason, the subscriber device may connect to an alternative network. For example, subscriber device 110 may be configured to connect to alternative network 140 when an alternative connection, such as alternative connection 145, to alternative network 140 is available. In this way, subscriber device 110 may be communicatively coupled to zone controller 150 via alternative network 140 and gateway 160, and alternative connection 145 may allow the subscriber device to connect to the land mobile radio network over the alternative connection.

Alternative network 140 may be a broadband network that is different than a land mobile radio network. In at least some embodiments, a broadcast control channel may be unavailable to broadcast call notifications received from a zone controller, such as zone controller 150, to subscriber devices, such as subscriber devices 110 and 195. In some embodiments, alternative network 140 may be a broadband network using a communication protocol that is different than the land mobile radio (LMR) network. For example, a land mobile radio network may use a trunked land mobile radio standard or protocol such as ETSI Digital Mobile Radio (DMR), a Project 25 (P25) standard defined by the Association of Public Safety Communications Officials International (APCO), Terrestrial Trunked Radio (TETRA), or other land mobile radio protocols or standards. In various embodiments, alternative network 140 may, for example, include, but is not limited to, an internet protocol (IP) based wireless network, a satellite network, or a cellular telephone network such as fourth-generation broadband wireless technology (4G) network, a long-term evolution wireless technology (LTE) network, or a fifth-generation broadband wireless technology (5G) network. As used herein, a cellular connection refers to a wireless connection to a cellular telephone network, which may be referred to as a cellular network. Alternative network 140 may be implemented as, or may be a part of, but is not limited to, a local area network (LAN), a metropolitan area network (MAN), a wide area network (WAN), a wireless local area network (WLAN), a virtual private network (VPN), an intranet, the Internet or another appropriate architecture or system that facilitates the communication of signals, data, and/or messages (generally referred to as data) and is different than a land mobile radio (LMR) network. Alternative network 140 and its various components may be implemented using hardware, software, or any suitable combination thereof. Similarly, alternative connection 145 may be any type of connection that is different than a land mobile radio connection, such as land mobile radio connections 125 and 135. In some embodiments, alternative connection 145 may utilize unicast messaging and a transport layer security (TLS) protocol. In some embodiments, alternative connection 145 may be, but is not limited to a Wi-Fi connection, a satellite connection, or a 4G, LTE, 5G or other type of cellular connection that is different than a land mobile radio connection.

Where certain steps of the methods illustrated in FIGS. 5, 6, 8-10, and 12-16 are described below as being implemented by a similarly named component to the components described for FIG. 1 (e.g., a zone controller, a gateway, a subscriber device, and the like), those skilled in the art would appreciate based on the description that those similarly named components may be implemented similar to the components as described for FIG. 1. However, the similarly named components are not necessarily limited to the configuration shown in or otherwise as described for FIG. 1.

Figure 2:
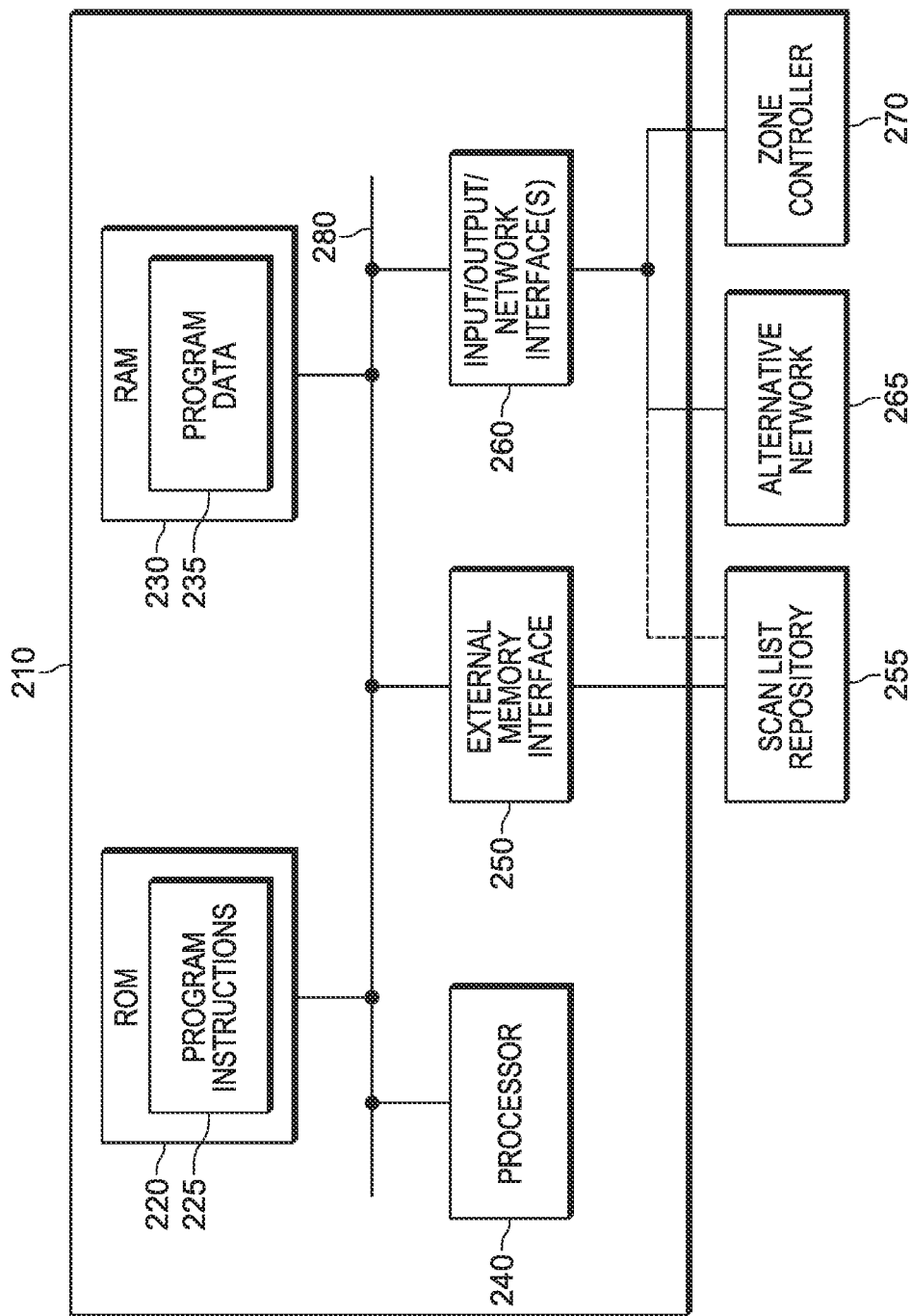
FIG. 2 is a block diagram illustrating selected elements of an example gateway for remote scan and priority operations, in accordance with some embodiments.

Referring now to FIG. 2, there is provided a block diagram illustrating selected elements of an example gateway 210 for remote scan and priority operations, in accordance with some embodiments. In the illustrated example, gateway 210 includes a Read Only Memory (ROM) 220, a Random Access Memory (RAM) 230, an electronic processor 240, an external memory interface 250, and one or more input/output/network interface(s) 260. External memory interface 250 of gateway 210 may be communicatively coupled to a scan list repository 255, which may be stored in an external memory. Gateway 210 may communicate over connections to networks communicatively coupled via input/output/network interface(s) 260. For example, input/output/network interface(s) 260 may be configured to be communicatively coupled to alternative network 265 and zone controller 270, which may be a part of a land mobile radio network. In some embodiments, different input/output/network interface(s) 260 may be used to communicatively couple gateway 210 to alternative network 265 and zone controller 270. Read Only Memory (ROM) 220, Random Access Memory (RAM) 230, electronic processor 240, external memory interface 250, and one or more input/output/network interface(s) 260 may be coupled to system bus 280 through which they may communicate with each other. In some embodiments gateway 210 may be implemented similar to gateway 160 as described for FIG. 1.

In some embodiments, scan list repository 255 may be implemented similar to scan list repository 180, alternative network 265 may be implemented similar to alternative network 140, and zone controller 270 may be implemented similar to zone controller 150, as described for FIG. 1. Input/output/network interface(s) 260 may include one or more analog input interfaces, such as one or more analog-to-digital (A/D) convertors, or digital interfaces for receiving signals or data from, and sending signals or data to, one or more input/output devices, such as zone controller 270, or networks, such as alternative network 265. For example, input/output/network interface(s) 260 may include suitable interfaces for receiving audio inputs, video inputs, or text inputs. In various embodiments, an external memory in which scan list repository 255 is stored may be implemented using, for example, a database system, a hard-disk drive (HDD), an optical disk drive such as a compact disk (CD) drive or digital versatile disk (DVD) drive, a solid-state drive (SSD), a tape drive, or a flash memory drive, to name a few. In various embodiments, the electronic processor 240 may include a microprocessor, a microcontroller, a system-on-chip, a field-programmable gate array, a programmable mixed-signal array, or, in general, any system or sub-system that may include nominal memory and that is capable of loading and executing a sequence of instructions. In some embodiments, the electronic processor 240 may include a hardware state machine or other electronic circuitry configured to perform one or more of the operations of the methods disclosed herein.

In the illustrated embodiment, ROM 220 stores program instructions 225, at least some of which may be loaded and executed by the electronic processor 240 to perform one or more methods described herein as being performed by a component of the system infrastructure, such as gateway 210. For example, any or all of the operations of method 600 illustrated in FIG. 6, method 800 illustrated in FIG. 8, method 900 illustrated in FIG. 9, method 1300 illustrated in FIG. 13, method 1400 illustrated in FIG. 14, and method 1600 illustrated in FIG. 16 may be performed by program instructions 225 executing on electronic processor 240 of gateway 210. In some embodiments, program instructions 225 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory), or a Flash memory, and the like. In some embodiments, program instructions 225 may include program instructions that when loaded and executed by electronic processor 240 implement other functionality features of gateway 210. For example, program instructions 225 may include program instructions that when loaded and executed by electronic processor 240 cause the processor to generate or otherwise modify scan lists or copies of scan lists in records stored in scan list repository 255.

In this example embodiment, RAM 230 may, from time to time, store program data 235 including, without limitation, information representing a scan list currently being used by gateway 210 to evaluate and determine whether a call notification should be sent to a subscriber device over alternative network 265 via input/output/network interface(s) 260, a call notification received from zone controller 270, intermediate results of an evaluation or determination regarding a call notification, and other data accessible by program instructions 225 and used in performing the methods described herein. In some embodiments, some or all of the information used by gateway 210 may be stored in a programmable non-volatile memory, such as in an external memory communicatively coupled to gateway 210 through external memory interface 250.

In some embodiments, RAM 230 may also store data used in performing other functions of gateway 210. In some embodiments, RAM 230 may, from time to time, store local copies of all or a portion of program instructions 225 or other program instructions copied from ROM 220. In some embodiments, RAM 230 may, from time to time, store local copies of data copied from scan list repository 255 or another external memory over external memory interface 250.

In various embodiments, input/output/network interface(s) 260 may operate to allow gateway 210 to receive user input. User input may be provided, for example, via a keyboard or keypad, soft keys, icons, or soft buttons on a touch screen of a display, a smart phone, smart speaker, or other type of virtual assistant that provides voice input or video input based on voice recognition or gesture recognition, a scroll ball, a mouse, buttons, and the like (not shown in FIG. 2). In some embodiments, input/output/network interface(s) 260 may include a graphical user interface (GUI) generated, for example, by electronic processor 240 from program instructions 225 and program data 235 and presented on a display, enabling a user to interact with the display. Input/output/network interface(s) 260 may also include other input mechanisms, which for brevity are not described herein and which may be implemented in hardware, software, or a combination of both.

Input/output/network interface(s) 260 may be a suitable system, apparatus, or device operable to serve as an interface between electronic processor 240 and a network, such as alternative network 265. In some embodiments, input/output/network interface(s) 260 may enable gateway 210 to communicate with a server or a remote device (not shown) over a network using a suitable transmission protocol and/or standard, including, but not limited to, transmission protocols and/or standards enumerated below regarding alternative network 265. In some embodiments, input/output/network interface(s) 260 may be communicatively coupled via a network to a network storage resource that may contain, for example, scan list repository 255. Alternative network 265 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data, and/or messages (generally referred to as data). The network may transmit data using a desired storage and/or communication protocol, including, but not limited to, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network and its various components may be implemented using hardware, software, or any combination thereof. In some embodiments, input/output/network interface(s) 260 may enable wired and/or wireless communications to and/or from one or more input, output, or networked devices, including but not limited to, zone controller 270, scan list repository 255, and other elements of a system for remote scan and priority operations that includes gateway 210. In various embodiments, gateway 210 may include more, fewer, or different elements than those of gateway 210 illustrated in FIG. 2. External devices may be configured to send data to or receive data from electronic processor 240 over one or more data lines through input/output/network interface(s) 260, in various embodiments.

Figure 3:
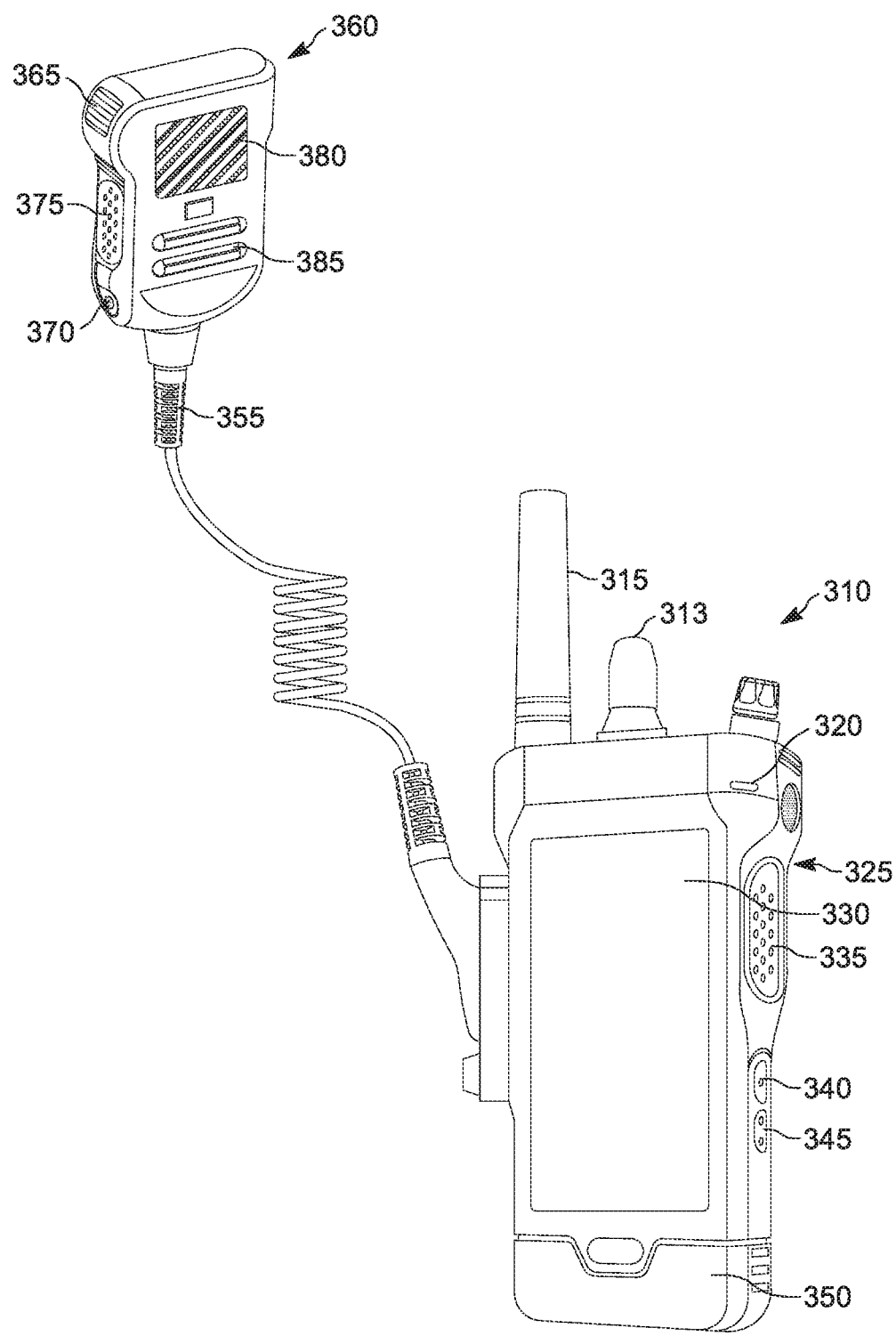
FIG. 3 is a perspective view of an example subscriber device for supporting remote scan and priority operations, in accordance with some embodiments.

Referring now to FIG. 3, there is provided a perspective view of an example subscriber device 310 for supporting remote scan and priority operations, in accordance with some embodiments. Subscriber device 310 may be implemented as a portable subscriber device that includes select knob 313, one or more antennas 315 for sending and receiving communications, one or more microphones 320, one or more speakers 325, which may be located on the back of subscriber device 310, touch-screen display 330, push-to-talk button 335, programmable buttons 340 and 345, and battery 350. A user of subscriber device 310 may use select knob 313 to select a talkgroup, which, in some embodiments, may affiliate subscriber device 310 with the selected talkgroup. The user may then initiate a radio call on the selected talkgroup by pressing push-to-talk button 335. While participating in an active radio call, also referred to as a radio call that is in an active state, subscriber device 310 may send and receive audio communications via antennas 315. Radio call audio may be provided to the user of subscriber device 310 via speakers 325 and may be received from the user via microphones 320. In some embodiments, subscriber device 310 may be implemented similar to subscriber device 110 as described for FIG. 1. Although subscriber device 310 is shown as a portable subscriber device, for example, that an emergency responder carries, subscriber device 310 may be another type of subscriber device. For example, in some embodiments, subscriber device 310 may be a mobile subscriber device that may be mounted in a vehicle.

Subscriber device 310 may be communicatively coupled via cable 355 to remote communication device 360. In some embodiments, subscriber device 310 may be communicatively coupled to remote communication device 360 via a wireless connection, for example, a Bluetooth connection. Remote communication device 360 may be implemented, for example, as a remote speaker microphone. As shown, remote communication device 360 may include programmable buttons 365 and 370, push-to-talk button 375, one or more microphones 380, and one or more speakers 385. Push-to-talk button 375, microphones 380, and speakers 385, may be used for similar purposes as push-to-talk button 335, microphones 320, and speakers 325, respectively. Although two programmable buttons are shown for each of subscriber device 310 and remote communication device 360, either device may include any suitable number of programmable buttons to each be assigned a particular function. For example, a programmable button may be assigned to suspend or disable scan and priority operations or to enable or disable a land mobile radio connection to a land mobile radio network or an alternative connection to an alternative network. In some embodiments, touch-screen display 330 may be configured with programmable soft buttons assigned to similar functions. In some embodiments, remote communication device 360 may be configured to be mounted, such that removing or replacing remote communication device 360 on its mount may cause a particular function, such as to restrict, suspend, or disable scan and priority operations or resume full scan and priority operations. For example, in some embodiments, a subscriber device may restrict scan and priority operations by reducing the number of talkgroup entries in the subscriber device's scan list, and the subscriber device may resume full scan and priority operations by using the full scan list. As another example, in some embodiments, a subscriber device may suspend or disable scan and priority operations by removing all talkgroup entries in the subscriber device's scan list, and the subscriber device may resume full scan and priority operations by using the full scan list.

In some embodiments, subscriber device 310 may be operable to communicate using different types of connections and to different types of networks. For example, subscriber device 310 may be operable to communication using a land mobile radio connection to a land mobile radio network and an alternative connection to an alternative network, where the alternative connection is different than the land mobile radio connection. Antennas 315 of subscriber device 310 may be operable to communicate using two or more communication standards or protocols including, but not limited to, a land mobile radio communication protocol and an alternative wireless communication protocol different from a land mobile radio communication protocol. Subscriber device 310 may support one or more types of transmission for communications, including but not limited to a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other land mobile radio protocols or standards. Subscriber device 310 may also support alternative protocols, including but not limited to, Wi-Fi protocols, satellite communication protocols, and cellular telephone protocols such as a Long Term Evolution (LTE), 4G, or 5G protocols, and the like.

Figure 4:
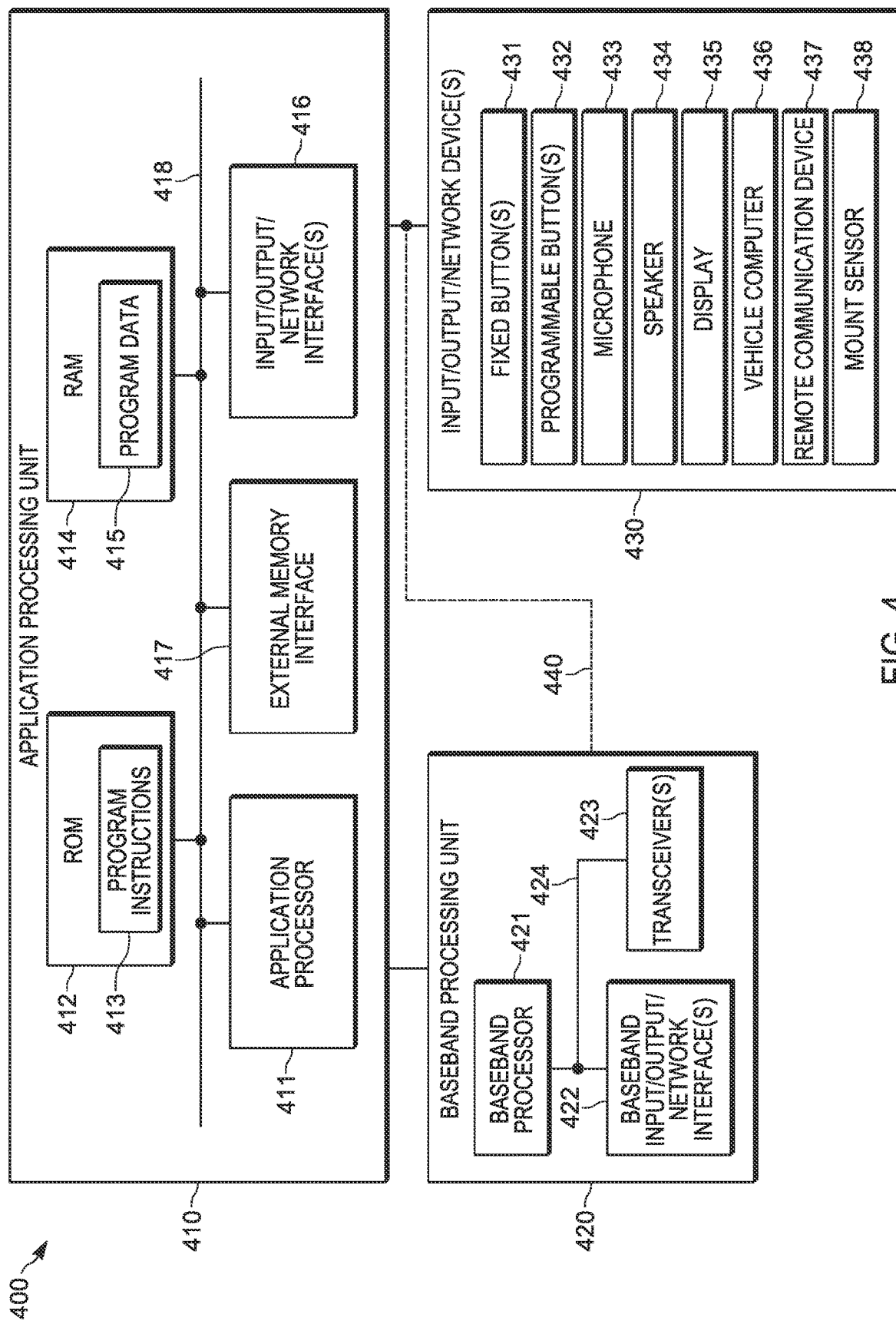
FIG. 4 is a block diagram illustrating selected elements of an example subscriber device for supporting remote scan and priority operations, in accordance with some embodiments.

Referring now to FIG. 4, there is provided a block diagram illustrating selected elements of an example subscriber device 400 for supporting remote scan and priority operations, in accordance with some embodiments. Subscriber device 400 may include application processing unit 410, baseband processing unit 420, and one or more input/output/network device(s) 430. Application processing unit 410 may be communicatively coupled to baseband processing unit 420 and input/output/network device(s) 430 via any suitable interface. In at least some embodiments, application processing unit 410 may include an application processor 411, a Read Only Memory (ROM) 412, a Random Access Memory (RAM) 414, one or more input/output/network interface(s) 416, and an external memory interface 417, all of which may be coupled to a system bus 418 through which they may communicate with each other. In various embodiments, application processor 411, which is an electronic processor, may include a microprocessor, a microcontroller, a system-on-chip, a field-programmable gate array, a programmable mixed-signal array, or, in general, any system or sub-system that includes nominal memory and that is capable of executing a sequence of instructions in order to control hardware elements of subscriber device 400.

In the illustrated embodiment, ROM 412 stores program instructions 413, at least some of which may be loaded and executed by application processor 411 to perform the methods described herein as being performed by a subscriber device. For example, any or all of the operations of method 500 illustrated in FIG. 5, method 1000 illustrated in FIG. 10, method 1100 illustrated in FIG. 11, method 1200 illustrated in FIG. 12A and FIG. 12B, and method 1500 illustrated in FIG. 15 may be performed by program instructions 413 executing on application processor 411 of subscriber device 400. In some embodiments, ROM 412 may be alternatively implemented using any suitable non-volatile storage medium such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory), a Flash memory, or the like. In some embodiments, program instructions 413 may include program instructions that when loaded and executed by application processor 411 implement other functionality features of subscriber device 400. For example, program instructions 413 may include program instructions that when loaded and executed by application processor 411 cause the processor to modify a scan list stored in a memory of subscriber device 400. In some embodiments, RAM 414 may, from time to time, store program data 415 that may represent inputs to and/or outputs from one or more methods illustrated in FIG. 5, FIG. 10, FIG. 11, FIGS. 12A and 12B, and FIG. 15, such as data received from one or more of input/output/network device(s) 430 through input/output/network interface(s) 416 or data received from external memory interface 417. RAM 414 may also store data used in performing other functions of subscriber device 400.

In at least some embodiments, application processing unit 410 may be communicatively coupled to baseband processing unit 420. Any suitable interface may be used to communicatively couple baseband processing unit 420 to application processing unit 410. For example, baseband processing unit 420 may be communicatively coupled to system bus 418 of application processing unit 410. As another example, baseband processing unit 420 may be communicatively coupled to application processing unit 410 over a network to input/output/network interface(s) 416 of application processing unit 410. As a further example, baseband processing unit 420 may be communicatively coupled directly to application processor 411 of application processing unit 410. In various embodiments, baseband processing unit 420 may include baseband processor 421, one or more baseband input/output/network interface(s) 422, and transceiver(s) 423, all of which may be communicatively coupled via bus 424. Baseband processor 421 may execute a real-time operation system to support public-safety and mission-critical communications without indeterminant delays in processing incoming or outgoing communications, including but not limited to one or more communications over a land mobile radio connection or an alternative connection as described herein. Baseband input/output/network interface(s) 422 may operate in a similar manner as input/output/network interface(s) 416 of application processing unit 410. Input/output/network device(s) 430 may be coupled to baseband input/output/network interface(s) 422 via application processing unit 410 or optionally via connection 440.

Transceiver(s) 423 of baseband processing unit 420 may, at various times, receive audio communications for playback over a speaker, such as speaker 434 or a speaker associated with remote communication device 437 of input/output/network device(s) 430, which may be implemented similar to speakers 325 and 385 as described for FIG. 3. Transceiver(s) 423 may also transmit audio captured using one or more microphones, such as microphone 433 or a microphone associated with remote communication device 437 of input/output/network device(s) 430, which may be implemented similar to microphones 320 and 380 as described for FIG. 3. An incoming audio signal may be received by transceiver(s) 423, processed by baseband processor 421, optionally sent to one or more components of application processing unit 410, such as application processor 411, for further processing, and output as audio on a speaker, such as speaker 434.

In various embodiments, transceiver(s) 423 may be or include a land mobile radio (LMR) transceiver, a cellular transceiver, such as a long term evolution (LTE), 4G, or 5G transceiver, a Wi-Fi transceiver, a satellite transceiver, or another type of transceiver for communications of audio, video, or any suitable combination thereof. Although transceiver(s) 423 is shown external to baseband processor 421, in some embodiments, baseband processor 421 may integrate transceiver(s) 423. In some embodiments, transceiver(s) 423 may provide input regarding the signal strength of a wireless connection, which may, for example, be used by application processing unit 410, or alternatively baseband processing unit 420, to determine whether a land mobile radio connection to a land mobile radio network is unavailable, and/or whether an alternative connection to an alternative network is available, in accordance with some embodiments disclosed herein. For example, to determine whether land mobile radio connections 125 or 135 and/or alternative connection 145 as described for FIG. 1 are available. In some embodiments, baseband processing unit 420 may provide input regarding the quality of a land mobile radio call that may be used by application processing unit 410, or alternatively baseband processing unit 420, to determine whether a land mobile radio connection to a land mobile radio network is unavailable in accordance with embodiments disclosed herein.

In at least some embodiments, input/output/network interface(s) 416 may include one or more analog input interfaces, such as interfaces using one or more A/D converters, or digital interfaces for receiving signals or data usable in performing the methods described herein. For example, input/output/network interface(s) 416 may include interfaces through which application processing unit 410 may be coupled to other elements of subscriber device 400, such as input/output/network device(s) 430. In some embodiments, input/output/network device(s) 430 may include, but are not limited to, fixed button(s) 431, programmable button(s) 432, microphone 433, speaker 434, display 435, vehicle computer 436, remote communication device 437, and mount sensor 438. Fixed button(s) 431 and programmable button(s) 432 may be pressed by a user and provide user input, for example, in the form of a digital signal, for processing by application processing unit 410. As an example, programmable button(s) 432 may be configured to provide an input that causes application processing unit 410 to suspend or disable scan operations and to enable full scan operations in accordance with some embodiments disclosed herein. As another example, fixed button(s) 431 may be configured to provide an input that causes application processing unit 410 to affiliate subscriber device 400 with a specific talkgroup. As yet another example, fixed button(s) 431, or programmable button(s) 432, may be configured to provide an input that causes application processing unit 410 evaluate and connect to networks. For example, in response to input from one or more fixed button(s) 431 or programmable button(s) 432, application processing unit 410 may determine that a land mobile radio connection to a land mobile radio network is unavailable, determine that an alternative connection to an alternative network is available, and/or connect subscriber device 400 to an alternative network, such as alternative network 140, using an alternative connection, such as alternative connection 145, as described for FIG. 1.

Display 435 may output data from application processing unit 410 and may provide touch-based user input from a touch-screen for processing by application processing unit 410. For example, in some embodiments, display 435 may be configured with touch-based soft buttons that may be pressed or otherwise selected by a user and provide user input similar to fixed button(s) 431 and programmable button(s) 432. Display 435 may provide information to a user regarding the availability of different network connections and provide touch-based user input to allow application processing unit 410 to determine that a land mobile radio connection is unavailable and/or that an alternative connection is available in accordance with some embodiments disclosed herein. Vehicle computer 436 may be communicatively coupled to application processing unit 410 via a network, such as a wireless network. In at least some embodiments, vehicle computer 436 may provide information associated with a user of subscriber device 400, such as the location of the user or the status of the vehicle. In some embodiments, application processing unit 410 may use information provided by vehicle computer 436, for example, the location of the user or the status of a wireless local area network (WLAN) connection, such as a Wi-Fi hotspot, or other alternative connection associated with the vehicle, to determine whether a land mobile radio connection to a land mobile radio network is unavailable and/or that an alternative connection to an alternative network is available. Any or all of these input/output/network device(s) 430 may be configured to send data to or receive data from application processing unit 410 over one or more data lines through input/output/network interface(s) 416, in various embodiments.

External memory interface 417 may include one or more interfaces through which application processing unit 410 may be coupled to an external memory (not shown). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Information stored in an external memory may include, for example, a scan list that may be used by application processing unit 410. For example, application processing unit 410 may use a scan list by modifying the scan list and/or sending the scan list over an alternative connection, for example, via input/output/network interface(s) 416, in accordance with some embodiments disclosed herein.

Figure 5:
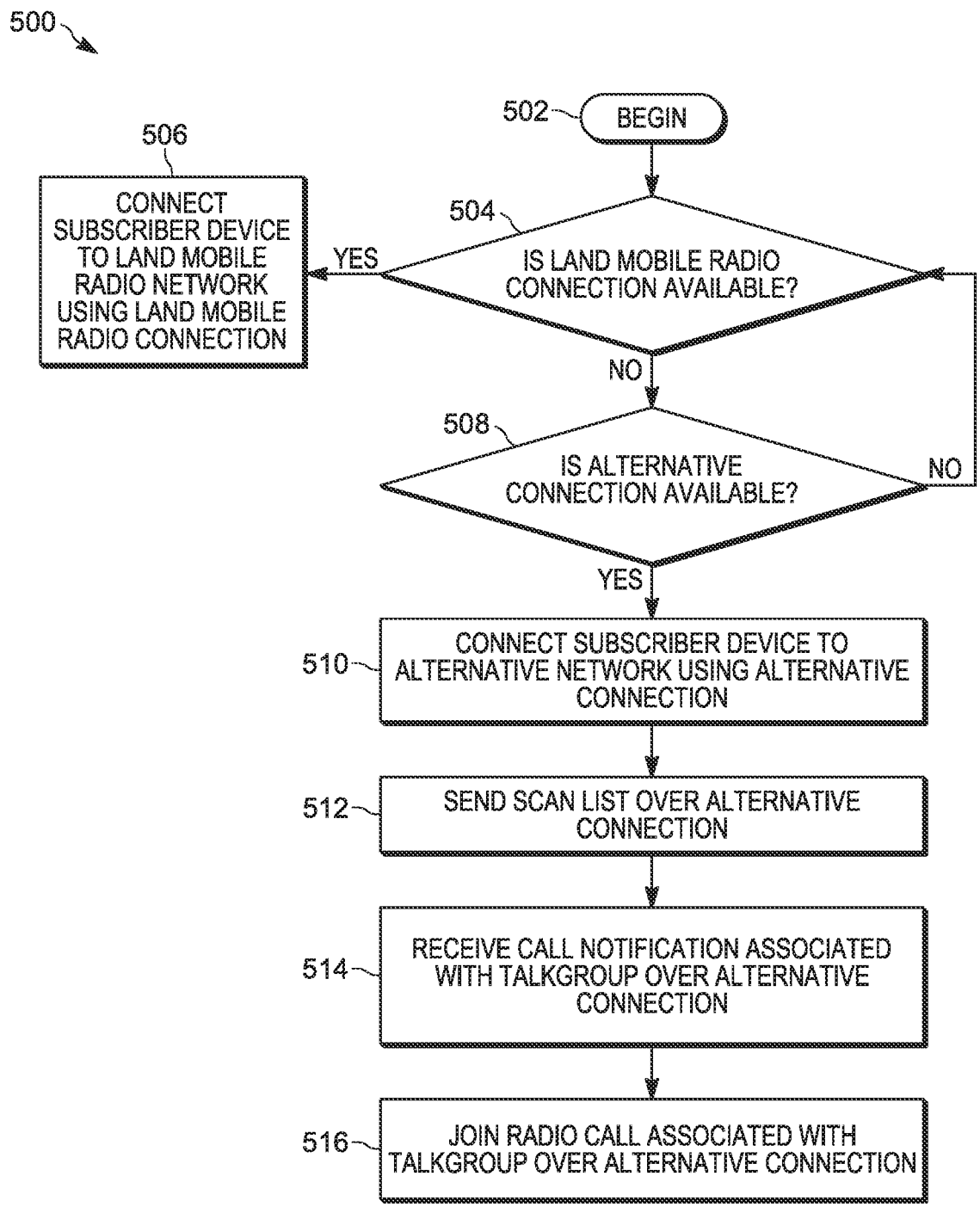
FIG. 5 is a flowchart illustrating selected elements of an example method for supporting remote scan and priority operations, in accordance with some embodiments.

Referring now to FIG. 5, there is provided a flowchart illustrating selected elements of an example method 500 for supporting remote scan and priority operations, in accordance with some embodiments. In this example embodiment, method 500 begins at block 502 and continues at block 504 with determining whether a land mobile radio connection to a land mobile radio network is available for a subscriber device. The subscriber device may be implemented similar to subscriber device 110 as described for FIG. 1, subscriber device 310 as described for FIG. 3, or subscriber device 400 as described for FIG. 4. The land mobile radio connection may be implemented similar to land mobile radio connection 125 and 135 as described for FIG. 1. As explained above, a land mobile radio connection may be unavailable for any of a number of different reasons. For example, the subscriber device may be out of range of a radio frequency site of the land mobile radio network, the radio frequency site may be experiencing an outage, the signal integrity may be insufficient, and the like. In some embodiments, the subscriber device may automatically determine that the land mobile radio connection is unavailable without input from the user of the subscriber device. As an example, a police officer may be patrolling a part of a city that is out of range of a radio frequency site and the officer's subscriber device may automatically detect that the radio frequency site is not within range and determine that the land mobile radio connection is not available. As another example, the subscriber device may determine that the land mobile radio connection is unavailable, for example, because the radio call quality over the land mobile radio connection to a radio frequency site is poor (e.g., a signal-to-noise ratio below a threshold, the number of dropped communications or transmissions exceeding a threshold, and the like) rendering the land mobile radio network unavailable. In some embodiments, the officer, or any other user, may be able to manually configure the subscriber device to connect to an alternative network that is available, for example, by selecting the alternative connection from a list of available connections or by otherwise disabling the land mobile radio connection, and thereby causing the subscriber device to determine that the land mobile radio connection is unavailable. In some embodiments the subscriber device may be configured with a programmable soft or hard button, for example, programmable buttons 340 and 345 as described for FIG. 3, that allows the user to disable the land mobile radio connection, thereby causing the subscriber device to determine that the land mobile radio connection is unavailable.

When the subscriber device determines that a land mobile radio connection is available, method 500 continues at block 506 with connecting the subscriber device to the land mobile radio network using the land mobile radio connection. When, at block 504, it is determined that a land mobile radio connection is unavailable, method 500 continues to block 508 with determining whether an alternative connection to an alternative network is available. The alternative network may be implemented similar to alternative network 140 as described for FIG. 1 or alternative network 265 as described for FIG. 2. The alternative connection may be implemented similar to alternative connection 145 as described for FIG. 1. When at block 508 of method 500 it is determined that an alternative connection is unavailable, method 500 may return to block 504. When it is determined that an alternative connection is available, method 500 continues to block 510 with connecting the subscriber device to the alternative network using the alternative connection. Method 500 continues at block 512 with sending a scan list over the alternative connection. In some embodiments, the scan list may contain one or more entries, which may also be referred to as talkgroup entries, in which each entry may be associated with a talkgroup. For example, an entry may be associated with a talkgroup by including an identifier associated with the talkgroup, also called a talkgroup identifier. In some embodiments, each talkgroup entry in the scan list may include a priority level associated with the talkgroup. The scan list may be implemented similar to scan lists 780, 785, 790, and 795 as described for FIG. 7B. Skilled artisans will appreciate that one or more copies of a scan list may be created to be sent over the alternative network or to be used to update a record in a scan list repository.

In some embodiments, the subscriber device may send the scan list to a gateway over the alternative connection to the alternative network. The gateway may be implemented similar to gateway 160 as described for FIG. 1 or gateway 210 as described for FIG. 2. In some embodiments, a first subscriber device may connect to an alternative network through a second subscriber device that is connected to an alternative network using an alternative connection. In this configuration, the second subscriber device may operate as a relay or as part of a mesh network of subscriber devices. For example, the first subscriber device may send a request addressed to the gateway through the second device and when a response from the gateway is received, the first subscriber device may determine that an alternative connection is available and connect to the alternative network via the second subscriber device. In some embodiments, a first subscriber device may connect to an alternative network through a network device that is connected to an alternative network. For example, the subscriber device may be connected to a Wi-Fi router that is connected to a long term evolution (LTE) modem for access to an LTE network.

In some embodiments, the subscriber device may be provisioned with a pre-configured scan list that includes one or more entries in which each entry identifies a talkgroup and includes a priority level associated with the talkgroup. In other embodiments, the user of the subscriber device may configure a scan list manually on the device or alter a scan list manually on the device before the scan list is sent at block 512. A priority level may be, for example, a character, such as a letter or number, that indicates the priority of a talkgroup relative to the other talkgroups in a scan list. Any suitable lettering, numbering, or combination thereof may be used. Examples for lettering include using the letter 'A' to represent the highest or lowest priority level. Examples for numbering may include using a '0' or '1' to represent the lowest or highest priority level, a '2' to represent the second highest priority level, and the like. In some embodiments, when a priority level is not specified for a particular talkgroup or talkgroup entry, that talkgroup or talkgroup entry may be treated as having a default priority level, which may be equivalent to the lowest priority level. For example, the default priority level may be indicated by a null value where no value for the priority level is specified. As another example, a default priority level value may be assigned by the subscriber device that indicates the lowest priority level, for example, a priority level of zero.

Method 500 continues at block 514 with receiving a call notification associated with a talkgroup that includes information regarding an active radio call, also referred to as a radio call that is in an active state, associated with the talkgroup over the alternative connection to the alternative network. In some embodiments, the call notification that is received includes an identifier for the talkgroup associated with the radio call and other information that may be used to join the radio call, such as the radio channel for to the radio call. In some embodiments, the call notification may be received from a gateway that is a component of the system infrastructure. The gateway may receive the call notification from a zone controller of the infrastructure associated with the land mobile radio network. The zone controller may be implemented similar to zone controller 150 as described for FIG. 1. The gateway may evaluate the call notification, for example, by comparing the talkgroup identified in the call notification to the talkgroups identified in the talkgroup entries in a remote scan list received by the gateway from a subscriber device. When there is a match, the gateway may determine to forward or send the call notification to the subscriber device, for example, based on a comparison of priority levels.

Method 500 continues at block 516 with the subscriber device joining the radio call associated with the talkgroup over the alternative connection to the alternative network. After the subscriber device joins the radio call, the subscriber device may begin to send and/or receive call audio communications for the radio call over the alternative connection to the alternative network. In some embodiments, the subscriber device may be limited to receiving call audio communications for certain radio calls associated with certain talkgroups in the scan list. For example, when the subscriber device's scan list includes an agency-wide talkgroup that is used to communicate instructions to all agency personnel at the same time (e.g., a talkgroup that includes all subscriber devices in a city's police and/or fire departments used to direct a coordinated emergency response), the subscriber device may be able to receive but not send audio communications to prevent an individual user of a subscriber device from responding to all other subscriber devices in the talkgroup. As another example, a user of a subscriber device may want to include a talkgroup in the subscriber device's scan list that is a listen-only talkgroup to receive call audio communications for that talkgroup without the ability to respond by sending call audio communications. For example, a firefighter in one jurisdiction may want to listen in on radio calls from a neighboring jurisdiction that is part of the same land mobile radio network, that shares a zone controller for example, when there are no active radio calls in the firefighter's own jurisdiction. In other embodiments, the subscriber device may also be able to send and receive call audio communications over the alternative connection to the alternative network.

Figure 6:
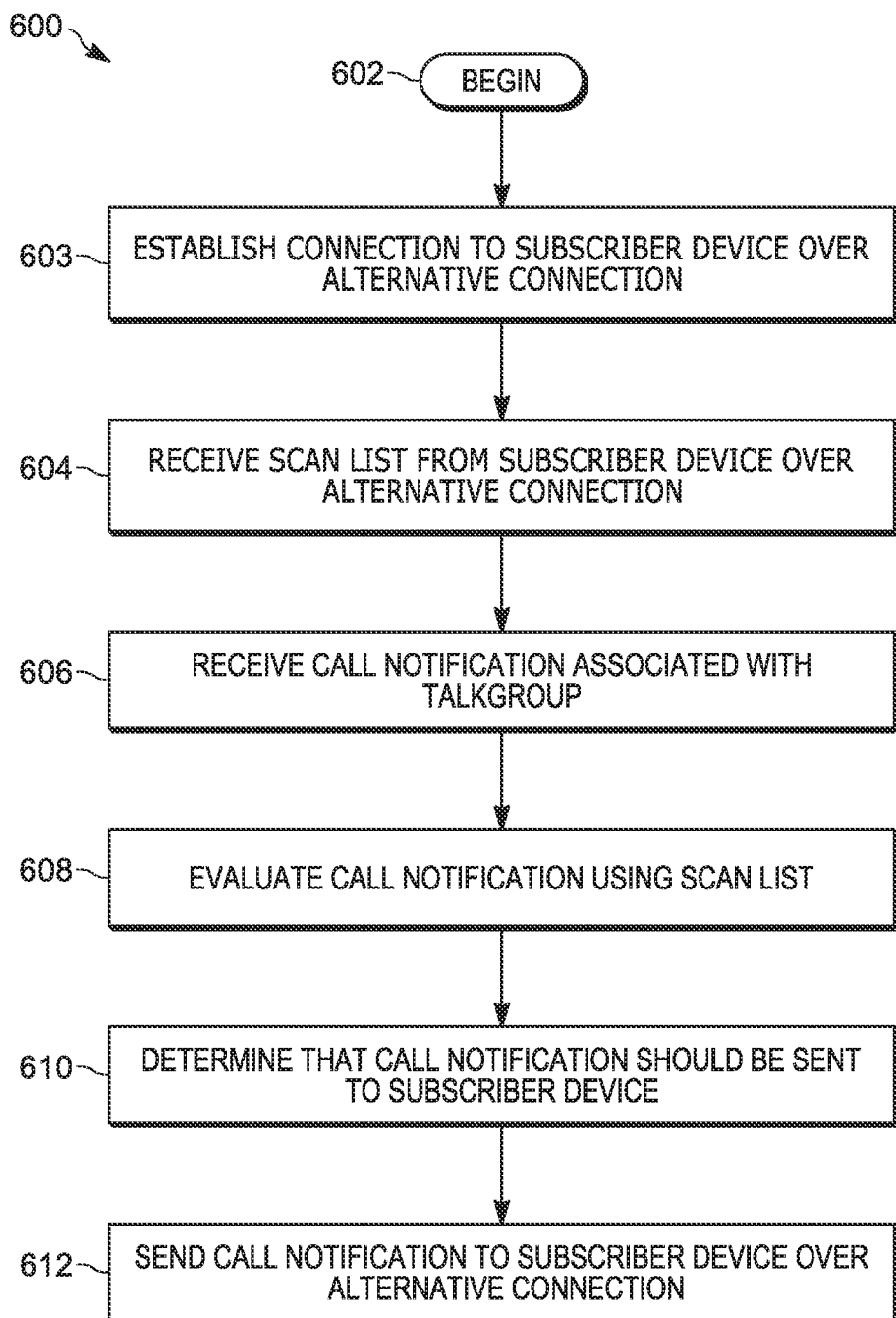
FIG. 6 is a flowchart illustrating selected elements of an example method for remote scan and priority operations, in accordance with some embodiments.

Referring now to FIG. 6, there is provided a flowchart illustrating selected elements of an example method 600 for remote scan and priority operations, in accordance with some embodiments. One or more blocks of method 600 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 600 begins at block 602 and continues at block 603 with establishing a connection to a subscriber device over an alternative connection to an alternative network. The alternative network may be implemented similar to alternative network 140 as described for FIG. 1 or alternative network 265 as described for FIG. 2. The alternative connection may be implemented similar to alternative connection 145 as described for FIG. 1. Method 600 continues at block 604 with receiving a scan list from a subscriber device over an alternative connection to an alternative network. In some embodiments, the scan list may contain one or more entries, also be referred to as talkgroup entries, in which each entry may be associated with a talkgroup. For example, an entry may be associated with a talkgroup by including an identifier associated with the talkgroup, also called a talkgroup identifier. In some embodiments, each talkgroup entry in the scan list may include a priority level associated with the talkgroup. The scan list may be implemented similar to scan lists 780, 785, 790, and 795 as described for FIG. 7B. Skilled artisans will appreciate that one or more copies of a scan list may be created to be sent over the alternative network or to be used to update a record in a scan list repository. As described above, the alternative connection to the alternative network is different than and is alternative to a land mobile radio connection to a land mobile radio network. In some embodiments, the scan list may be received by a gateway, which may be implemented similar to gateway 160 as described for FIG. 1 or gateway 210 as described for FIG. 2.

Method 600 continues at block 606 with receiving a call notification associated with a talkgroup that includes information regarding an active radio call, also referred to as a radio call that is in an active state, associated with the talkgroup. In some embodiments, the call notification that is received includes an identifier for the talkgroup associated with the radio call and other information that may be used to join the radio call, such as the radio channel for to the radio call. In some embodiments, the call notification may be sent by a zone controller, which may be implemented similar to zone controller 150 as described for FIG. 1, to the gateway.

Method 600 continues at block 608 with evaluating the call notification using the scan list. In some embodiments, the call notification may be evaluated by a gateway of the system infrastructure. In some embodiments, evaluating the call notification may include comparing a talkgroup identifier in or otherwise associated with the call notification with one or more talkgroup identifiers in one or more talkgroup entries in the scan list. The comparison may be used to determine whether the talkgroup identifier associated with the call notification matches a talkgroup identifier in the scan list. The call notification may be evaluated using the scan list when, for example, the received scan list is used, when a copy of the scan list is used, or when information from the received scan list is otherwise used.

Method 600 continues at block 610 with determining that the call notification should be sent to the subscriber device. In some embodiments, the determination may be made by a gateway of the system infrastructure. In some embodiments, determining that the call notification should be sent to the subscriber device may include a comparison of priority levels associated with talkgroups based on the talkgroup entries in a scan list associated with the subscriber device. For example, when the subscriber device is not participating in a radio call, any call notification that is associated with a talkgroup that is in the scan list received from the subscriber device may result in a determination that the call notification should be sent to the subscriber device. As another example, when the subscriber device is participating in a radio call associated with a different talkgroup, it may be determined that the received call notification should be sent to the subscriber device if the priority level associated with the talkgroup identified in the call notification is higher than the priority level associated with the talkgroup associated with the current radio call. In this example, the gateway will not interrupt the current radio call unless a call notification for a different radio call associated with a higher priority talkgroup is received. The gateway may determine the call notification should be sent to the subscriber device based on a comparison of the priority levels from the talkgroup entries in the scan list that are associated with the active talkgroup and the talkgroup identified in the call notification. Thus, portions of system infrastructure may remotely perform scan and priority operations that, in at least some embodiments, are comparable to or better than local scan operations performed by the subscriber device during ordinary land mobile radio operation.

Method 600 continues at block 612 with sending the call notification to the subscriber device over the alternative connection. In some embodiments, the call notification is sent to the subscriber device from the gateway. In some embodiments, the gateway may add or remove information from the call notification received at block 606 before sending the call notification to the subscriber device at block 612. In some embodiments, the subscriber device may be configured to automatically join the radio call associated with the call notification.

In some embodiments, the elements of method 500 may be performed by a subscriber device and the elements of method 600 may be performed by one or more components of the system infrastructure, such as the components of system 100 which may be implemented similar to those as described for FIG. 1. The operation of the different components of the system infrastructure may be illustrated by the following example.

Figure 7A:
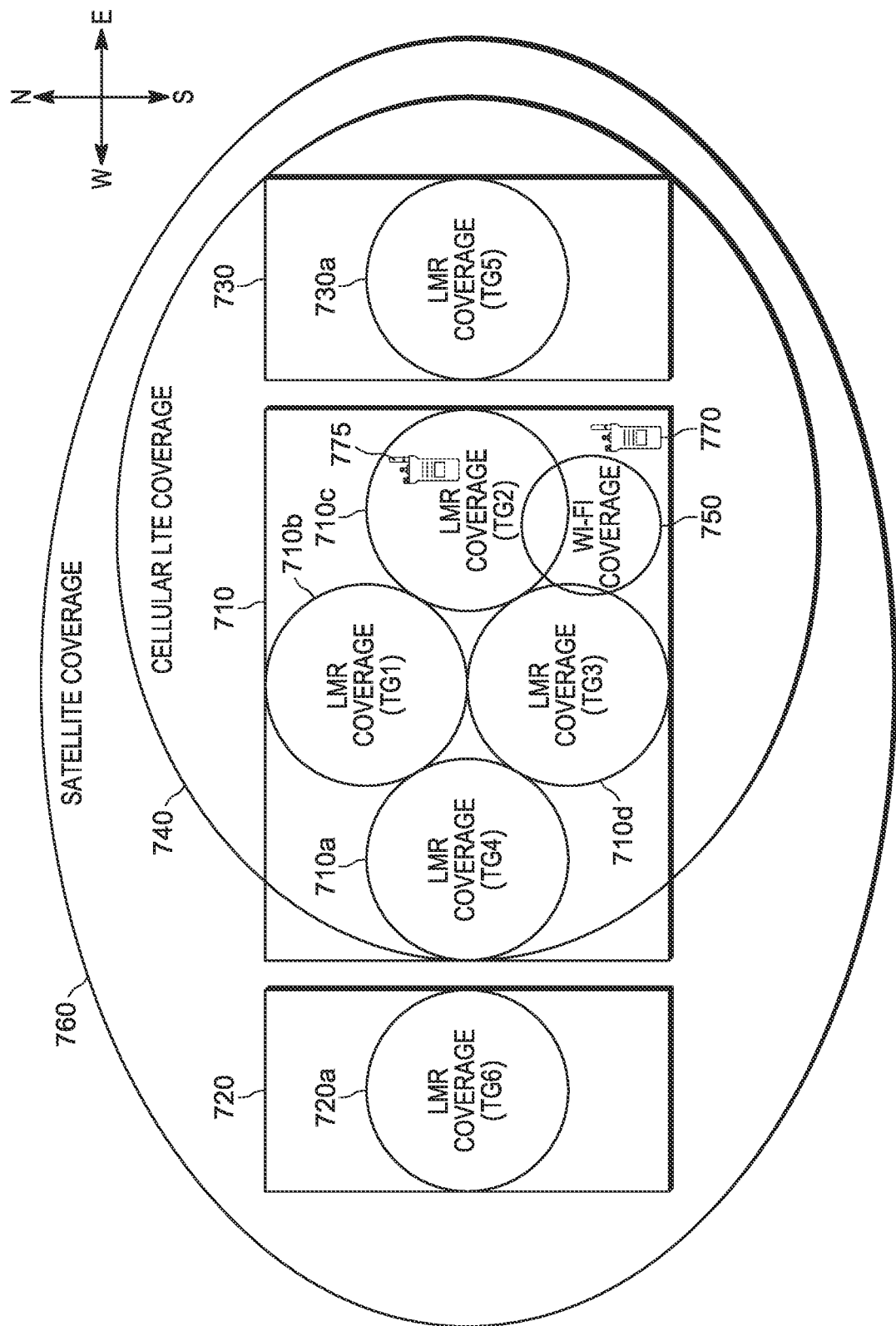
FIG. 7A illustrates an example environment for remote scan and priority operations, in accordance with some embodiments.

Referring now to FIG. 7A, there is shown an example environment for remote scan and priority operations, in accordance with some embodiments. A land mobile radio network may include a zone controller (not shown in FIG. 7A) that is responsible for public-safety communications for City 710 and also for Suburbs 720 and 730, each of which may have separate police and fire departments. The land mobile radio network may include a number of radio frequency sites 710*a*, 710*b*, 710*c*, and 710*d* dispersed over City 710, radio frequency site 720*a* in Suburb 720, and radio frequency site 730*a* in Suburb 730. Radio frequency sites 710*a*, 710*b*, 710*c*, 720*a*, and 730*a* may collectively provide land mobile radio (LMR) coverage over portions of City 710 and Suburbs 720 and 730.

At the same time, a cellular telephone network 740, such as, for example, a long-term evolution wireless technology (LTE) network, may provide cellular LTE coverage over all or a portion of City 710 and Suburb 730, wireless local area network (WLAN) 750 may provide Wi-Fi coverage over a portion of City 710, and a satellite network 760 may provide satellite coverage over all of City 710 and Suburbs 720 and 730. Although certain types of alternative networks are illustrated in FIG. 7A, such as cellular telephone network 740, WLAN network 750 and satellite network 760, other types may be used. It will be appreciated by skilled artisans that different coverage areas may overlap in other ways. Within the land mobile radio network, a number of different talkgroups may be defined. For example, the City 710 police department may have different talkgroups established for the subscriber devices used by officers patrolling different parts of the city. In the illustrated example, the subscriber devices for officers patrolling the north side of City 710 may be affiliated with talkgroup one that uses the identifier TG1, devices for those patrolling the east side of City 710 may be affiliated with talkgroup two that uses the identifier TG2, devices for those patrolling the south side of City 710 may be affiliated with talkgroup three that uses identifier TG3, and devices for those patrolling the west side of City 710 may be affiliated with talkgroup four that uses identifier TG4. Similarly, for example, the subscriber devices for police officers patrolling Suburb 730 police department's subscriber devices may be affiliated with talkgroup five that uses identifier TG5, and the Suburb 720 police department's subscriber devices may be affiliated with talkgroup six that uses identifier TG6. A subscriber device may be affiliated with a talkgroup by, for example, selecting the talkgroup on the subscriber device. A talkgroup may be selected by using a select knob, which may be implemented similar to select knob 313 as described for FIG. 3, or any other suitable hard or soft button configured to select a talkgroup as the affiliated talkgroup. Although separate talkgroups are shown for each LMR coverage area, a talkgroup may span any number of LMR coverage areas and an LMR coverage area may include any number of talkgroups.

Figure 7B:
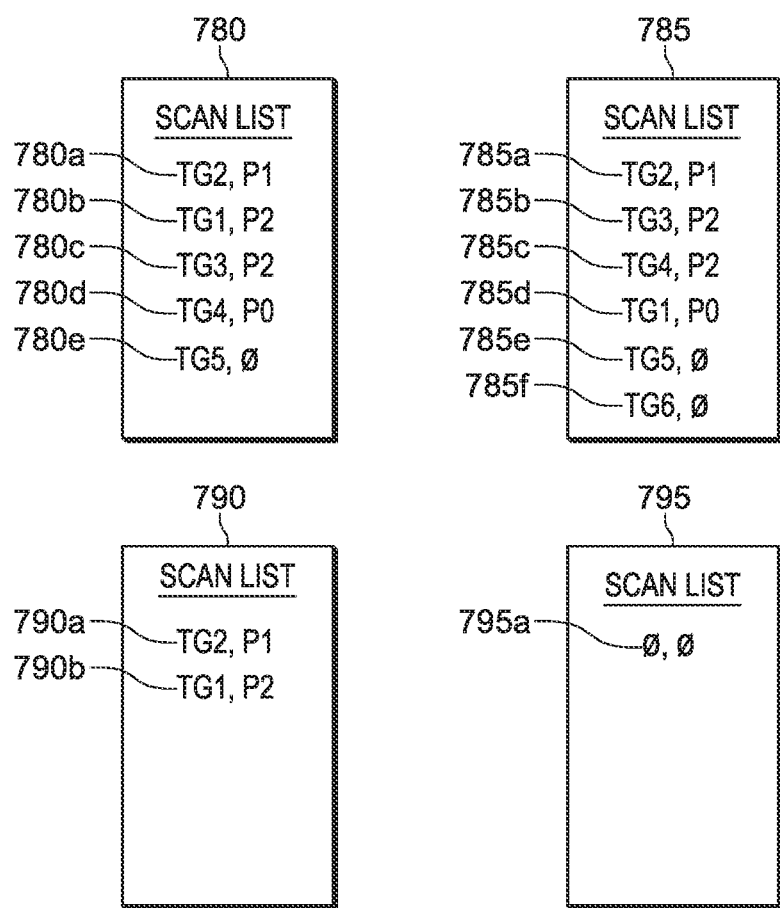
FIG. 7B illustrates example scan lists for remote scan and priority operations, in accordance with some embodiments.

In an example scenario, a police officer in City 710 may procure a subscriber device 770 to use while patrolling certain parts of City 710. The officer may configure a scan list 780, as shown in FIG. 7B, on subscriber device 770 that includes a number of talkgroup entries 780*a*, 780*b*, 780*c*, 780*d*, and 780*e*, with each entry including an identifier for a talkgroup and a priority level for that talkgroup, in accordance with some embodiments. When, for example, the officer patrols the east side of City 710, the officer may be interested in affiliating the officer's subscriber device to talkgroup two (TG2) and may include talkgroup two (TG2) in scan list 780 with the highest priority level, for example, priority level one indicated by P1 in talkgroup entry 780*a*. In some embodiments, the subscriber device may automatically include the affiliated talkgroup in its scan list and assign it a priority, for example, the highest priority. The officer may also be interested in listening in on radio calls for talkgroups associated with the other areas of City 710 when there are no active radio calls for talkgroup two (TG2), for example, talkgroup one (TG1) for the north side of City 710, talkgroup three (TG3) for the south side of City 710, and talkgroup four (TG4) for the west side of City 710. The officer may want to give the talkgroups TG1 and TG3 the second highest priority level, for example, priority level two indicated by P2 in talkgroup entries 780*b* and 780*c*, because they may be associated with areas of City 710 adjacent to the east side where the officer is patrolling. The officer may further want to give TG4, which is associated with the west side of City 710, the lowest priority level, for example, priority level P0, indicated by P0 in talkgroup entry 780*d*. The officer may also be interested in listening in on radio calls for talkgroup TG5 associated with Suburb 730, because, for example, Suburb 730 is located east of City 710 near the area where the officer will be patrolling. The officer may not wish to provide a priority level for TG5 as indicated by the null value symbol (0) in talkgroup entry 780*e*, in which case the subscriber device may assign the lowest priority level by default.

As the officer patrols the east side of City 710, the officer may move in and out of areas of land mobile radio network coverage. When the officer is in an area where land mobile radio network coverage is available, for example, within the coverage area of radio frequency site 710*c*, subscriber device 770 may connect to the land mobile radio network and perform local scan operations by monitoring the broadcast control channel for call notifications associated with the talkgroups included in the entries within scan list 780.

When the officer responds to an emergency (e.g., in the southeast corner of City 710), subscriber device 770 may determine that a land mobile radio connection is unavailable, because, for example, subscriber device 770 is not within the coverage area of any of the radio frequency sites, which may also be referred to as being out of range of a radio frequency site. In this scenario, subscriber device 770 may determine that an alternative connection to an alternative network is available, such as a cellular connection to cellular telephone network 740 or a satellite connection to satellite network 760, because, for example, subscriber device 770 is within the coverage area of those alternative networks. After determining that an alternative connection to an alternative network is available, subscriber device 770 may connect to one of the alternative networks, for example, cellular telephone network 740 and register with the zone controller of the land mobile radio network infrastructure via a gateway by, for example, sending a registration request message to the gateway over an alternative connection to the cellular telephone network 740.

Skilled artisans will appreciate that the connection to the cellular telephone network is described in this example for illustrative purposes and that other types of alternative connections may be used. Further, although the cellular and satellite networks are described in this example as different networks, they may alternatively provide different alternative connection options to the same alternative network. In some embodiments, more, less, or different alternative connections and/or alternative networks may be used. For example, the alternative network and alternative connection may be implemented similar to alternative network 140 and alternative connection 145 as described for FIG. 1. In some embodiments, subscriber device 770 may be configured to automatically choose an alternative connection. For example, subscriber device 770 may be configured to determine which alternative connection has the best signal strength. As another example, subscriber device 770 may be configured to choose one type of alternative connection over another based on other factors, such as the cost of sending data, data security, and the like. For example, subscriber device 770 may be configured to choose an available Wi-Fi connection or a cellular connection as opposed to an available satellite connection due to the cost of sending data over the alternative connection.

In some embodiments, subscriber device 770 may include a copy of scan list 780 with or in the registration request message sent, for example, to a gateway of the system infrastructure. The gateway may receive the registration request message, extract the copy of scan list 780, and forward or send a registration request to the zone controller. In some embodiments, the gateway may exclude the copy of scan list 780 with the registration request when sent to the zone controller. In some embodiments, the gateway may send a copy of scan list 780, one or more portions of the copy of scan list 780, or any information from scan list 780 to the zone controller in the same message as the registration request. In some embodiments, the gateway may send a copy of scan list 780, one or more portions of the copy of scan list 780, or any information from scan list 780 to the zone controller in a separate message than the message for the registration request.

In response to the registration request, the zone controller may send to the gateway a call notification that may include information regarding an active radio call associated with a talkgroup. The gateway may evaluate the call notification using the copy of scan list 780. When, for example, the call notification includes information regarding an active radio call associated with talkgroup one, by, for example, including the identifier TG1 and a channel assignment for the radio call, the gateway may thus determine that the call notification should be sent to subscriber device 770 and send the call notification to subscriber device 770 over the cellular connection, which is, in this example, the alternative connection, to the cellular LTE network.

Subscriber device 770 may receive the call notification over the alternative connection to the alternative network, join the radio call that is associated with the call notification using the alternative connection to the alternative network, and begin to send and/or receive radio call audio communications over the alternative connection. When subscriber device 770 moves back into an area of land mobile radio network coverage, for example, within range of radio frequency site 710*c*, subscriber device 770 may register with the zone controller via radio frequency site 710*c* and resume ordinary land mobile radio operation, including performing local scan operations at subscriber device 770. If subscriber device 770 later moves to an area where the land mobile radio network is unavailable and an alternative network is available (e.g., wireless local area network (WLAN) 750), it may connect to the alternative network and again register with the zone controller via the gateway in a similar manner as described above for the cellular LTE connection. Subscriber device 770 may then again send scan list 780 to the gateway over, for example, a wireless local area network connection, such as a Wi-Fi connection, to the alternative network.

In some embodiments, the gateway may retain a copy of scan list 780, for example, stored in a record associated with subscriber device 770 in a scan list repository, such as scan list repository 255 as described for FIG. 2, that was previously sent by subscriber device 770. When one or more portions of the current scan list 780 are unchanged from the previously sent copy, subscriber device 770 may not need to resend scan list 780 to the gateway. In such a scenario, the gateway may use the retained copy of scan list 780 to evaluate and determine whether future call notifications should be sent to subscriber device 770 over the alternative connection. In some embodiments, subscriber device 770 may be configured to send its scan list to the gateway anytime there is a change to the scan list. As described below, in some embodiments, subscriber device 770 may be configured to dynamically send its scan list or a modified version of its scan list to the gateway to change the way remote scan and priority operations are performed by the gateway. In some embodiments, the dynamic reporting of the scan list by the subscriber device to the gateway may allow the gateway to perform remote scan and priority operations for the subscriber device that are on par with or nearly on par with the local scan operations the subscriber device would otherwise perform during ordinary land mobile radio operation.

Figure 8:
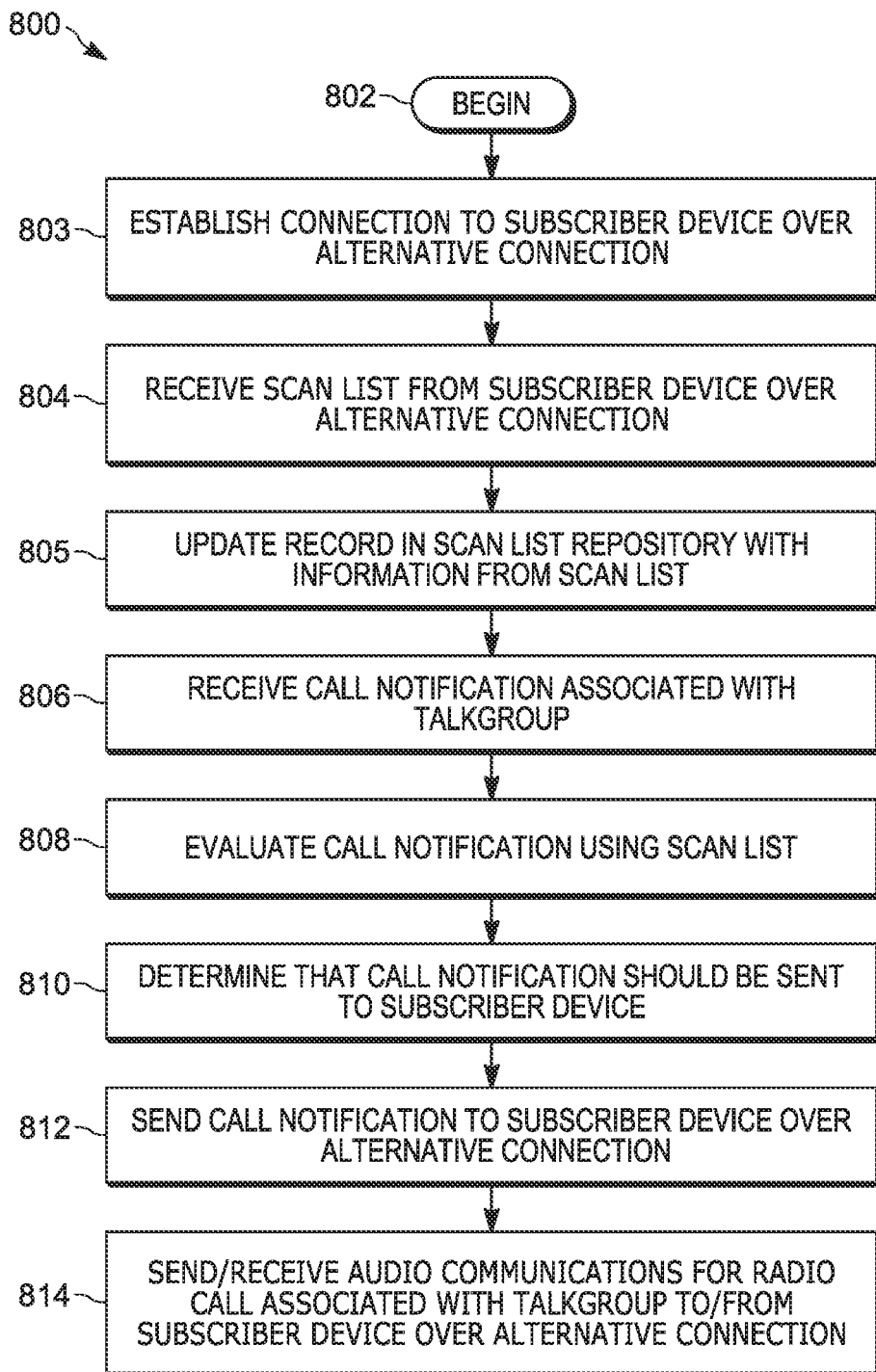
FIG. 8 is a flowchart illustrating selected elements of an example method for remote scan and priority operations, in accordance with some embodiments.

Referring now to FIG. 8, there is provided a flowchart illustrating selected elements of an example method 800 for remote scan and priority operations, in accordance with some embodiments. One or more blocks of method 800 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 800 begins at block 802 and continues at block 803 with establishing a connection to a subscriber device over an alternative connection to an alternative network. Method 800 continues at block 804 with receiving a scan list from a subscriber device over an alternative connection to the alternative network. As described above, the alternative connection to the alternative network is different than and is alternative to a land mobile radio connection. The alternative network may be implemented similar to alternative network 140 as described for FIG. 1 and alternative network 265 as described for FIG. 2. The alternative connection may be implemented similar to alternative connection 145 as described for FIG. 1. In some embodiments, the scan list may be received by a gateway, which may be implemented similar to gateway 160 as described for FIG. 1 and gateway 210 as described for FIG. 2. The scan list may be implemented similar to scan lists 780, 785, 790, and 795 as described for FIG. 7B. Block 804 may be implemented similar to block 604 as described for FIG. 6.

Method 800 continues at block 805 with updating a record associated with the subscriber device in a scan list repository with information from the scan list received from the subscriber device at block 804. In some embodiments, the scan list repository may be communicatively coupled to the gateway and the gateway may be configured to update the record in the scan list repository. The scan list repository may be implemented similar to scan list repository 180 as described for FIG. 1. In some embodiments, when the scan list repository does not yet contain a record associated with the subscriber device, a record associated with the subscriber device may be updated by creating a record associated with the subscriber device and populating the record with information from the received scan list. In some embodiments, when the scan list repository already contains a record associated with the subscriber device, the entry may be updated by comparing one or more portions of the information in the entry with one or more portions of the information in the received scan list. When any portion of information compared is different, the gateway may update the record by reconciling the difference. In some embodiments, a record associated with the subscriber device may be updated by determining that no changes are necessary and the record is up to date. After any changes to the entry are made, the update of the record may be completed by storing the updated record to the scan list repository.

Method 800 continues at block 806 with receiving a call notification associated with a talkgroup that includes information regarding an active radio call, also referred to as a radio call that is in an active state, associated with the talkgroup. In some embodiments, the call notification may be received by a gateway from a zone controller. The zone controller may be implemented similar to zone controller 150 as described for FIG. 1. Block 806 may be implemented similar to block 606 as described for FIG. 6. Method 800 continues at block 808 with evaluating the call notification using a scan list. In some embodiments, the call notification may be evaluated by a gateway. In some embodiments, the call notification may be evaluated using the scan list by using a copy of the scan list or by using the record or an updated record in the scan list repository. Block 808 may be implemented similar to block 608 as described for FIG. 6. Method 800 continues at block 810 with determining that the call notification should be sent to the subscriber device. In some embodiments, the determination may be made by a gateway. In some embodiments, determining that the call notification should be sent to the subscriber device may include a comparison of priority levels associated with talkgroups. Block 810 may be implemented similar to block 610 as described for FIG. 6. Method 800 continues at Block 812 with sending the call notification to the subscriber device over the alternative connection. In some embodiments, the call notification, when sent to the subscriber device, may include more or less information than it did when it was received at block 806. Block 812 may be implemented similar to block 612 as described for FIG. 6. Method 800 continues at block 814 with sending and/or receiving audio communications for a radio call associated with the talkgroup to and/or from the subscriber device over the alternative connection.

Figure 9:
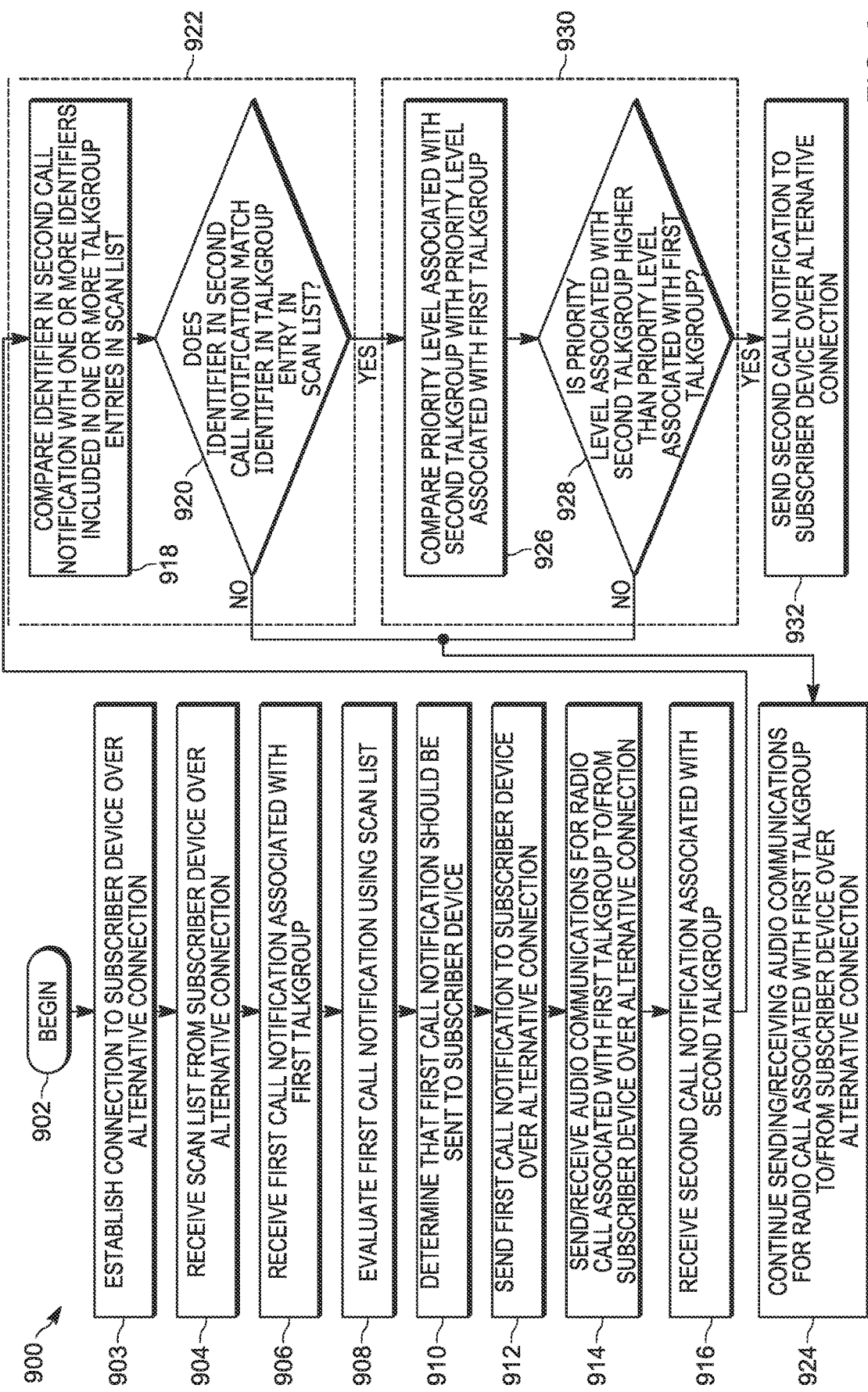
FIG. 9 is a flowchart illustrating selected elements of an example method for remote scan and priority operations including interrupting an active radio call, in accordance with some embodiments.

Referring now to FIG. 9, there is provided a flowchart illustrating selected elements of an example method 900 for remote scan and priority operations including interrupting an active radio call, in accordance with some embodiments. One or more blocks of method 900 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 900 begins at block 902 and continues at block 903 with establishing a connection to a subscriber device over an alternative connection to an alternative network. Method 900 continues at block 904 with receiving a scan list from a subscriber device over an alternative connection to an alternative network. As described above, the alternative connection to the alternative network is different than and is alternative to a land mobile radio connection. The alternative network may be implemented similar to alternative network 140 as described for FIG. 1 and alternative network 265 as described for FIG. 2. The alternative connection may be implemented similar to alternative connection 145 as described for FIG. 1. In some embodiments, the scan list may be received by a gateway. The scan list may be implemented similar to scan lists 780,

785, 790, and 795 as described for FIG. 7B. Block 904 may be implemented similar to block 604 as described for FIG. 6.

Method 900 continues at block 906 with receiving a first call notification associated with a first talkgroup that includes information regarding an active radio call, also referred to as a radio call that is in an active state, associated with the first talkgroup. In some embodiments, the information may include an identifier associated with the first talkgroup, and the first call notification may thus be referred to as being associated with the first talkgroup based on the talkgroup identifier. In some embodiments, the first call notification may be received by a gateway from a zone controller. The zone controller may be implemented similar to zone controller 150 as described for FIG. 1. Block 906 may be implemented similar to block 606 as described for FIG. 6.

Method 900 continues at block 908 with evaluating the first call notification using the scan list. In some embodiments, the first call notification may be evaluated by a gateway. Block 908 may be implemented similar to block 608 as described for FIG. 6. Method 900 continues at block 910 with determining that the first call notification should be sent to the subscriber device. In some embodiments, the determination may be made by a gateway. In some embodiments, determining that the call notification should be sent to the subscriber device may include a comparison of priority levels between the priority level for the talkgroup associated with the call notification and the priority level for the talkgroup associated with the active radio call based on the talkgroup entries in a scan list associated with the subscriber device. Block 910 may be implemented similar to block 610 as described for FIG. 6.

Method 900 continues at block 912 with sending the first call notification to the subscriber device over the alternative connection. In some embodiments, the first call notification, when sent to the subscriber device, may include more or less information than it did when it was received at block 906. Block 912 may be implemented similar to block 612 as described for FIG. 6. Method 900 continues at block 914 with sending audio communications for a radio call associated with the talkgroup to the subscriber device over the alternative connection and/or receiving audio communications for the radio call associated with the talkgroup from the subscriber device over the alternative connection.

The method continues at block 916 with receiving a second call notification including information regarding an active radio call associated with a second talkgroup. In some embodiments, the information may include an identifier associated with the second talkgroup, and the second call notification may thus be referred to as being associated with the second talkgroup based on the talkgroup identifier. Block 916 may be implemented similar to block 906 regarding the first call notification. In some embodiments, the second call notification may be received while the radio call associated with the first talkgroup is still active. In some embodiments, a radio call may be considered active while audio communications for the radio call are actively being sent to and/or received from a subscriber device. In some embodiments, a radio call may be considered to have transitioned to an inactive state when the period between sending or receiving audio communications exceeds a threshold, which may be predetermined.

Method 900 continues at block 918 with comparing the identifier in the second call notification with one or more identifiers included in one or more of the talkgroup entries in the first scan list. Method 900 continues at block 920 with determining whether the identifier associated with the second talkgroup in the second call notification matches an identifier in a talkgroup entry in the scan list. Blocks 918 and 920 may collectively be referred to as evaluating the second call notification as indicated by dashed line 922. When it is determined at block 920 that the talkgroup identifier in the second call notification does not match any of the talkgroup identifiers in the first scan list, method 900 continues at block 924 with continuing to send audio communications for the radio call associated with the first talkgroup to the subscriber device over the alternative connection and/or receive audio communications for the radio call associated with the first talkgroup from the subscriber device over the alternative connection. When it is determined at block 920 that the talkgroup identifier in the second call notification matches a talkgroup identifier in the scan list, method 900 continues at block 926 with comparing the priority level associated with the second talkgroup with the priority level associated with the first talkgroup based on information from the scan list received at block 904. Method 900 continues at block 928 with determining whether the priority level associated with the second talkgroup identified in the second call notification is higher than the priority level associated with the first talkgroup identified in the the first call notification. This may also be referred to as determining whether the second call notification is associated with a higher priority talkgroup than the first call notification. Blocks 926 and 928 may collectively be referred to as determining whether the second notification should be sent to the subscriber device as indicated by dashed line 930. In some embodiments, sending the second notification to the subscriber device may interrupt the active radio call associated with the first call notification. When it is determined that the second call notification is not associated with a higher priority talkgroup, for example, when the priority level in the entry for the second talkgroup in the scan list associated with the subscriber device is equal to or lower than the priority level in the entry for the first talkgroup, method 900 continues at block 924 with continuing to send audio communications for the radio call associated with the first talkgroup to the subscriber device over the alternative connection and/or receive audio communications for the radio call associated with the first talkgroup from the subscriber device over the alternative connection. When it is determined that the second call notification is associated with a higher priority talkgroup, for example, when the priority level in the entry for the second talkgroup is higher than the priority level in the entry for the first talkgroup, method 900 continues at block 932 with sending the second call notification to the subscriber device over the alternative connection.

In some embodiments, the operation of method 900 may be illustrated using the example regarding the police officer as discussed for FIG. 7A and FIG. 7B. The police officer's subscriber device 770 may be configured with scan list 780, which may include talkgroup entry 780a associated with talkgroup two (TG2) and talkgroup entry 780b associated with talkgroup one (TG1). When subscriber device 770 is out of range of a radio frequency site or when a land mobile radio connection to the land mobile radio network is otherwise unavailable, subscriber device 770 may be able to connect to the land mobile radio network indirectly via a gateway by establishing an alternative connection to an alternative network that is connected to the gateway.

After the subscriber device establishes an alternative connection to the alternative network, subscriber device 770 may send a copy of scan list 780 to the gateway, which may receive the scan list over the alternative connection. In this example, subscriber device 770 may not be participating in any active radio calls when it sends scan list 780. After receiving the scan list 780, the gateway may receive a first call notification from the zone controller of the land mobile radio network. The first call notification may include information regarding, and is associated with, an active radio call for a talkgroup. For example, the information in the first call notification may include an identifier TG1 for talkgroup one. After the gateway receives the first call notification, it may evaluate the first call notification by comparing at least a portion of the information in the first call notification (e.g., identifier TG1) with one or more talkgroup identifiers in one or more entries of scan list 780. Because identifier TG1 is included in talkgroup entry 780*b*, the gateway may determine that the first call notification should be sent to subscriber device 770 and may send the first call notification to subscriber device 770 over the alternative connection. In at least some embodiments, subscriber device 770 may automatically join the radio call associated with the talkgroup that is associated with each call notification the subscriber device receives over the alternative connection to the alternative network. The subscriber device may receive only one call notification at a time, which may allow a component of the system infrastructure, such as the gateway, to remotely determine which radio calls subscriber device 770 should join instead of relying on the subscriber device to make that determination locally. Subscriber device 770 may automatically join the radio call associated with talkgroup one, and the gateway may begin to send audio communications for the radio call, sometimes referred to as call audio, to subscriber device 770 over the alternative connection. In some embodiments, subscriber device 770 may be allowed to send and receive call audio for some radio calls, but may be restricted to only receiving call audio for other radio calls based on which talkgroup the radio call is associated with.

While a first officer using subscriber device 770 is receiving call audio for the talkgroup one radio call, a second officer using subscriber device 775, for example, might initiate a radio call on talkgroup two. For example, the second officer may be connected to the land mobile radio network, select talkgroup two on subscriber device 775, press the push-to-talk button, and begin to transmit call audio to a radio frequency site. In response, the zone controller may send a second call notification to the gateway. The second call notification may include information regarding the radio call associated with talkgroup two, such as the identifier TG2. The gateway may receive the second call notification and evaluate the second call notification by comparing the identifier TG2 to the identifiers in scan list 780 and determining that identifier TG2 of the second call notification matches identifier TG2 of talkgroup entry 780*a*. The gateway may then determine whether to send the second call notification to subscriber device 770 by comparing the priority level associated with talkgroup two (TG2) in talkgroup entry 780*a* with the priority level associated with talkgroup one (TG1) in talkgroup entry 780*b*. This comparison of priorities may be performed when subscriber device 770 is participating in an active radio call on a different talkgroup. Based on the comparison of the priority levels, the gateway may determine that the second call notification is associated with a higher priority talkgroup than the first call notification, because the priority level indicated by P1 in talkgroup entry 780*a* for talkgroup two (TG2) is higher than the priority level indicated by P2 in talkgroup entry 780*b* for talkgroup one (TG1). The gateway may then send the second call notification, which is associated with talkgroup two, to subscriber device 770 over the alternative connection. After receiving the second call notification, subscriber device 770 may automatically stop participating in the talkgroup one (TG1) radio call, join the talkgroup two (TG2) radio call, and begin receiving call audio for the talkgroup two radio call.

Figure 10:
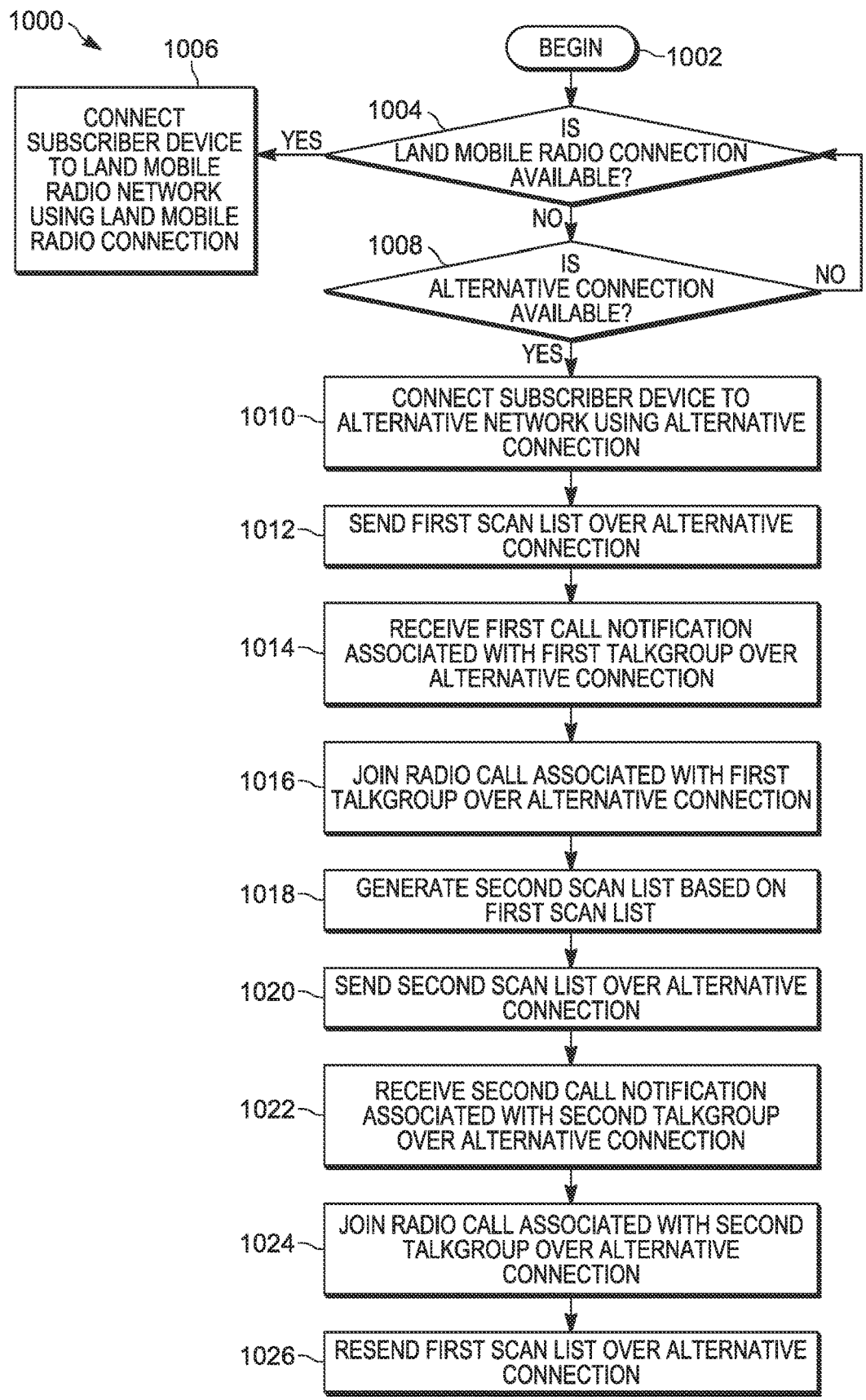
FIG. 10 is a flowchart illustrating selected elements of an example method for restricting or suspending remote scan and priority operations, in accordance with some embodiments.

Referring now to FIG. 10, there is provided a flowchart illustrating selected elements of an example method 1000 for restricting or suspending remote scan and priority operations, in accordance with some embodiments. In this example embodiment, method 1000 begins at block 1002 and continues at block 1004 with determining whether a land mobile radio connection to a land mobile radio network is available for a subscriber device. The subscriber device may be implemented similar to subscriber device 110 as described for FIG. 1, subscriber device 310 as described for FIG. 3, and subscriber device 400 as described for FIG. 4. The land mobile radio connection may be implemented similar to land mobile radio connection 125 and 135 as described for FIG. 1. As explained above, a land mobile radio network may be unavailable for any of a number of different reasons. For example, the subscriber device may be out of range of a radio frequency site of the land mobile radio network, the radio frequency site may be experiencing an outage, the signal integrity associated with the land mobile radio connection may be insufficient, and the like. Block 1004 may be implemented similar to block 504 as described for FIG. 5. When the subscriber device determines that a land mobile radio connection is available, method 1000 continues at block 1006 with connecting the subscriber device to the land mobile radio network using the land mobile radio connection. When, at block 1004, it is determined that a land mobile radio connection is unavailable, method 1000 continues to block 1008 with determining whether an alternative connection to an alternative network is available. The alternative network may be implemented similar to alternative network 140 as described for FIG. 1 and alternative network 265 as described for FIG. 2. The alternative connection may be implemented similar to alternative connection 145 as described for FIG. 1.

When at block 1008 of method 1000 it is determined that an alternative connection is unavailable, method 1000 may return to block 1004. Block 1008 may be implemented similar to block 508 as described for FIG. 5. When it is determined that an alternative connection is available, method 1000 continues at block 1010 with connecting the subscriber device to the alternative network using the alternative connection. Block 1010 may be implemented similar to block 510 as described for FIG. 5. Method 1000 continues at block 1012 with sending a first scan list over the alternative connection to the alternative network. In some embodiments, the scan list may be sent to a gateway. The gateway may be implemented similar to gateway 160 as described for FIG. 1 and gateway 210 as described for FIG. 2. As described above, in some embodiments, the first scan list may contain one or more entries associated with different talkgroups that each contain an identifier and a priority level associated with the talkgroup. The scan list may be implemented similar to scan lists 780, 785, 790, and 795 as described for FIG. 7B. Block 1012 may be implemented similar to block 512 as described for FIG. 5. Method 1000 continues at block 1014 with receiving a first call notification associated with a first talkgroup that includes information regarding an active radio call, also referred to as a radio call that is in an active state, associated with the first talkgroup over the alternative connection to the alternative network. In some embodiments, the first call notification may be received from a gateway after the gateway receives the call notification from a zone controller. The zone controller may be implemented similar to zone controller 150 as described for FIG. 1. Block 1014 may be implemented similar to block 514 as described for FIG. 5.

Method 1000 continues at block 1016 with the subscriber device joining the radio call associated with the first talkgroup over the alternative connection to the alternative network. As used herein, the talkgroup associated with the radio call that a subscriber device is currently participating on may be referred to as the landed talkgroup. The landed talkgroup may be the same or different from the affiliated talkgroup. The affiliated talkgroup may be the talkgroup selected by the user on the subscriber device as discussed for FIG. 7A. After the subscriber device joins the radio call, the subscriber device may begin to send and/or receive call audio for the radio call over the alternative connection to the alternative network. In some embodiments, the subscriber device may be limited to receiving call audio for certain radio calls associated with certain talkgroups in the subscriber device's scan list. Block 1016 may be implemented similar to block 516 as described for FIG. 5.

Method 1000 continues at block 1018 with generating a second scan list based on the first scan list. In some embodiments, the second scan list may be generated when the radio call associated with the first talkgroup is active. In some embodiments, the second scan list may be generated when the subscriber device is not participating in an active radio call. In some embodiments, the second scan list may be generated based on the first scan list when it is generated by adding information, removing information, or otherwise using information from the first scan list, which may include adding, removing, or otherwise using information from a copy of the first scan list. In some embodiments, the second scan list may include only entries for talkgroups, also called talkgroup entries, that have associated priority levels that are higher than the priority level associated with the landed talkgroup for the active radio call. In some embodiments, the second scan list may also include an entry for a specific talkgroup, for example, the landed talkgroup. In some embodiments, generating the second scan list at block 1018 may be implemented similar to method 1224A as shown and described for FIG. 12B. For example, a user of the subscriber device may desire to restrict scan operations to a specific talkgroup and higher priority talkgroups to ensure that the subscriber device will not join a radio call for a talkgroup with a priority level equal to the specific talkgroup before a call notification associated with that specific talkgroup is received. In this example, the gateway will not interrupt an active radio call with a call notification for a talkgroup that has a priority level equal to or lower than the landed talkgroup. In some embodiments, the second scan list may include no talkgroup entries when all of the entries have been removed or when all entries contain null values for at least the talkgroup identifiers. In some embodiments, a scan list that includes no talkgroup entries may be used to suspend or otherwise disable remote scan and priority operations. Suspending or disabling scan operations may, for example, allow the subscriber device to continue participating on an active radio call even though call notifications associated with higher priority talkgroups identified in the first scan list are received from a zone controller. Suspending or disabling scan operations may be useful, for example, when an officer is pursuing a suspect or responding to an emergency.

Method 1000 continues at block 1020 with sending the second scan list over the alternative connection to the alternative network. In some embodiments, the second scan list may be sent to the gateway. In ordinary land mobile radio operation, a subscriber device may be able to restrict or disable local scan operations by reconfiguring its scan list to change what call notifications the subscriber device will decide to accept or by no longer monitoring the broadcast control channel for call notifications. However, when a land mobile radio connection is unavailable to a subscriber device, the device may connect to an alternative network and rely on a component of the system infrastructure, such as a gateway, to perform remote scan and priority operations. In this scenario, the subscriber device cannot decide which call notifications to accept and there may be no broadcast control channel to monitor. By dynamically generating and sending altered versions of the subscriber device's scan list, the subscriber device may be able to control remote scan and priority operations in a manner that provides comparable or improved functionality compared with local scan operations used in ordinary land mobile radio operation.

In some embodiments where remote scan operations have been restricted to talkgroups with higher priority levels than the first talkgroup, which may be the landed talkgroup, and the second scan list contains at least one talkgroup entry from the first scan list associated with a second talkgroup, the component of the system infrastructure performing remote scan and priority operations, for example, the gateway, may receive a second call notification for a radio call associated with the second talkgroup identified in the second scan list. In which case, method 1000 continues at block 1022 with receiving a second call notification associated with the second talkgroup over the alternative connection. The second call notification may include information regarding an active radio call associated with the second talkgroup that is identified in the second scan list. Block 1022 may be implemented similar to block 1014. Method 1000 continues at block 1024 with the subscriber device joining the radio call associated with the second talkgroup over the alternative connection to the alternative network. Block 1024 may be implemented similar to block 1016. To resume full remote scan and priority operations, method 1000 continues at block 1026 with resending the first scan list over the alternative connection to the alternative network.

The operation of method 1000 may be illustrated using the example regarding the police officer as discussed for FIG. 7A and FIG. 7B. The police officer's subscriber device 770 may be configured with scan list 780, which includes talkgroup entries 780a, 780b, 780c, 780d, and 780e. For example, the officer may be responding to an emergency in the northeast area of City 710 where a land mobile radio connection to the land mobile radio network is unavailable. Subscriber device 770 may be connected to an alternative network, receive a call notification associated with talkgroup one (TG1), and join the talkgroup one call. While participating on a radio call associated with talkgroup one, the officer may wish to restrict scan and priority operations to only the landed talkgroup, which in this example is talkgroup one, and higher priority talkgroups. Restricting scan and priority operations in this way may ensure that the officer still receives call notifications for higher priority calls and that when the radio call for talkgroup one transitions to an inactive state, subscriber device 770 will not receive a call notification for any equal priority talkgroups as talkgroup one. For example, subscriber device 770 for the officer may still receive call notifications for talkgroup two (TG2) as shown in talkgroup entry 780a, but may not receive a call notification for talkgroup three (TG3), which may have the same priority level as talkgroup one (TG1) as shown in talkgroup entries 780*b* and 780*c*. In some embodiments, when subscriber device 770 joins a radio call associated with talkgroup three (TG3), the gateway will not send a call notification associated with talkgroup one (TG1) to subscriber device 770 while subscriber device 770 is participating in an active talkgroup three (TG3) radio call, because talkgroup one (TG1) may not have a higher priority level than talkgroup three (TG3). Restricting remote scan and priority operations may prevent this situation from occurring.

In some embodiments, the officer using subscriber device 770 may be able to restrict scan and priority operations by providing an indication to subscriber device 770. For example, the officer may press a programmable button on subscriber device 770 that causes subscriber device 770 to determine that scan and priority operations should be restricted. The programmable button may be implemented similar to programmable buttons 340 or 345 as described for FIG. 3. As another example, subscriber device 770 may be equipped with a remote communication device that may be mounted in the officer's vehicle. The officer using subscriber device 770 may be able to restrict scan and priority operations by removing the remote communication device from its mount, thereby causing subscriber device 770 to determine that scan and priority operations should be restricted. The remote communication device may be implemented similar to remote communication device 360 as described for FIG. 3. Removing a remote communication device from a mount may also be referred to herein as taking the remote communication device off hook. In some embodiments, taking a remote communication device off hook may cause the subscriber device to determine that scan and priority operations should be restricted. In other embodiments, taking a remote communication device off hook may cause the subscriber device to determine that scan and priority operations are to be disabled. In some embodiments, a programmable button on the remote communication device, such as programmable buttons 365 and 370 as described for FIG. 3, may be used for similar purposes.

In response to an indication that scan and priority operations should be restricted, the subscriber device 770 may generate a second scan list, for example, scan list 790, from scan list 780. Scan list 790 may include talkgroup entry 790*a* that is associated with higher priority talkgroup two (TG2) and corresponds to talkgroup entry 780*a* from scan list 780. Scan list 790 may also include entry 790*b* that is associated with landed talkgroup one (TG1) and corresponds to talkgroup entry 780*b* of scan list 780. Subscriber device 770 may send scan list 790 to a component of the system infrastructure, such as a gateway, over the alternative connection to the alternative network. Skilled artisans will appreciate that one or more copies of a scan list may be created to be sent over the alternative network or to be used to update a record in a scan list repository.

In some embodiments, the gateway may receive scan list 790 update a record associated with subscriber device 770 in a scan list repository. The gateway may evaluate call notifications that are received using scan list 790 instead of scan list 780. For example, the gateway may receive a call notification associated with talkgroup two (TG2), evaluate the call notification using scan list 790, determine that the call notification should be sent to subscriber device 770 because talkgroup two (TG2) has a higher priority level than talkgroup one (TG1), and send the call notification to subscriber device 770 over the alternative connection.

Subscriber device 770 may receive the call notification and join the talkgroup two (TG2) radio call over the alternative connection. Subsequently, subscriber device 770 may receive an indication that full remote scan and priority operations are to be resumed. For example, a user of subscriber device 770 may indicate resuming full remote scan and priority operations using a programmable button of subscriber device 770 or when a remote communication device is returned to its mount (on hook), subscriber device 770 may resend scan list 780 to the gateway over the alternative connection to the alternative network.

Figure 11:
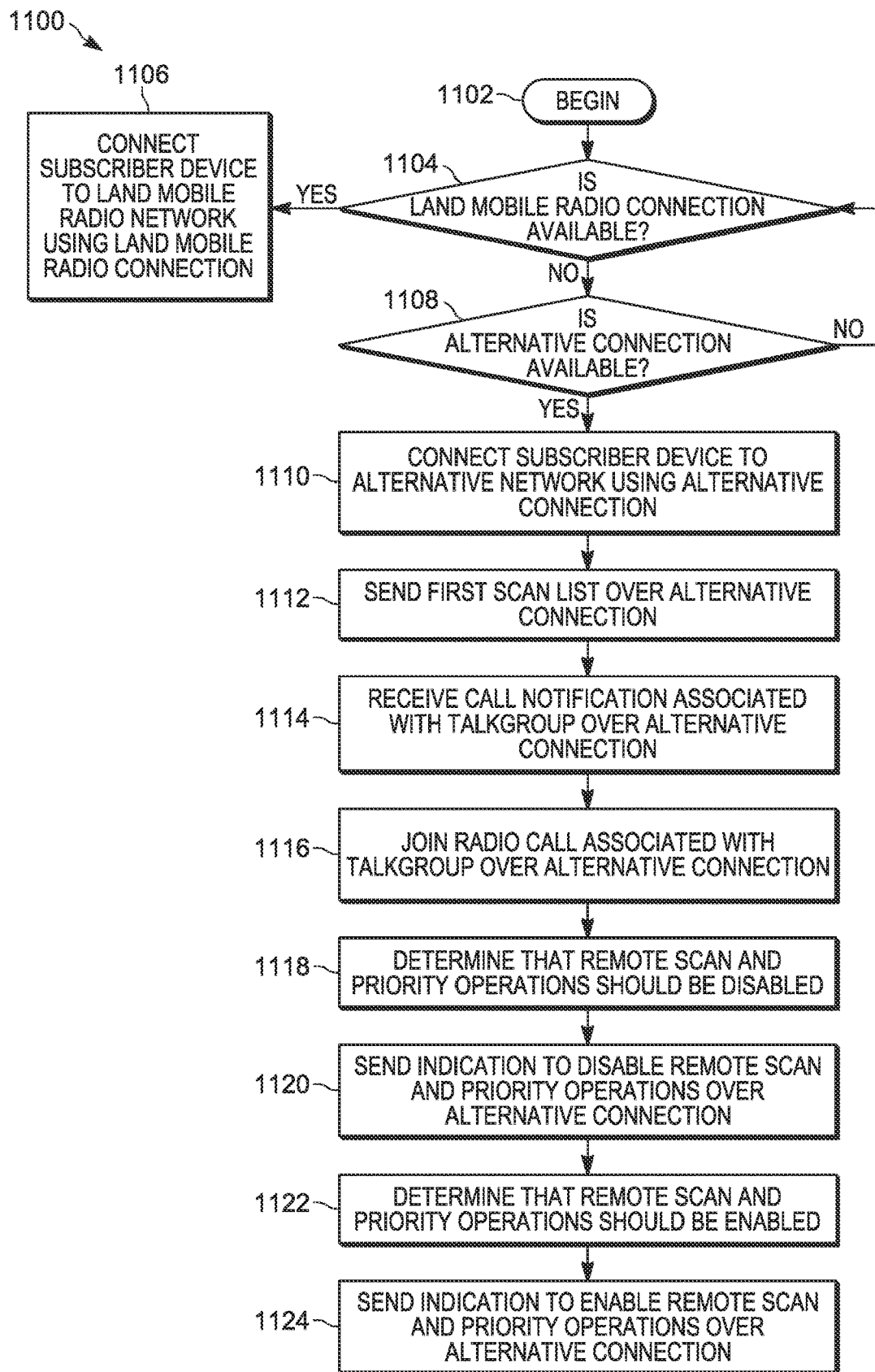
FIG. 11 is a flowchart illustrating selected elements of an example method for disabling remote scan and priority operations, in accordance with some embodiments.

Referring now to FIG. 11, there is provided a flowchart illustrating selected elements of an example method 1100 for disabling remote scan and priority operations, in accordance with some embodiments. In this example embodiment, method 1100 begins at block 1102 and continues at block 1104 with determining whether a land mobile radio connection to a land mobile radio network is available for a subscriber device. The land mobile radio connection may be implemented similar to land mobile radio connection 125 and 135 as described for FIG. 1. The subscriber device may be implemented similar to subscriber device 110 as described for FIG. 1, subscriber device 310 as described for FIG. 3, or subscriber device 400 as described for FIG. 4. As explained above, a land mobile radio connection may be unavailable for any of a number of different reasons. For example, the subscriber device may be out of range of a radio frequency site of the land mobile radio network, the radio frequency site may be experiencing an outage, the signal integrity may be insufficient, and the like. Block 1104 may be implemented similar to block 504 as described for FIG. 5.

When a land mobile radio connection is available, method 1100 continues at block 1106 with connecting the subscriber device to the land mobile radio network using the land mobile radio connection. When, at block 1104, it is determined that a land mobile radio connection is unavailable, method 1100 continues to block 1108 with determining whether an alternative connection to an alternative network is available. The alternative network may be implemented similar to alternative network 140 as described for FIG. 1 and alternative network 265 as described for FIG. 2. The alternative connection may be implemented similar to alternative connection 145 as described for FIG. 1. When at block 1108, it is determined that an alternative connection is unavailable, method 1100 may return to block 1104. Block 1108 may be implemented similar to block 508 as described for FIG. 5. When it is determined that an alternative connection is available, method 1100 continues at block 1110 with connecting the subscriber device to the alternative network using the alternative connection. Block 1110 may be implemented similar to block 510 as described for FIG. 5.

Method 1100 continues at block 1112 with sending a first scan list over the alternative connection to the alternative network. In some embodiments, the scan list may be sent to a gateway. The gateway may be implemented similar to gateway 160 as described for FIG. 1 or gateway 210 as described for FIG. 2. In some embodiments, the first scan list may contain one or more entries associated with different talkgroups that each contain an identifier and a priority level associated with the talkgroup. The first scan list may be implemented similar to scan lists 780, 785, 790, and 795 as described for FIG. 7B. Block 1112 may be implemented similar to block 512 as described for FIG. 5. Method 1100 continues at block 1114 with receiving a first call notification associated with a first talkgroup that includes information regarding an active radio call, also referred to as a radio call that is in an active state, associated with the first talkgroup over the alternative connection to the alternative network. In some embodiments, the first call notification may be received from a gateway after the gateway receives the call notification from a zone controller. The zone controller may be implemented similar to zone controller 150 as described for FIG. 1. Block 1114 may be implemented similar to block 514 as described for FIG. 5.

Method 1100 continues at block 1116 with the subscriber device joining a radio call associated with the first talkgroup over the alternative connection to the alternative network. After the subscriber device joins the radio call, the subscriber device may begin to send and/or receive call audio for the radio call over the alternative connection to the alternative network. In some embodiments, the subscriber device may be limited to receiving call audio for certain radio calls associated with certain talkgroups in the subscriber device's scan list. Block 1116 may be implemented similar to block 516 as described for FIG. 5.

Method 1100 continues at block 1118 with determining that remote scan and priority operations should be disabled. In some embodiments, a subscriber device may determine that remote scan and priority operations should be disabled based on an action from the user of the subscriber device. For example, the user of the subscriber device may press a programmable button that has been configured to disable scan and priority operations. As another example, a subscriber device may be configured to disable scan operations when it determines that an attached remote communication device is in an off-hook state. In some embodiments, the subscriber device may be configured to determine that remote scan and priority operations should be disabled independent of any action from the user. For example, the subscriber device may be configured to restrict or suspend remote scan and priority operations for certain periods of time at the beginning or end of a radio call.

Method 1100 continues at block 1120 with sending an indication to disable remote scan and priority operations over the alternative connection to the alternative network. In some embodiments, the indication may be sent to the gateway. In some embodiments, the indication may be a message instructing the gateway to disable remote scan and priority operations. In some embodiments, the indication may be a scan list that contains no talkgroup entries. In some embodiments, the indication may be a scan list that contains null values for the talkgroup identifier for each entry. In some embodiments, the indication may be a scan list that contains null values for the talkgroup identifier and the priority level for each entry. For example, the indication may be implemented as a scan list similar to scan list 795 as shown in FIG. 7B. In some embodiments, the subscriber device may generate, as the indication, a second scan list based on the first scan list. When the indication is a scan list, the contents of the scan list may be used to disable remote scan and priority operations. For example, a component of the system infrastructure, such as a gateway, may evaluate the call notifications it receives using the scan list and determine that the talkgroup identifier in the call notification does not match any identifier in the scan list. Thus, the gateway may not send any call notifications to the subscriber device over the alternative connection based on performing remote scan and priority operations using the scan list. In some embodiments, the subscriber device may communicate its affiliated talkgroup to a component of the system infrastructure, such as the gateway, independent from the scan list. When the gateway receives the affiliated talkgroup of the subscriber device, the gateway may continue to send call notifications to the subscriber device for only the talkgroup with which the subscriber device is affiliated, which is also referred to as the affiliated talkgroup.

Method 1100 continues at block 1122 with determining that remote scan and priority operations should be enabled. In some embodiments, a subscriber device may determine that remote scan and priority operations should be enabled based on input from the user. For example, the user may press a programmable button that has been configured to enable scan operations, the subscriber device may process the press of the programmable button by enabling remote scan and priority operations. As another example, a subscriber device may be configured to enable scan operations when it determines that an attached remote communication device is in an on-hook state. In some embodiments, the subscriber device may be configured to determine that remote scan and priority operations should be enabled independent of any input from the user. For example, the subscriber device may be configured to automatically reenable remote scan and priority operations based on the expiration of a certain period of time after scan operations have been disabled.

Method 1100 continues at block 1124 with sending an indication to enable remote scan and priority operations over the alternative connection to the alternative network. In some embodiments, the indication may be sent to the gateway. In some embodiments, the indication may be a message instructing the gateway to enable remote scan and priority operations. In some embodiments, the indication may be a scan list that contains one or more talkgroup entries containing a talkgroup identifier.

In ordinary land mobile radio operation where the subscriber device performs local scan operations by monitoring the broadcast control channel for call notifications of interest, the subscriber device may restrict local scan operations temporarily at the end of a radio call or when the radio call has otherwise transitioned to an inactive state, which may be referred to as scan hangtime. Scan hangtime may be used, for example, in trunked land mobile radio networks where a relatively larger number of talkgroups are sharing a limited number of radio channels, each talkgroup radio call to continuously transition between active and inactive states to free-up channels for other talkgroup radio calls that are in an active state. Therefore, not all talkgroup radio calls will be in an active state at the same time. Scan hangtime may be used to ensure that when the radio call associated with the landed talkgroup transitions to an active state within a short period of time after transitioning to an inactive state, the subscriber device may rejoin the landed talkgroup call. In this scenario, the subscriber device may be restricted from joining an active radio call for an equal or lower priority talkgroup that may be in an active state during the period of scan hangtime, which may have the undesired consequence of blocking the subscriber device from rejoining the previous landed talkgroup call if it transitions to an active state. To implement scan hangtime for local scan operations, the subscriber device may restrict local scan operations to only the landed talkgroup and higher priority talkgroups in the subscriber device's scan list. The subscriber device may be unable to implement scan hangtime using local scan operations when the subscriber device is connected to an alternative network because, for example, it may no longer be able to monitor the broadcast control channel of the land mobile radio network.

Figure 12A:
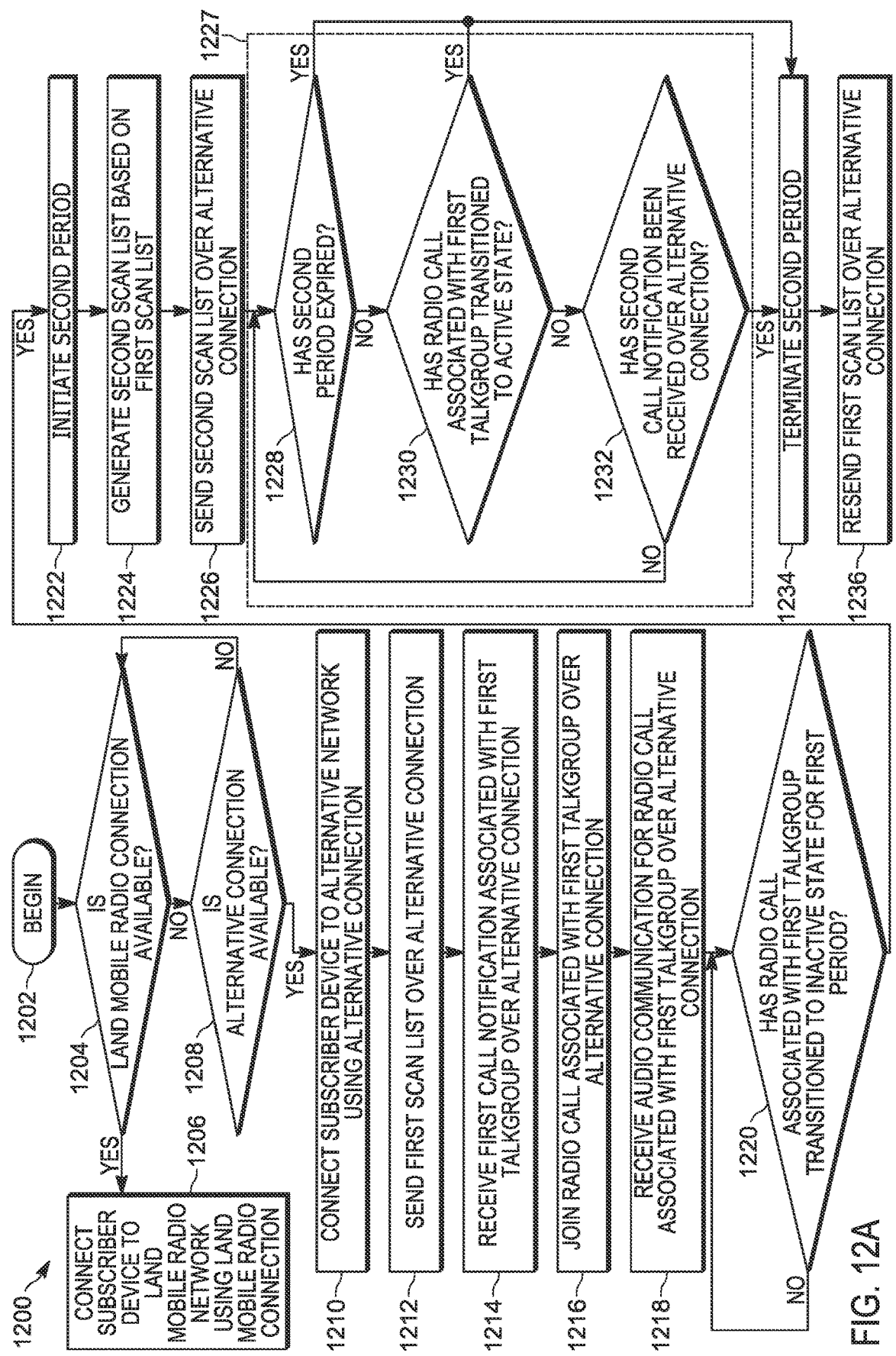
FIG. 12A is a flowchart illustrating selected elements of an example method for supporting remote scan and priority operations and remote scan hangtime operations, in accordance with some embodiments.

Referring now to FIG. 12A, there is provided a flowchart illustrating selected elements of an example method 1200 for supporting remote scan and priority operations and remote scan hangtime operations, in accordance with some embodiments. In this example embodiment, method 1200 begins at block 1202 and continues at block 1204 with determining whether a land mobile radio connection to a land mobile radio network is available for a subscriber device. The subscriber device may be implemented similar to subscriber device 110 as described for FIG. 1, subscriber device 310 as described for FIG. 3, and subscriber device 400 as described for FIG. 4. The land mobile radio connection may be implemented similar to land mobile radio connection 125 and 135 as described for FIG. 1. As explained above, a land mobile radio connection may be unavailable for any of a number of different reasons. For example, the subscriber device may be out of range of a radio frequency site of the land mobile radio network, the radio frequency site may be experiencing an outage, the signal integrity may be insufficient, and the like. Block 1204 may be implemented similar to block 504 as described for FIG. 5.

When a land mobile radio connection is available, method 1200 continues at block 1206 with connecting the subscriber device to the land mobile radio network using the land mobile radio connection. When, at block 1204, it is determined that a land mobile radio connection is unavailable, method 1200 continues to block 1208 with determining whether an alternative connection to an alternative network is available. The alternative network may be implemented similar to alternative network 140 as described for FIG. 1 and alternative network 265 as described for FIG. 2. The alternative connection may be implemented similar to alternative connection 145 as described for FIG. 1. When at block 1208 of method 1200 it is determined that an alternative connection is unavailable, method 1200 may return to block 1204. Block 1208 may be implemented similar to block 508 as described for FIG. 5. When it is determined that an alternative connection is available, method 1200 continues at block 1210 with connecting the subscriber device to the alternative network using the alternative connection. Block 1210 may be implemented similar to block 510 as described for FIG. 5.

Method 1200 continues at block 1212 with sending a first scan list over the alternative connection to the alternative network. In some embodiments, the scan list may be sent to a gateway. The gateway may be implemented similar to gateway 160 as described for FIG. 1 or gateway 210 as described for FIG. 2. In some embodiments, the first scan list may contain one or more entries associated with different talkgroups in which each entry contains an identifier and a priority level associated with the talkgroup. The first scan list may be implemented similar to scan lists 780, 785, 790, or 795 as described for FIG. 7B. Block 1212 may be implemented similar to block 512 as described for FIG. 5.

Method 1200 continues at block 1214 with receiving a first call notification associated with a first talkgroup that includes information regarding an active radio call associated with the first talkgroup over the alternative connection to the alternative network. In some embodiments, the first call notification may be received from a gateway after the gateway receives the call notification from a zone controller. The zone controller may be implemented similar to zone controller 150 as described for FIG. 1. Block 1214 may be implemented similar to block 514 as described for FIG. 5. Method 1200 continues at block 1216 with the subscriber device joining a radio call associated with the first talkgroup over the alternative connection to the alternative network. Block 1216 may be implemented similar to block 516 as described for FIG. 5.

Method 1200 continues at block 1218 with receiving an audio communication for the radio call associated with the first talkgroup over the alternative connection to the alternative network. In some embodiments, the subscriber device may also send call audio for the radio call over the alternative connection to the alternative network. In some embodiments, the subscriber device may be limited to receiving call audio for certain radio calls associated with certain talkgroups in the subscriber device's scan list.

Method 1200 continues at block 1220 with determining whether the radio call associated with the first talkgroup has transitioned to an inactive state for a first period, which may be referred to as call hangtime. In some embodiments, the first period may be as long as a predetermined limit, which may be any suitable value, such as one second, five seconds, ten seconds, twenty seconds, or sixty seconds. In some embodiments, shorter or longer periods of time may also be used. When it is determined that the radio call has been in an inactive state for the first period, method 1200 continues at block 1222 with initiating a second period, which may be referred to as scan hangtime. In some embodiments, the first and second periods may collectively be referred to as scan hangtime. In some embodiments, initiating the second period may include starting a timer or counter from zero, where the value of the timer or counter may be compared to a threshold limit. In other embodiments, initiating the second period may include noting a starting position or value for a continuously running clock or counter that runs during the second period, where the difference from the starting position or value may be used in a comparison to a threshold limit. In some embodiments, the second period may be as long as a predetermined limit, which may be any suitable value, such as one second, five seconds, ten seconds, twenty seconds, or sixty seconds. In some embodiments, shorter or longer periods of time may also be used.

Method 1200 continues at block 1224 with generating a second scan list based on the first scan list. In some embodiments, the second scan list may be generated based on the first scan list by adding information, removing information, or otherwise using information from the first scan list, which may include adding, removing, or otherwise using information from a copy of the first scan list. In some embodiments, the second scan list may include only entries for talkgroups that have associated priority levels that are higher than the priority level associated with the landed talkgroup for the active radio call. In some embodiments, the second scan list may also include an entry for a specific talkgroup, for example, the landed talkgroup. In this example, the landed talkgroup may be the first talkgroup.

Figure 12B:
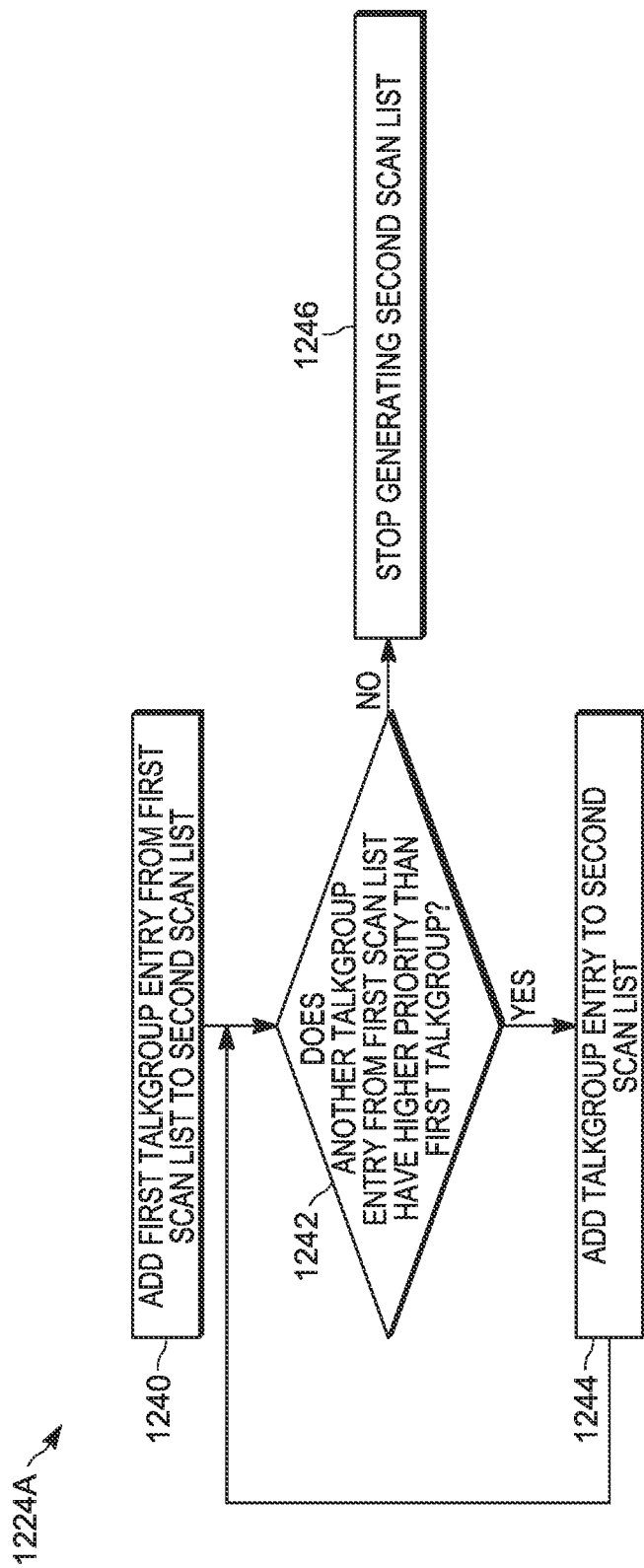
FIG. 12B is a flow chart illustrating selected elements of an example method for generating a second scan list based on a first scan list.

FIG. 12B is a flowchart illustrating selected elements of an example method 1224A for generating a second scan list based on a first scan list that may be included within block 1224 of FIG. 12A. At block 1240 the method includes adding the first talkgroup entry from the first scan list to the second scan list. In some embodiments, the first talkgroup may be the landed talkgroup. Method 1224A continues at block 1242 with determining whether an of the other talkgroup entries from the first scan list have a higher priority level than the priority level associated with the first talkgroup. When it is determined that there is another talkgroup entry that has a higher priority level, the method continues at block 1244 with adding the talkgroup entry for the higher priority talkgroup from the first scan list to the second scan list. Method 1224A continues with determining whether there are any other talkgroup entries having a higher priority level than the first talkgroup and adding each talkgroup entry with a higher priority level from the first scan list to the second scan list. When it is determined at block 1242 that there are no other talkgroups that have an associated priority level in the first scan list that is higher than the first talkgroup, the method continues at block 1246 with stopping generation of the second scan list.

Method 1200 of FIG. 12A continues at block 1226 with sending the second scan list over the alternative connection to the alternative network. In some embodiments, sending the second scan list may restrict remote scan and priority operations. For example, when the second scan list includes less than all of the talkgroup entries from the first scan list. In some embodiments, sending the second scan list may disable remote scan and priority operations. For example, when the second scan list contains no talkgroup entries or contains null values for all talkgroup identifiers. In some embodiments, the second scan list may be received by the gateway.

Method 1200 continues with determining whether to terminate the second period in response to a termination event as indicated by dashed line 1227. Method 1200 continues at block 1228 with determining whether the second period has expired. When the second period has expired, which may be referred to as a default termination event, method 1200 continues at block 1234 with terminating the second period. When the second period has not expired, method 1200 continues at block 1230 with determining whether the radio call associated with the first talkgroup has transitioned to an active state during the second period. In some embodiments, the radio call associated with the first talkgroup may be considered to have transitioned to an active state when an audio signal for the radio call is received by the subscriber device. In some embodiments, the radio call associated with the first talkgroup may be considered to have transitioned to an active state when the subscriber device sends an audio signal for the radio call. In some embodiments, the radio call associated with the first talkgroup may be considered to have transitioned to an active state when, during the second period, a call notification including information regarding an active radio call associated with the first talkgroup is received by the subscriber device. In some embodiments, the radio call associated with the first talkgroup may be considered to have transitioned to an active state when, during the second period, the user of the subscriber device initiates a radio call associated with the first talkgroup.

When the radio call associated with the first talkgroup has transitioned to an active state during the second period, method 1200 continues at block 1234 with terminating the second period. When the radio call associated with the first talkgroup has not transitioned to an active state during the second period, the method continues at block 1232 with determining whether a second call notification including information regarding an active radio call associated with a second talkgroup has been received over the alternative connection to the alternative network. When a second call notification has been received, method 1200 continues at block 1234 with terminating the second period. In some embodiments, terminating the second period may include stopping a timer or counter after the occurrence of a termination event. In some embodiments, terminating the second period may include ending the second period without stopping a timer or counter used to measure the second period. When second call notification has not been received, method 1200 may continue with determining whether another termination event has occurred. From block 1234, method 1200 continues at block 1236 with resending the first scan list over the alternative connection to the alternative network, which may cause full remote scan and priority operations to resume.

Figure 13:
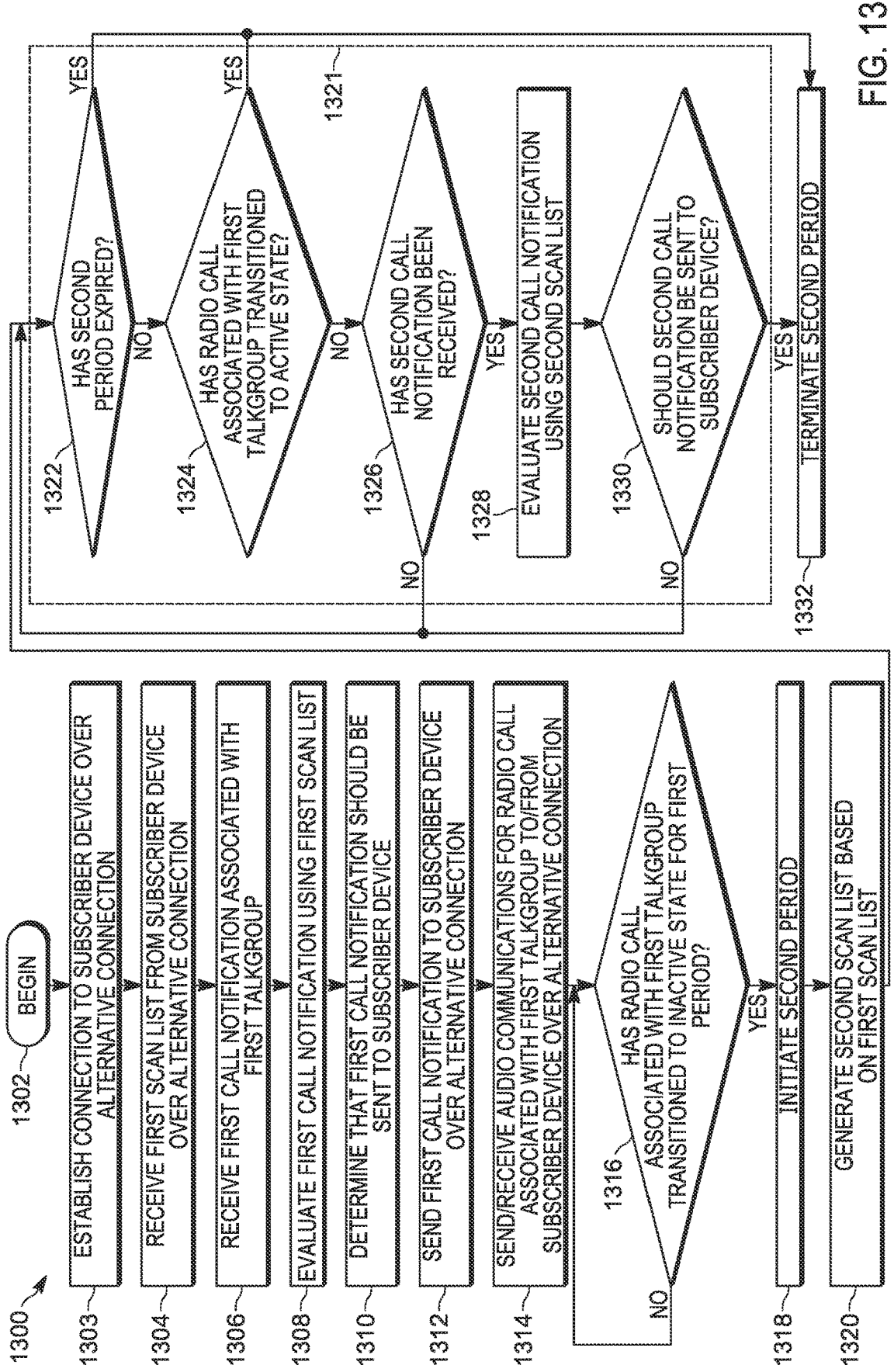
FIG. 13 is a flowchart illustrating selected elements of an example method for remote scan and priority operations and remote scan hangtime operations, in accordance with some embodiments.

Referring now to FIG. 13, there is provided a flowchart illustrating selected elements of an example method 1300 for remote scan and priority operations and remote scan hangtime operations, in accordance with some embodiments. One or more blocks of method 1300 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 1300 begins at block 1302 and continues at block 1303 with establishing a connection to a subscriber device over an alternative connection to an alternative network. Method 1300 continues at block 1304 with receiving a scan list from a subscriber device over an alternative connection to an alternative network. As described above, the alternative connection is different than a land mobile radio connection. The alternative network may be implemented similar to alternative network 140 as described for FIG. 1 and alternative network 265 as described for FIG. 2. The alternative connection may be implemented similar to alternative connection 145 as described for FIG. 1. In some embodiments, the scan list may be received by a gateway. Block 1304 may be implemented similar to block 604 as described for FIG. 6. In some embodiments, the scan list may contain one or more entries, which may be referred to as talkgroup entries, where each entry may be associated with a talkgroup. In some embodiments, an entry may be associated with a talkgroup by including an identifier for the talkgroup. In some embodiments, the scan list may also include a priority level associated with each talkgroup. The scan list may be implemented similar to scan lists 780, 785, 790, or 795 as described for FIG. 7B.

Method 1300 continues at block 1306 with receiving a first call notification associated with a first talkgroup that includes information regarding an active radio call, also referred to as a radio call that is in an active state, associated with the first talkgroup. In some embodiments, the information may include an identifier associated with the first talkgroup, and the first call notification may thus be referred to as being associated with the first talkgroup. In some embodiments, the first call notification may be received by a gateway from a zone controller. The zone controller may be implemented similar to zone controller 150 as described for FIG. 1. Block 1306 may be implemented similar to block 606 as described for FIG. 6.

Method 1300 continues at block 1308 with evaluating the first call notification using the scan list. In some embodiments, the first call notification may be evaluated by a gateway. Block 1308 may be implemented similar to block 608 as described for FIG. 6. Method 1300 continues at block 1310 with determining that the first call notification should be sent to the subscriber device. In some embodiments, the determination may be made by a gateway. In some embodiments, determining that the call notification should be sent to the subscriber device may include a comparison of priority levels associated with talkgroups. Block 1310 may be implemented similar to block 610 as described for FIG. 6.

Method 1300 continues at block 1312 with sending the first call notification to the subscriber device over the alternative connection. In some embodiments, the first call notification, when sent to the subscriber device, may include more or less information than it did when it was received at block 1306. Block 1312 may be implemented similar to block 612 as described for FIG. 6. Method 1300 continues at block 1314 with sending audio communications for a radio call associated with the first talkgroup to the subscriber device over the alternative connection. In some embodiments, block 1314 also includes receiving audio communications for the radio call associated with the first talkgroup from the subscriber device over the alternative connection.

Method 1300 continues at block 1316 with determining whether the radio call associated with the first talkgroup has transitioned to an inactive state for a first period, which may be referred to as call hangtime. In some embodiments, the first period may be as long as a predetermined limit, which may be any suitable value, such as one second, five seconds, ten seconds, twenty seconds, or sixty seconds. In some embodiments, shorter or longer periods of time may also be used. When it is determined that the radio call has been in an inactive state for the first period, the method continues at block 1318 with initiating a second period, which may be referred to as scan hangtime. In some embodiments, the first and second periods may collectively be referred to as scan hangtime. In some embodiments, the second period may be as long as a predetermined limit, which may be any suitable value, such as one second, five seconds, ten seconds, twenty seconds, or sixty seconds. In some embodiments, shorter or longer periods of time may also be used.

Method 1300 continues at block 1320 with generating a second scan list based on the first scan list. In some embodiments, the second scan list is generated by the gateway. In some embodiments, the second scan list may be generated based on the first scan list when it is generated by adding information, removing information, or otherwise using information from the first scan list, which may include adding, removing, or otherwise using information from a copy of the first scan list, for example, from a record in a scan list repository. The scan list repository may be implemented similar to scan list repository 180 as described for FIG. 1 or scan list repository 255 as described for FIG. 2. In some embodiments, the second scan list may include only entries for talkgroups that have associated priority levels that are higher than the priority level associated with the first talkgroup that is associated with the active radio call. In some embodiments, the second scan list may also include an entry for a specific talkgroup, for example, the first talkgroup, which may be the landed talkgroup. In some embodiments, generating the second scan list at block 1320 may be implemented by a gateway in a manner similar to method 1224A as shown and described for FIG. 12B.

Method 1300 continues with determining whether to terminate the second period in response to a termination event as indicated by dashed line 1321. The method continues at block 1322 with determining whether the second period has expired. When the second period has expired, which may be referred to as a default termination event, method 1300 continues at block 1332 with terminating the second period. When the second period has not expired, method 1300 continues at block 1324 with determining whether the radio call associated with the first talkgroup has transitioned to an active state during the second period. In some embodiments, the radio call associated with the first talkgroup may be considered to have transitioned to an active state when an audio communication for the radio call is received by the gateway from the subscriber device over the alternative connection or from the zone controller. In some embodiments, the radio call associated with the first talkgroup may be considered to have transitioned to an active state when an audio communication for the radio call is sent, for example, from the gateway, to the subscriber device over the alternative connection. In some embodiments, the radio call associated with the first talkgroup may be considered to have transitioned to an active state when, during the second period, a call notification including information regarding an active radio call associated with the first talkgroup is received by the gateway from the zone controller.

When it is determined that the radio call associated with the first talkgroup has transitioned to an active state during the second period, method 1300 continues at block 1332 with terminating the second period. When the radio call associated with the first talkgroup has not transitioned to an active state during the second period, method 1300 continues at block 1326 with determining whether a second call notification including information regarding an active radio call associated with a second talkgroup has been received from the zone controller. When a second call notification has not been received, method 1300 may continue with determining whether the second period has expired or whether another termination event has occurred. When a second call notification has been received, method 1300 continues at block 1328 with evaluating the second call notification using the second scan list. In some embodiments, the second call notification may be evaluated by comparing the talkgroup identifier in the call notification with the talkgroup identifiers in the second scan list. Block 1328 may be implemented similar to block 1308.

Method 1300 continues at block 1330 with determining whether the second call notification should be sent to the subscriber device. For example, when it is determined, based on the evaluation, that the talkgroup identifier in the second call notification does not match any of the identifiers in the second scan list, then it may be determined that the call notification should not be sent to the subscriber device. As another example, when the second scan list contains only entries for the first talkgroup and any higher priority talkgroups, then it may be determined that any call notification associated with a talkgroup identified in the second scan list should be sent to the subscriber device. In some embodiments, the determination at block 1330 may include a comparison of priority levels using the second scan list. Block 1330 may be implemented similar to block 1310. When it is determined that the second call notification should not be sent to the subscriber device, method 1300 may continue with determining whether the second period has expired or whether another termination event has occurred. When it is determined that the second call notification should be sent to the subscriber device, method 1300 continues at block 1332 with terminating the second period. The gateway may send the second call notification to the subscriber device over the alternative connection to the alternative network (not shown), which may be implemented similar to block 1312. In some embodiments, after the second period is terminated, the gateway may resume full remote scan and priority operations by using the first scan list to evaluate subsequent call notifications (not shown). In some embodiments, method 1300 may be performed by various components of the system infrastructure in combination, for example, by a gateway and a zone controller. In some embodiments, method 1300 may be performed entirely by the gateway.

In some embodiments, one or more talkgroups may be regrouped into another talkgroup that may be referred to as a supergroup. For example, a dispatch console operator may determine that talkgroup one and talkgroup two should be regrouped to form a supergroup. Subsequent to the formation of the supergroup, when a user of a subscriber device initiates a radio call on talkgroup one, the call may be associated with the supergroup, and other subscriber devices that have talkgroup one or talkgroup two in their scan lists may receive call notifications and join the radio call, even though the radio call was initiated on talkgroup one. Skilled artisans will appreciate that the same supergroup would permit subscriber devices to receive call notifications and join a radio call initiated on talkgroup two.

In ordinary land mobile radio operations, subscriber devices monitor the broadcast control channel for messages indicating that certain talkgroups have been regrouped. When a subscriber device is using an alternative connection that does not utilize the broadcast control channel, regrouping messages may not be communicated to the subscriber device, which may result in the subscriber device and the zone controller being out of synchronization regarding the grouping status of various talkgroups.

Figure 14:
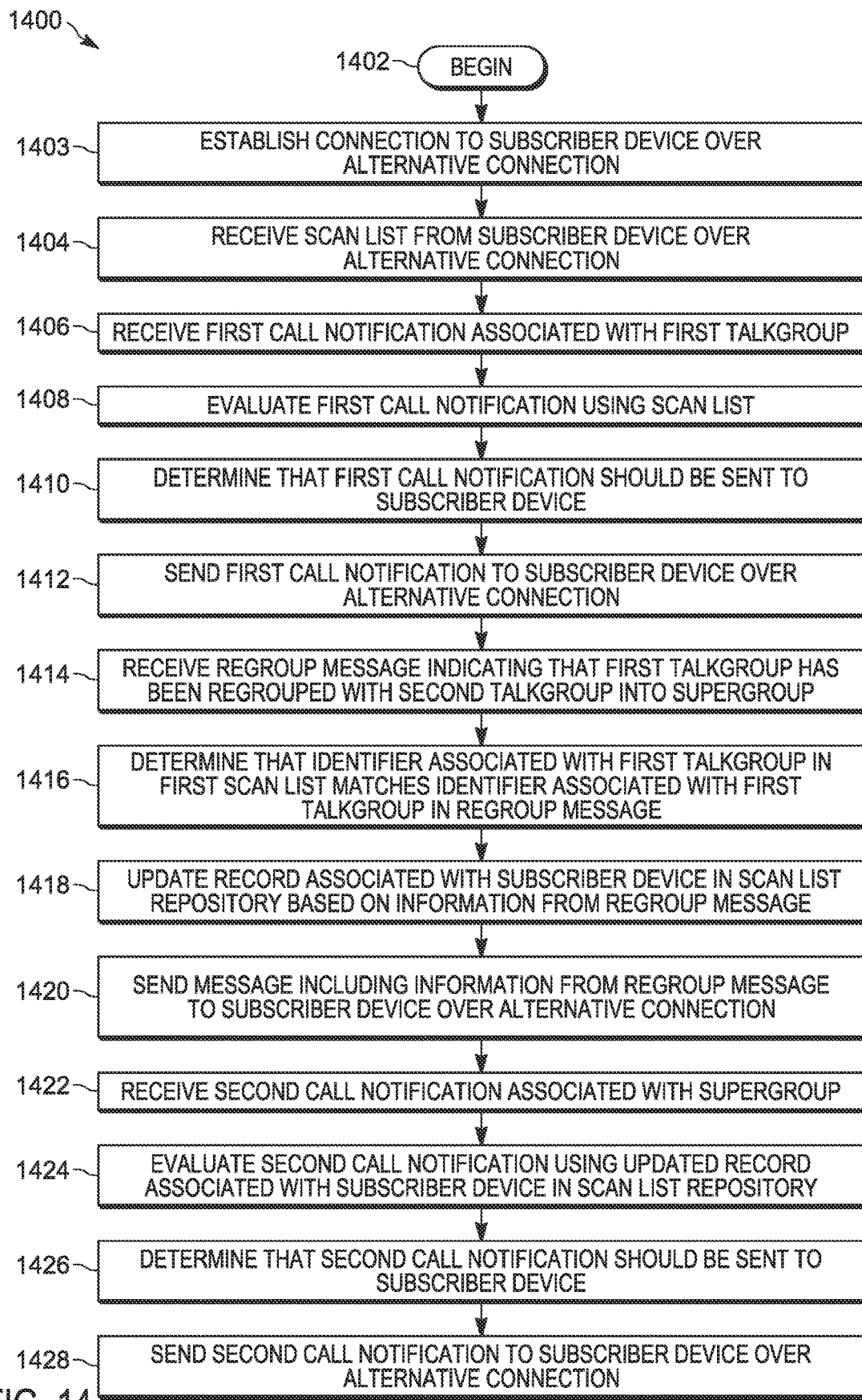
FIG. 14 is a flowchart illustrating selected elements of an example method for remote scan and priority operations and regrouping operations, in accordance with some embodiments.

Referring now to FIG. 14, there is provided a flowchart illustrating selected elements of an example method 1400 for remote scan and priority operations and regrouping operations, in accordance with some embodiments. One or more blocks of method 1400 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 1400 begins at block 1402 and continues at block 1403 with establishing a connection to a subscriber device over an alternative connection to an alternative network. Method 1400 continues at block 1404 with receiving a scan list from a subscriber device over an alternative connection to an alternative network. The subscriber device may be implemented similar to subscriber device 110 as described for FIG. 1, subscriber device 310 as described for FIG. 3, or subscriber device 400 as described for FIG. 4. As described above, the alternative connection to the alternative network is different than and is alternative to a land mobile radio connection. The alternative network may be implemented similar to alternative network 140 as described for FIG. 1 and alternative network 265 as described for FIG. 2. The alternative connection may be implemented similar to alternative connection 145 as described for FIG. 1. In some embodiments, the scan list may be received by a gateway. Block 1404 may be implemented similar to block 604 as described for FIG. 6. In some embodiments, the scan list may contain one or more entries, which may be referred to as talkgroup entries, where each entry is associated with a talkgroup. In some embodiments, an entry may be associated with a talkgroup by containing an identifier for the talkgroup. In some embodiments, the scan list may also include a priority level associated with each talkgroup. The scan list may be implemented similar to scan lists 780, 785, 790, or 795 as described for FIG. 7B.

Method 1400 continues at block 1406 with receiving a first call notification associated with a first talkgroup that includes information regarding an active radio call, also referred to as a radio call that is in an active state, associated with the first talkgroup. In some embodiments, the information may include an identifier associated with the first talkgroup, and the first call notification may be referred to as being associated with the first talkgroup. In some embodiments, the first call notification may be received by a gateway from a zone controller, which may be implemented similar to zone controller 150 as described for FIG. 1. Block 1406 may be implemented similar to block 606 as described for FIG. 6. Method 1400 continues at block 1408 with evaluating the first call notification using the scan list. In some embodiments, the first call notification may be evaluated by a gateway. Block 1408 may be implemented similar to block 608 as described for FIG. 6. Method 1400 continues at block 1410 with determining that the first call notification should be sent to the subscriber device. In some embodiments, the determination may be made by a gateway. In some embodiments, determining that the call notification should be sent to the subscriber device may include a comparison of priority levels associated with talkgroups. Block 1410 may be implemented similar to block 610 as described for FIG. 6. Method 1400 continues at block 1412 with sending the first call notification to the subscriber device over the alternative connection. In some embodiments, the first call notification, when sent to the subscriber device, may include more or less information than it did when it was received at block 1406. Block 1412 may be implemented similar to block 612 as described for FIG. 6.

Method 1400 continues at block 1414 with receiving a regroup message indicating that the first talkgroup has been regrouped with at least a second talkgroup into a supergroup. In some embodiments, the regroup message may be received by the gateway from the zone controller. In some embodiments, the regroup message may include identifiers for each talkgroup that has been regrouped, an indication that identified talkgroups have been regrouped, and an identifier associated with the supergroup. In some embodiments, the identifier associated with the supergroup may be a new identifier that is different than the identifiers for each talkgroup that has been regrouped. For example, the message may indicate that talkgroup one, identified with TG1, has been regrouped with talkgroup two, identified with TG2, into supergroup one, identified with SG1. In some embodiments, the identifier associated with the supergroup may be the same as one of the talkgroups that has been regrouped. For example, supergroup one may be identified as TG1.

Method 1400 continues at block 1416 with determining that the identifier associated with the first talkgroup in the scan list matches the identifier associated with the first talkgroup in the regroup message. Block 1416 is not limited to just the first talkgroup and may apply to any talkgroup identifier in the scan list that matches a talkgroup identifier in the regroup message. In some embodiments, the determination at block 1416 may be made by the gateway. Method 1400 continues at block 1418 with updating a record associated with the subscriber device in a scan list repository based on information from the regroup message. In some embodiments, the gateway may update the record in the scan list repository. In some embodiments, the gateway may need to update the records associated with multiple subscriber devices in the scan list repository, for example, when multiple subscriber devices connected to the gateway have talkgroup entries associated with one or more of the talkgroups being regrouped. The scan list repository may be implemented similar to scan list repository 180 as described for FIG. 1 or scan list repository 255 as described for FIG. 2. In some embodiments, the gateway may replace the entries for each talkgroup in the record associated with the subscriber device with an entry for the supergroup. In some embodiments, the gateway may add information to the scan list record associated with the subscriber device that indicates that each regrouped talkgroup is associated with the supergroup, for example, by including an identifier for the supergroup in a separate field within each affected talkgroup entry in the record. In some embodiments, the gateway may associate a priority level with the supergroup, for example, by including a priority level identifier in the talkgroup entry associated with the supergroup. In some embodiments, the gateway may determine the priority level based on the priority levels of the talkgroups being regrouped. For example, when only one of the talkgroups being regrouped are identified in the scan list, the gateway may use the priority level for that talkgroup as the priority level to associate with the supergroup. As another example, when multiple talkgroups that are being regrouped are identified in the scan list, the gateway may determine a priority level by comparing the priority levels of all of the talkgroups being regrouped that are identified in the scan list and selecting the highest priority level to associate with the supergroup.

Method 1400 continues at block 1420 with sending a message with information from the regroup message to the subscriber device over the alternative connection. In some embodiments, the message sent to the subscriber device may be the original regroup message or a copy of the regroup message. In some embodiments, the message sent to the subscriber device may include and least a portion of the information from the regroup message and may include more or less information than the regroup message. In some embodiments, the message sent to the subscriber device may be included with a call notification that is sent to the subscriber device over the alternative connection. In some embodiments, the message with information from the regroup message may be sent to the subscriber device by a gateway. In some embodiments, the regroup message may include an updated scan list based on the updated record associated with the subscriber device in a scan list repository.

Method 1400 continues at block 1422 with receiving a second call notification associated with the supergroup that includes information regarding an active radio call associated with the supergroup over the alternative connection. For example, the second call notification may include the identifier for the supergroup. As another example, the second call notification may include any one of the identifiers for the talkgroups that were regrouped into the supergroup. In some embodiments, the second call notification may be received by the gateway from the zone controller. Method 1400 continues at block 1424 with evaluating the second call notification using the updated record associated with the subscriber device in the scan list repository. In some embodiments, the evaluation may be performed by the gateway. In some embodiments, the evaluation may include a comparison of the talkgroup identifier for the supergroup in the second call notification with the identifiers in the talkgroup entries of the scan list record associated with the subscriber device to determine whether there is a match. Block 1424 may be implemented similar to block 1408.

Method 1400 continues at block 1426 with determining that the second call notification should be sent to the subscriber device. In some embodiments, the determination may be made by the gateway. In some embodiments, determining that the second call notification should be sent to the subscriber device may include a comparison of priority levels. For example, priority level comparison may be used when the subscriber device is participating in another radio call. Block 1426 may be implemented similar to block 1410.

Method 1400 continues at block 1428 with sending the second call notification to the subscriber device over the alternative connection. In some embodiments, the second call notification, when sent to the subscriber device, may include more or less information than it did when it was received at block 1422. For example, the information from the regroup message described for block 1420 may be included in the call notification sent at block 1428, and the call notification may be the message including that information. Block 1428 may be implemented similar to block 1412.

Figure 15:
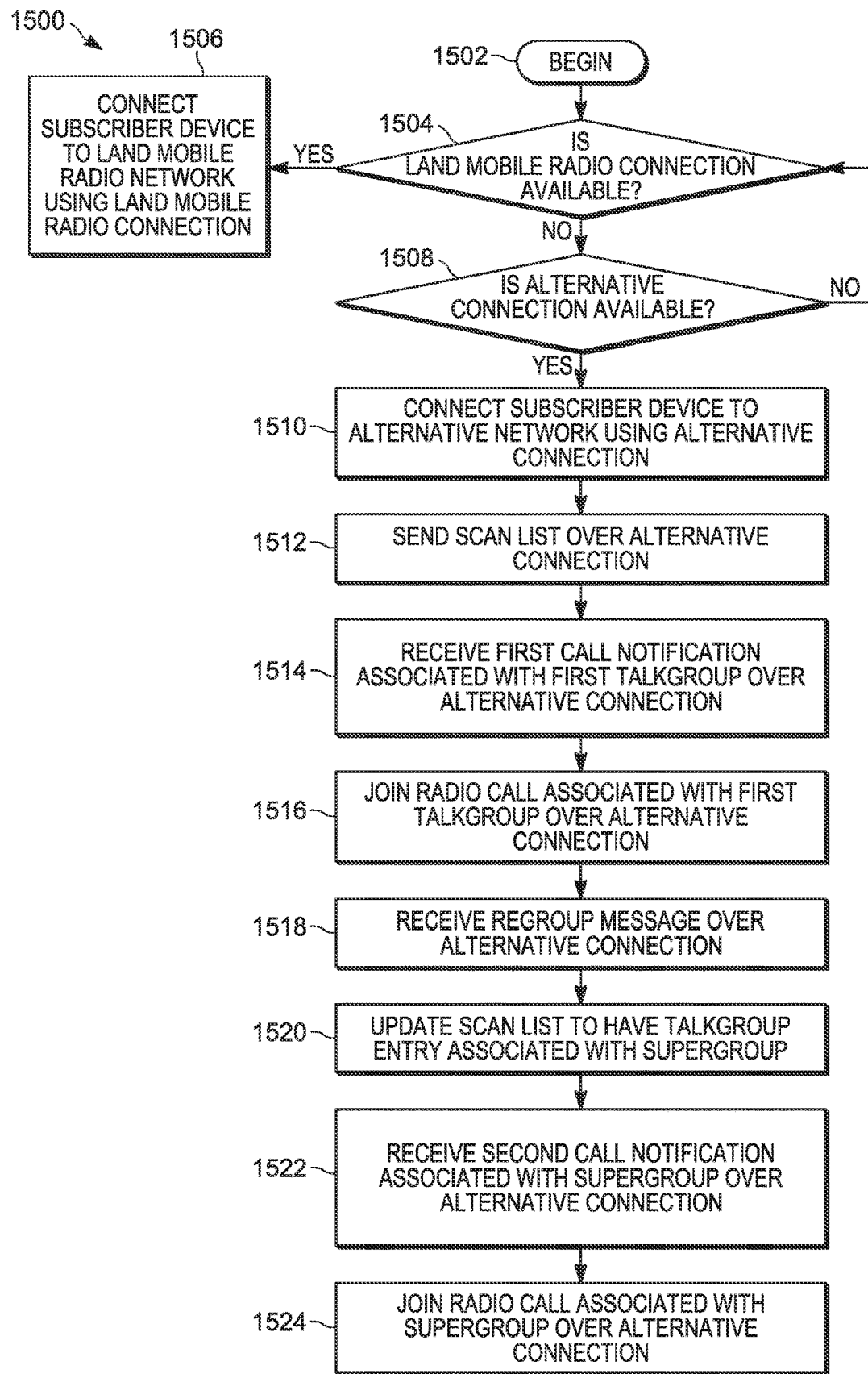
FIG. 15 is a flowchart illustrating selected elements of an example method for supporting remote scan and priority operations and regrouping operations, in accordance with some embodiments.

Referring now to FIG. 15, there is provided a flowchart illustrating selected elements of an example method 1500 for supporting remote scan and priority operations and regrouping operations, in accordance with some embodiments. In this example embodiment, method 1500 begins at block 1502 and continues at block 1504 with determining whether a land mobile radio connection to a land mobile radio network is available for a subscriber device. The subscriber device may be implemented similar to subscriber device 110 as described for FIG. 1, subscriber device 310 as described for FIG. 3, or subscriber device 400 as described for FIG. 4. The land mobile radio connection may be implemented similar to land mobile radio connection 125 and 135 as described for FIG. 1. As explained above, a land mobile radio connection may be unavailable for any of a number of different reasons. For example, the subscriber device may be out of range of a radio frequency site of the land mobile radio network, the radio frequency site may be experiencing an outage, the signal integrity may be insufficient, and the like. Block 1504 may be implemented similar to block 504 as described for FIG. 5.

When a land mobile radio connection is available, method 1500 continues at block 1506 with connecting the subscriber device to the land mobile radio network using the land mobile radio connection. When, at block 1504, it is determined that a land mobile radio connection is not available, method 1500 continues to block 1508 with determining whether an alternative connection to an alternative network is available. The alternative network may be implemented similar to alternative network 140 as described for FIG. 1 and alternative network 265 as described for FIG. 2. The alternative connection may be implemented similar to alternative connection 145 as described for FIG. 1. When at block 1508 of method 1500 it is determined that an alternative connection is unavailable, method 1500 may return to block 1504. Block 1508 may be implemented similar to block 508 as described for FIG. 5. When it is determined that an alternative connection is available, method 1500 continues at block 1510 with connecting the subscriber device to the alternative network. Block 1510 may be implemented similar to block 510 as described for FIG. 5.

Method 1500 continues at block 1512 with sending a first scan list over the alternative connection to the alternative network. In some embodiments the scan list may be sent to a gateway. The gateway may be implemented similar to gateway 160 as described for FIG. 1 or gateway 210 as described for FIG. 2. As described above, in some embodiments, the first scan list may contain one or more entries associated with different talkgroups in which each entry may contain an identifier and a priority level associated with the talkgroup. The first scan list may be implemented similar to scan lists 780, 785, 790, or 795 as described for FIG. 7B. Block 1512 may be implemented similar to block 512 as described for FIG. 5.

Method 1500 continues at block 1514 with receiving a first call notification associated with a first talkgroup that includes information regarding an active radio call, also referred to as a radio call that is in an active state, associated with the first talkgroup over the alternative connection to the alternative network. In some embodiments, a gateway may send the first call notification to a subscriber device after the gateway receives the call notification from a zone controller. The zone controller may be implemented similar to zone controller 150 as described for FIG. 1. Block 1514 may be implemented similar to block 514 as described for FIG. 5. Method 1500 continues at block 1516 with the subscriber device joining a radio call associated with the first talkgroup over the alternative connection to the alternative network. Block 1516 may be implemented similar to block 516 as described for FIG. 5.

Method 1500 continues at block 1518 with receiving a regroup message indicating that the first talkgroup has been regrouped with at least a second talkgroup into a supergroup. In some embodiments, the regroup message may be received by the subscriber device from the gateway over the alternative connection to the alternative network. In some embodiments, the regroup message may include an indication that at least one of the talkgroups in the subscriber device's scan list has been regrouped with another talkgroup in the subscriber's scan list into a supergroup. In some embodiments, the regroup message may include identifiers associated with each talkgroup that has been regrouped, at least one of which matches an identifier in the first scan list, and may also include an identifier associated with the supergroup. In some embodiments, the identifier associated with the supergroup may be a new identifier that is different than the identifiers for each talkgroup that has been regrouped. In some embodiments, the identifier associated with the supergroup may be the same as one of the talkgroups that has been regrouped. In some embodiments, the regroup message may contain a priority level associated with the supergroup. In some embodiments, the gateway may determine a priority level to associate with the supergroup, for example, based on a priority level of a talkgroup being regrouped based on a record associated with the subscriber device in a scan list repository. In some embodiments, the subscriber device may determine a priority level to associate with the supergroup, for example, based on the priority level of a talkgroup being regrouped based on a talkgroup entry in the subscriber device's scan list that is being regrouped. In some embodiments, the received regroup message may include all or a portion of a regroup message received by the gateway from a zone controller. In some embodiments, the regroup message may include an updated scan list generate by the gateway based on a record associated with the subscriber device in a scan list repository and information from the regroup message received from the zone controller.

Method 1500 continues at block 1520 with updating the scan list to include a talkgroup entry associated with the supergroup. In some embodiments, the subscriber device may replace the entries for each talkgroup that have been regrouped with a single entry for the supergroup that includes an identifier for the supergroup. In some embodiments, the subscriber device may add information to its scan list that indicates that each regrouped talkgroup is associated with the supergroup, for example, by including an identifier for the supergroup in a separate field within each affected talkgroup entry. In some embodiments, the regroup message received by the subscriber device at block 1518 may include an updated scan list and updating the scan list at block 1520 may include replacing the existing scan list in the subscriber device with the updated scan list. The method continues at block 1522 with receiving a second call notification associated with the supergroup that includes information regarding an active radio call associated with the supergroup over the alternative connection to the alternative network. Block 1522 may be implemented similar to block 1514. The method continues at block 1524 with the subscriber device joining the radio call associated with the supergroup over the alternative connection to the alternative network. Block 1524 may be implemented similar to block 1516.

The operation of methods 1400 and 1500 may be illustrated using an example regarding the police officer as discussed for FIG. 7A and FIG. 7B. The police officer's subscriber device 770 may be configured with scan list 780, which includes talkgroup entry 780a associated with talkgroup two and talkgroup entry 780b associated with talkgroup one, among others. When subscriber device 770 is out of range of a radio frequency site, or when a land mobile radio connection to the land mobile radio network is otherwise unavailable, subscriber device 770 may be able to connect to the land mobile radio network via a gateway by establishing an alternative connection to an alternative network that is also connected to the gateway. Subscriber device 770 may send a copy of scan list 780 to the gateway over the alternative connection. In this example, subscriber device 770 may not be participating in any active radio calls at this time. After receiving scan list 780 from the subscriber device 700, the gateway may store the scan list, for example, as a record in a scan list repository, and may then receive a first call notification from the zone controller of the land mobile radio network. The first call notification may include information regarding, and is thus associated with, an active radio call for talkgroup one, for example, by including identifier TG1 in the first call notification. The gateway may then evaluate the first call notification by comparing identifier TG1 with the talkgroup identifiers in each entry of scan list 780. Because identifier TG1 is included in talkgroup entry 780b, the gateway may determine that the first call notification should be sent to the subscriber device, and the gateway may then send the first call notification to the subscriber device over the alternative connection. Subscriber device 770 may automatically join the radio call associated with talkgroup one without input from the user, and the gateway may begin to send audio communications for the radio call to subscriber device 770 over the alternative connection and may also receive audio communications from subscriber device 770 over the alternative connection. In some embodiments, subscriber device 770 may send messaging to the zone controller via the gateway indicating to one or both that subscriber device 770 has joined the radio call.

The police department of City 710 may assign different talkgroups for different portions of the city, for example, talkgroup one may be for subscriber device used to patrol the north side, talkgroup two may be for subscriber devices used to patrol the east side, talkgroup three may be for subscriber devices used to patrol the south side, and talkgroup four may be for subscriber devices used to patrol the west side. Each police officer's subscriber device may be configured based on the portion of the city that the officer will be patrolling. The dispatch control operator may decide to regroup talkgroups one and two into a supergroup. For example, when there is an emergency in the northeast portion of City 710, the operator may want all officers that are patrolling in the north and the east parts of City 710 to be able to talk to each other to coordinate an emergency response. In other situations, the operator may want to create a city-wide supergroup by regrouping talkgroups one, two, three, and four together. For the example where talkgroups one and two are regrouped, the zone controller may send regroup messaging to the different radio frequency sites. When, for example, subscriber device 775 is connected to the land mobile radio network over a land mobile radio connection, subscriber device 775 may receive regroup messaging from the zone controller over the broadcast control channel and may update its scan list accordingly. When, for example, subscriber device 770 is connected via the gateway using an alternative connection, such as a satellite connection, subscriber device 770 may not receive the regroup message. In accordance with some embodiments disclosed herein, the zone controller may send a regroup message to the gateway.

The gateway may determine that the identifier for talkgroup one (e.g. TG1) and/or talkgroup two (e.g. TG2) included in the regroup message matches one or more of the talkgroup identifiers included in one or more talkgroup entries in a record associated with subscriber device 770, for example, those talkgroup identifiers in the talkgroup entries of scan list 780. The gateway may then update the record for subscriber device 770, for example, in a scan list repository, with information from the regroup message. For example, the gateway may replace talkgroup entries 780*a* and 780*b* with a single entry associated with the supergroup. Alternatively, the gateway may indicate in a separate field (not shown in FIG. 7B) within scan list 780 that talkgroups one and two have been regrouped. The gateway may then send a message to subscriber device 770 that contains the updated scan list over the satellite connection. Subscriber device 770 may then update its scan list internally to reflect that talkgroups one and two have been regrouped. When a subsequent call notification associated with the supergroup is received by the gateway, the gateway be able to determine that the supergroup call notification should be sent to subscriber device 770, which may receive the call notification and join the supergroup radio call. Additionally, when subscriber device 770 moves to a location where a land mobile radio connection is available, subscriber device 770's scan list may already be up to date with the regrouping status and may be able to determine locally that it should join radio calls associated with call notifications for the supergroup.

In some embodiments, information regarding which talkgroups are being monitored by, for example, the gateway may be communicated to the zone controller. In some embodiments, the information received may allow the zone controller to filter call notifications being sent to the gateway thereby limiting the number of call notifications the gateway evaluates. This approach may improve the speed at which call notifications are delivered to subscriber devices that are connected via an alternative network and reduce the amount of call audio that is lost prior to the subscriber device joining the call. It may also ensure that all call notifications of potential interest to the subscriber devices connected to the gateway are actually received by the gateway. In ordinary land mobile radio operation, the zone controller typically does not send all available call notifications to every radio frequency site. Rather, the zone controller typically sends to a radio frequency site only the call notifications associated with talkgroups for which the subscriber devices registered through the radio frequency site are affiliated.

In ordinary land mobile radio operation, the zone controller is only aware of affiliated talkgroups and not the talkgroups in each subscriber device's scan list, because the subscriber devices do not communicate their scan lists to the components of the system infrastructure. This means that even though a subscriber device may have a talkgroup listed in its scan list, there may not be a guarantee that a call notification for the talkgroup will be delivered to the radio frequency site the subscriber device is connected to. That is, in ordinary land mobile radio operation, the zone controller may require at least one subscriber device that is registered through a radio frequency site to be affiliated with a talkgroup before the zone controller will send any call notifications associated with that talkgroup to the radio frequency site. Sending information to the zone controller regarding which talkgroups are in a subscriber device's scan list may improve the operation of the system infrastructure and the subscriber device. For example, it may improve the ability of the system to guarantee delivery of call notifications associated with talkgroups included in the scan list to the subscriber device. As another example, it may help ensure the zone controller includes an alternative network site, which, in some embodiments, may be a gateway, when sending regroup messages and other grouping updates. The gateway may in turn update one or more records in a scan list repository to reflect the regrouping status of one or more talkgroups.

Figure 16:
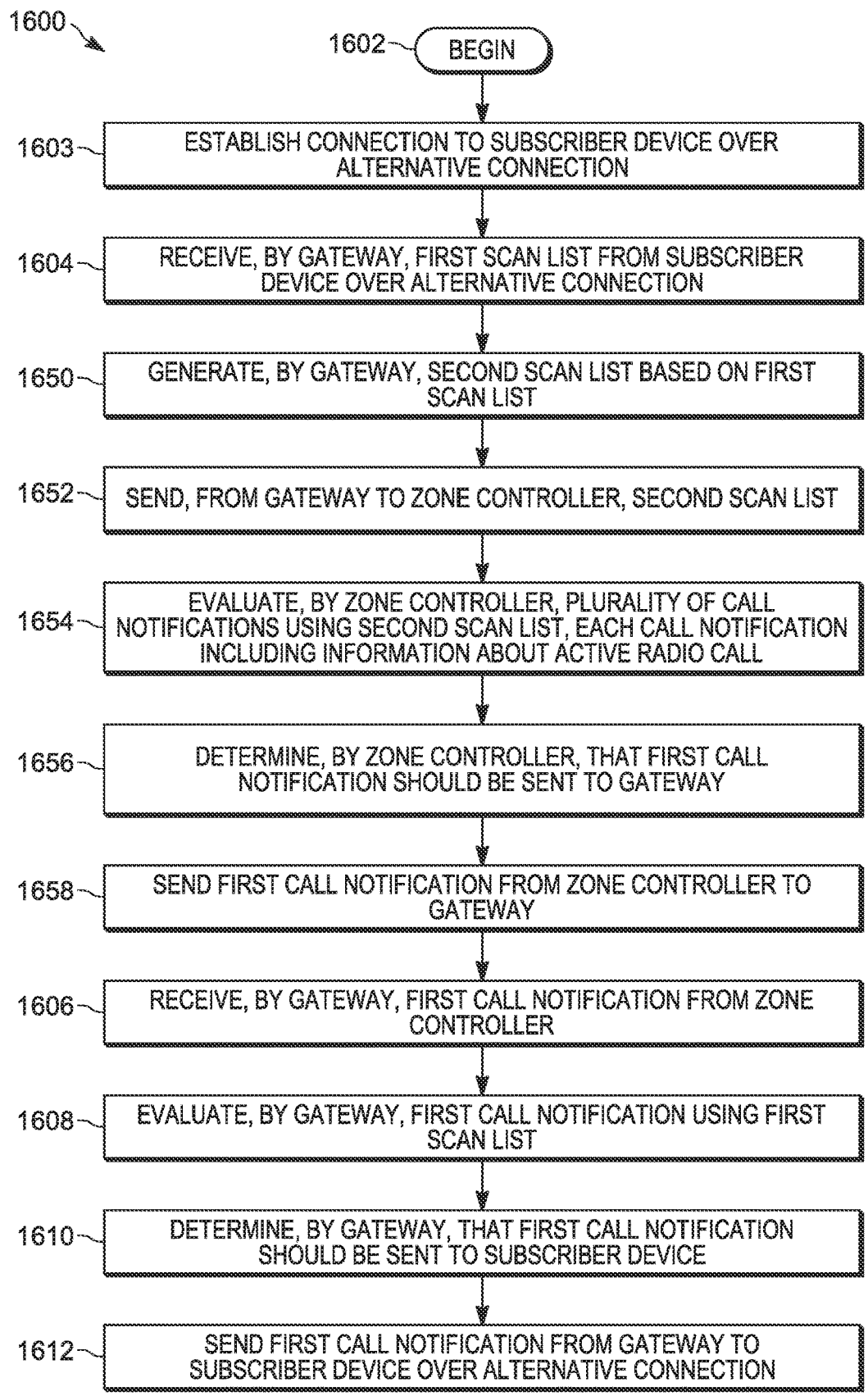
FIG. 16 is a flowchart illustrating selected elements of an example method for remote scan and priority operations using multiple components of a system infrastructure, in accordance with some embodiments.

Referring now to FIG. 16, there is provided a flowchart illustrating selected elements of an example method 1600 for remote scan and priority operations using multiple components of a system infrastructure, in accordance with some embodiments. One or more blocks of method 1600 may be performed remotely from a subscriber device by a component of the system infrastructure, such as a gateway. The gateway may be implemented similar to gateway 160 as described for FIG. 1 or gateway 210 as described for FIG. 2. The subscriber device may be implemented similar to subscriber device 110 as described for FIG. 1, subscriber device 310 as described for FIG. 3, or subscriber device 400 as described for FIG. 4.

In this example embodiment, method 1600 begins at block 1602 and continues at block 1603 with establishing a connection to a subscriber device over an alternative connection to an alternative network. Method 1600 continues at block 1604 with a gateway receiving a first scan list from the subscriber device over an alternative connection to an alternative network. As described above, the alternative connection to the alternative network is different than a land mobile radio connection. The alternative network may be implemented similar to alternative network 140 as described for FIG. 1 or alternative network 265 as described for FIG. 2. The alternative connection may be implemented similar to alternative connection 145 as described for FIG. 1. The scan list may be implemented similar to scan lists 780, 785, 790, or 795 as described for FIG. 7B. Block 1604 may be implemented similar to block 604 as described for FIG. 6.

Method 1600 continues at block 1650 with generating a second scan list based on the first scan list. In some embodiments, the second scan list may be generated by the gateway. In some embodiments, the second scan list may be generated based on the first scan list when it is generated by adding information, removing information, or otherwise using information from the first scan list, which may include adding, removing, or otherwise using information from a copy of the first scan list. In some embodiments, the second scan list may be a copy of the first scan list. In some embodiments, the gateway may send the copy of the scan list to the zone controller for each scan list it receives from each subscriber device. In some embodiments, the second scan list may include only some information from the first scan list. For example, the zone controller may be maintaining a database of reported scan lists independent of the gateway, and the gateway may send only the portion of a scan list that has changed. In some embodiments, the second scan list may include information from the first scan list and additional information. In some embodiments, the second scan list may be a cumulative scan list that contains information from some or all of a plurality of scan lists received from some or all of a plurality of subscriber devices connected to the gateway over the alternative connection to alternative network. In some embodiments, the zone controller may maintain or otherwise have access to a scan list repository that includes scan list records for each subscriber device connected to the gateway over an alternative connection. Method 1600 continues at block 1652 with sending the second scan list from the gateway to the zone controller. The zone controller may be implemented similar to zone controller 150 as described for FIG. 1.

Method 1600 continues at block 1654 with evaluating, by the zone controller, a plurality of call notifications using the second scan list, where each call notification includes information regarding an active radio call associated with a talkgroup. In some embodiments, each call notification may include a talkgroup identifier associated with the talkgroup that the radio call is for, and may also include a radio channel assignment for the call. In some embodiments, the zone controller may evaluate each call notification using the second scan list by comparing the talkgroup identifier in each call notification to the talkgroup identifiers in the second scan list. Method 1600 continues at block 1656 with determining, by the zone controller, that a first call notification of the plurality of call notifications should be sent to the gateway. In some embodiments, the zone controller may determine the that a call notification should be sent to the gateway when it determines that the talkgroup identifier in the call notification matches an identifier in the second scan list. In this way, the zone controller may filter the call notifications that it sends to the gateway and eliminate call notifications that are not associated with any of the talkgroups of interest to subscriber devices connected through the gateway, which may reduce the number of call notifications the gateway must process and improve the performance of remote scan and priority operations. Additionally, it may be more likely that the gateway will receive call notifications that are associated with talkgroups that subscriber devices connected to the gateway have included in their scan lists, thereby improving the reliability of delivering available call notifications to the subscriber devices. Method 1600 continues at block 1658 with sending the first call notification to the gateway from the zone controller.

Method 1600 continues at block 1606 with receiving the first call notification from the zone controller. In some embodiments, the first call notification may be received by the gateway. Block 1606 may be implemented similar to block 606 as described for FIG. 6. Method 1600 continues at block 1608 with evaluating the first call notification using the first scan list. In some embodiments, the first call notification may be evaluated by the gateway. Block 1608 may be implemented similar to block 608 as described for FIG. 6. Method 1600 continues at block 1610 with determining that the first call notification should be sent to the subscriber device. In some embodiments, the determination may be made by the gateway. In some embodiments, determining that the call notification should be sent to the subscriber device may include a comparison of priority levels associated with talkgroups. Block 1610 may be implemented similar to block 610 as described for FIG. 6. Method 1600 continues at block 1612 with sending the first call notification to the subscriber device over the alternative connection. In some embodiments, the first call notification, when sent to the subscriber device, may include more or less information than it did when it was received at block 1606. Block 1612 may be implemented similar to block 612 as described for FIG. 6.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. Similarly, while a particular order of operations is indicated in various figures for illustrative purposes, the timing and ordering of such operations may vary where appropriate without negating the purpose and advantages of the examples set forth in detail throughout this disclosure. For example, successive evaluations or determinations may be based on inputs received for an earlier evaluation or determination, in which the input is received before a successive evaluation or determination. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the terms are defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way but may also be configured in ways that are not listed or shown.

It will be appreciated that some embodiments may be comprised of one or more generic or specialized electronic processors (sometimes referred to as "processors" or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A method for remote scan and priority operations, comprising:
   establishing a connection to a subscriber device, wherein:
      the subscriber device is operable to communicate using:
         a land mobile radio connection to a land mobile radio network;
         an alternative connection to an alternative network, the alternative connection different than the land mobile radio connection;
      the connection to the subscriber device is established over the alternative connection;
   receiving a first scan list from the subscriber device over the alternative connection, wherein the first scan list received over the alternative connection comprises:
      a plurality of talkgroup entries, wherein:
         the plurality of talkgroup entries of the first scan list comprises:
            an entry associated with a first talkgroup;
            an entry associated with a second talkgroup;
         each talkgroup entry in the plurality of talkgroup entries is associated with a talkgroup;
         each talkgroup entry in the plurality of talkgroup entries comprises:
            a priority level associated with the talkgroup;
   evaluating a first call notification using the first scan list, the first call notification associated with the first talkgroup;
   determining, based on the evaluation, that the first call notification should be sent to the subscriber device;
   sending, based on the determination, the first call notification to the subscriber device over the alternative connection;
   receiving a second call notification associated with the second talkgroup, the second call notification is received when a radio call associated with the first talkgroup is in an active state;
   evaluating the second call notification using the first scan list;
   determining, based on the evaluation of the second call notification, that the second call notification should be sent to the subscriber device, wherein the determination that the second call notification should be sent to the subscriber device comprises:
      comparing the priority level associated with the second talkgroup with the priority level associated with the first talkgroup;
      determining, based on the comparison, that the priority level associated with the second talkgroup is higher than the priority level associated with the first talkgroup; and
   sending the second call notification to the subscriber device over the alternative connection.

2. The method of claim 1, wherein the alternative connection is:
   a wireless local area network connection;
   a cellular connection; or
   a satellite connection.

3. The method of claim 1, further comprising:
   updating a record in a scan list repository based on the first scan list, the record associated with the subscriber device;
   sending a first audio communication for the radio call associated with the first talkgroup to the subscriber device over the alternative connection; and
   receiving a second audio communication for the radio call associated with the first talkgroup from the subscriber device over the alternative connection.

4. The method of claim 1, further comprising:
   determining that the radio call associated with the first talkgroup has transitioned from the active state to an inactive state for a first period;
   initiating a second period after the first period;
   generating a second scan list based on the first scan list; and
   terminating the second period after an occurrence of a termination event, the occurrence of the termination event after initiating the second period.

5. The method of claim 4, wherein the termination event is at least one of:
   determining that the second period has expired;
   determining that the radio call associated with the first talkgroup has transitioned to the active state; or
   determining that a third call notification should be sent to the subscriber device, wherein:
      the third call notification is received before the second period has expired;
      the third call notification is evaluated using the second scan list; and determining that the third call notification should be sent to the subscriber device is based on the evaluation of the third call notification.

6. The method of claim 1, wherein
each talkgroup entry in the plurality of talkgroup entries further comprises:
an identifier associated with the talkgroup.

7. The method of claim 6,
wherein:
the first call notification comprises an identifier associated with the first talkgroup;
the second call notification comprises an identifier associated with the second talkgroup;
the second call notification is evaluated using the first scan list by:
comparing the identifier in the second call notification with one or more identifiers included in one or more of the plurality of talkgroup entries in the first scan list; and
determining, based on the comparison, that the identifier associated with the second talkgroup in the second call notification matches the identifier associated with the second talkgroup in the first scan list.

8. The method of claim 6, wherein:
the first scan list is received by a gateway;
the first call notification is received by the gateway from a zone controller;
the method further comprises:
receiving a regroup message from the zone controller, the regroup message comprising:
an identifier associated with the first talkgroup;
an indication that the first talkgroup has been regrouped with a second talkgroup into a supergroup;
determining, by the gateway, that the identifier associated with the first talkgroup in the first scan list matches the identifier associated with the first talkgroup in the regroup message;
updating, in a scan list repository, a record associated with the subscriber device based on the regroup message; and
sending a message comprising at least a portion of the regroup message to the subscriber device over the alternative connection.

9. The method of claim 8, further comprising:
receiving, by the gateway from the zone controller, a third call notification, the third call notification associated with the supergroup;
evaluating the third call notification using the updated record associated with the subscriber device;
determining, based on the evaluation, that the third call notification should be sent to the subscriber device; and
sending the third call notification to the subscriber device over the alternative connection.

10. The method of claim 1, wherein:
the first scan list is received by a gateway;
the first call notification is received by the gateway from a zone controller;
the method further comprises:
generating, by the gateway, a second scan list based on the first scan list;
sending, from the gateway to the zone controller, the second scan list;
evaluating, by the zone controller, a plurality of call notifications, the plurality of call notifications comprising the first call notification, using the second scan list;
determining, by the zone controller, based on the evaluation, that the first call notification should be sent to the gateway; and
sending the first call notification from the zone controller to the gateway.

11. The method of claim 10, wherein:
the second scan list comprises information from a plurality of scan lists received from a plurality of subscriber devices; and
the plurality of scan lists comprises the first scan list.

12. A system for remote scan and priority operations, comprising:
a zone controller;
a gateway communicatively coupled to the zone controller;
a subscriber device communicatively coupled to the gateway, wherein:
the zone controller is:
part of a land mobile radio network;
configured to:
send a first call notification to the gateway, the first call notification associated with a first talkgroup;
send a second call notification, subsequent to sending the first call notification, to the gateway, the second call notification associated with a second talkgroup;
the subscriber device is:
communicatively coupled to the gateway via an alternative network, the alternative network different than the land mobile radio network;
communicatively coupled to the alternative network via an alternative connection, the alternative connection different than a land mobile radio connection;
configured to send a first scan list to the gateway via the alternative network over the alternative connection, the first scan list comprising one or more talkgroup entries;
the gateway is configured to:
receive the first scan list from the subscriber device over the alternative connection;
receive the first call notification from the zone controller;
evaluate the first call notification using the first scan list;
determine, based on the evaluation, that the first call notification should be sent to the subscriber device;
send, based on the determination, the first call notification to the subscriber device over the alternative connection;
receive the second call notification from the zone controller;
evaluate the second call notification using the first scan list;
determine, based on the evaluation, that the second call notification should be sent to the subscriber device; and
send the second call notification to the subscriber device over the alternative connection.

13. The system of claim 12, wherein the alternative connection is:
a wireless local area network connection;
a cellular connection; or
a satellite connection.

14. The system of claim 12, wherein:
the gateway is further configured to:
generate a second scan list based on the first scan list;
send the second scan list to the zone controller;
the zone controller is further configured to:
receive the second scan list from the gateway;
evaluate a plurality of call notifications, the plurality of call notifications comprising the first call notification, using the second scan list;
determine, based on the evaluation of the plurality of call notifications, that the first call notification should be sent to the gateway; and
send the first call notification to the gateway.

15. The system of claim 12, further comprising:
a scan list repository communicatively coupled to the gateway;
wherein the gateway is further configured to:
update a record in the scan list repository based on the first scan list, the record associated with the subscriber device;
send a first audio communication for a radio call associated with the first talkgroup to the subscriber device over the alternative connection; and
receive a second audio communication for the radio call associated with the first talkgroup from the subscriber device over the alternative connection.

16. The system of claim 15, wherein:
the first scan list comprises a talkgroup entry associated with the first talkgroup, wherein the talkgroup entry comprises:
an identifier associated with the first talkgroup;
a priority level associated with the first talkgroup;
the zone controller is further configured to:
send a regroup message to the gateway, the regroup message comprising:
an identifier associated with the first talkgroup;
an indication that the first talkgroup has been regrouped with a second talkgroup into a supergroup;
the gateway is further configured to:
receive the regroup message from the zone controller;
determine that the identifier associated with the first talkgroup in the first scan list matches the identifier associated with the first talkgroup in the regroup message;
update the record in the scan list repository associated with the subscriber device based on the regroup message; and
send a message comprising at least a portion of the regroup message to the subscriber device over the alternative connection.

17. The system of claim 16, wherein the gateway is further configured to:
receive a third call notification associated with the supergroup;
evaluate the third call notification using the updated record associated with the subscriber device;
determine, based on the evaluation, that the third call notification should be sent to the subscriber device; and
send the third call notification to the subscriber device over the alternative connection.

18. A gateway device for remote scan and priority operations, comprising:
a first interface communicatively coupled to a zone controller, wherein:
the zone controller is part of a land mobile radio network;
the first interface is configured to receive a first call notification and a second call notification from the zone controller;
a second interface communicatively coupled to an alternative network, wherein:
the alternative network is different than the land mobile radio network;
the second interface is configured to receive a scan list from a subscriber device via the alternative network;
the scan list received from the subscriber device via the alternative network comprises:
a plurality of talkgroup entries, wherein:
the plurality of talkgroup entries of the scan list comprises:
an entry associated with a first talkgroup;
an entry associated with a second talkgroup;
each talkgroup entry in the plurality of talkgroup entries is associated with a talkgroup;
each talkgroup entry in the plurality of talkgroup entries comprises:
a priority level associated with the talkgroup;
a processor communicatively coupled to the first and second interfaces, the processor configured to:
evaluate the first call notification using the scan list received from the subscriber device via the alternative network, wherein:
the first call notification is received using the first interface;
the scan list is received using the second interface;
determine, based on the evaluation, that the first call notification should be sent to the subscriber device; and
send the first call notification to the subscriber device via the alternative network using the second interface;
evaluate the second call notification using the scan list, wherein the second call notification is associated with the second talkgroup, the second call notification received when a radio call associated with the first talkgroup is in an active state;
determine, based on the evaluation of the second call notification, that the second call notification should be sent to the subscriber device, wherein the determination that the second call notification should be sent to the subscriber device comprises:
compare the priority level associated with the second talkgroup with the priority level associated with the first talkgroup;
determine, based on the comparison, that the priority level associated with the second talkgroup is higher than the priority level associated with the first talkgroup; and
send the second call notification to the subscriber device via the alternative network using the second interface.

19. The gateway device of claim 18, further comprising:
a third interface communicatively coupled to a scan list repository, wherein the processor is further configured to update a record associated with the subscriber device in the scan list repository based on the received scan list.

\* \* \* \* \*